(12) United States Patent
Araki et al.

(10) Patent No.: US 7,519,612 B2
(45) Date of Patent: Apr. 14, 2009

(54) INFORMATION PROCESSING SYSTEM, INFORMATION PROCESSING METHOD, AND COMPUTER PROGRAM USED THEREWITH

(75) Inventors: Yuichi Araki, Tokyo (JP); Toshiyuki Ishii, Chiba (JP); Takamichi Mitsuhashi, Tokyo (JP)

(73) Assignee: Sony Corporation (JP)

( * ) Notice: Subject to any disclaimer, the term of this patent is extended or adjusted under 35 U.S.C. 154(b) by 403 days.

(21) Appl. No.: 11/179,987

(22) Filed: Jul. 13, 2005

(65) Prior Publication Data

US 2006/0020621 A1    Jan. 26, 2006

(30) Foreign Application Priority Data

Jul. 20, 2004    (JP) .......................... P2004-212330

(51) Int. Cl.
*G06F 17/00* (2006.01)
(52) U.S. Cl. ............... 707/102; 707/103 Y; 707/103 X; 707/103 Z; 707/104.1; 382/232; 348/441
(58) Field of Classification Search ........................ None
See application file for complete search history.

(56) References Cited

U.S. PATENT DOCUMENTS

| 6,470,319 | B1* | 10/2002 | Ryan ............................... 705/1 |
| 7,003,504 | B1* | 2/2006 | Angus et al. ..................... 707/1 |
| 7,095,402 | B2* | 8/2006 | Kunii et al. ................. 345/169 |
| 7,096,336 | B2* | 8/2006 | Furuhashi et al. ........... 711/165 |
| 7,259,887 | B2* | 8/2007 | Lech et al. ................. 358/1.15 |
| 2002/0099763 | A1* | 7/2002 | Kondo et al. ................. 709/201 |
| 2002/0111133 | A1* | 8/2002 | Wittkotter ....................... 455/1 |
| 2003/0001964 | A1 | 1/2003 | Masukura et al. ........... 348/441 |
| 2003/0120840 | A1* | 6/2003 | Isozu ........................... 710/36 |
| 2003/0210821 | A1 | 11/2003 | Yogeshwar et al. .......... 382/232 |
| 2004/0012812 | A1* | 1/2004 | Shimizu .................... 358/1.15 |
| 2004/0153466 | A1* | 8/2004 | Ziff et al. ..................... 707/100 |
| 2005/0025064 | A1* | 2/2005 | Chang et al. ................. 370/252 |
| 2005/0240548 | A1* | 10/2005 | Fujioka ......................... 707/1 |

FOREIGN PATENT DOCUMENTS

| EP | 0 843 450 A2 | 5/1998 |
| EP | 1 271 938 A2 | 1/2003 |

(Continued)

OTHER PUBLICATIONS

European Search Report, Dated Dec. 12, 2005.

(Continued)

*Primary Examiner*—Pierre M Vital
*Assistant Examiner*—Mohammad S Rostami
(74) *Attorney, Agent, or Firm*—Rader Fishman & Grauer PLLC; Ronald P. Kananen

(57) ABSTRACT

An information processing system uses data processing for content. The system includes a preference-data manager for managing user's preferences concerning types of the data processing which are used for said content, a content generator for generating content by using a user-preferred type of the data processing for said content, a content storage unit for storing said content as original content and the content generated by said content generating means, and a resource manager which manages system resources and which, in response to availability of the resources, requests said content generating means to process said content.

6 Claims, 37 Drawing Sheets

FOREIGN PATENT DOCUMENTS

| | | |
|---|---|---|
| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| JP | 2003-233622 | 8/2003 |
| WO | WO-00/39964 | 7/2000 |
| WO | WO 02/21841 A1 | 3/2002 |

OTHER PUBLICATIONS

Adaptive Program Filtering Under Vector Space Model and Relevance Feedback, Dated Nov. 2003.

Supplemental European Search Report dated Feb. 13, 2008 for corresponding European Application No. 05 254 482.2-2211.

* cited by examiner

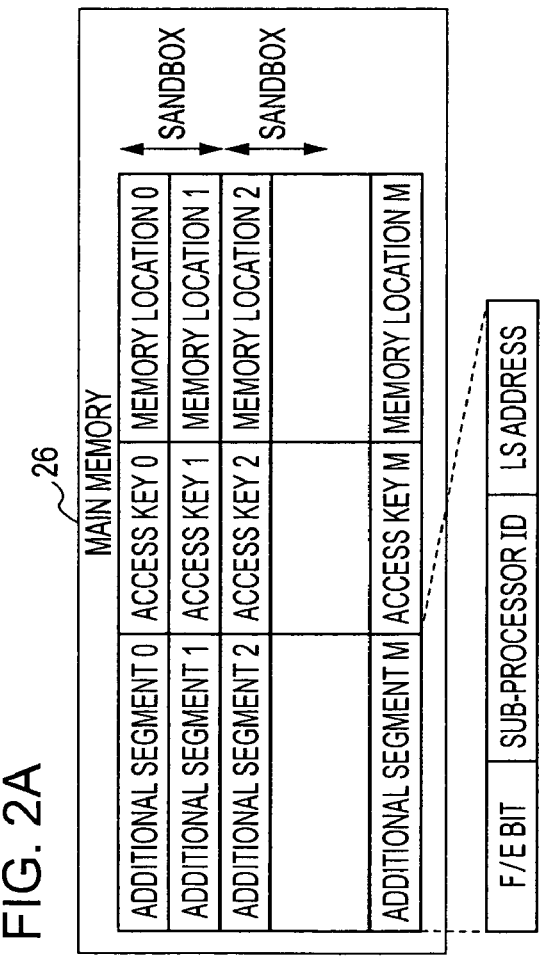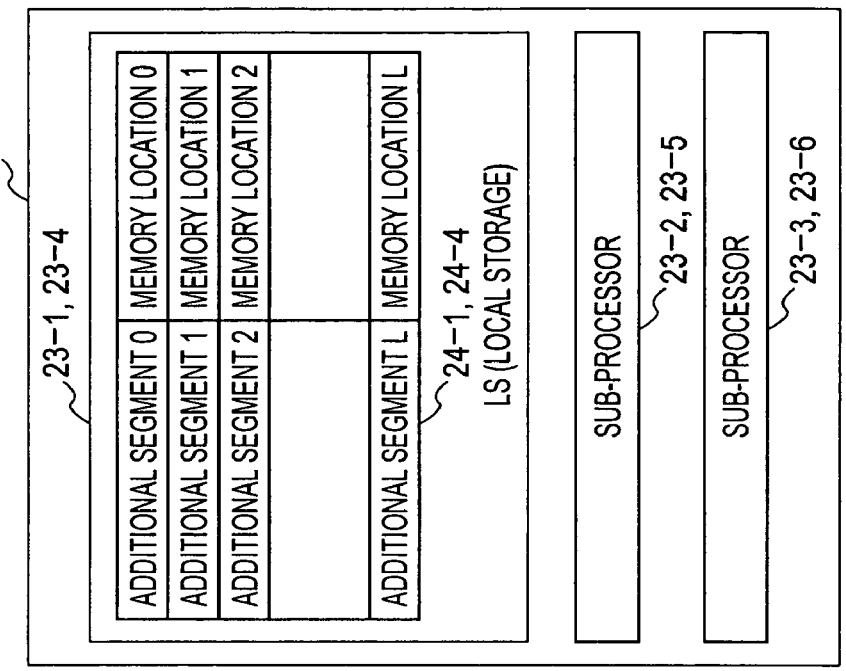

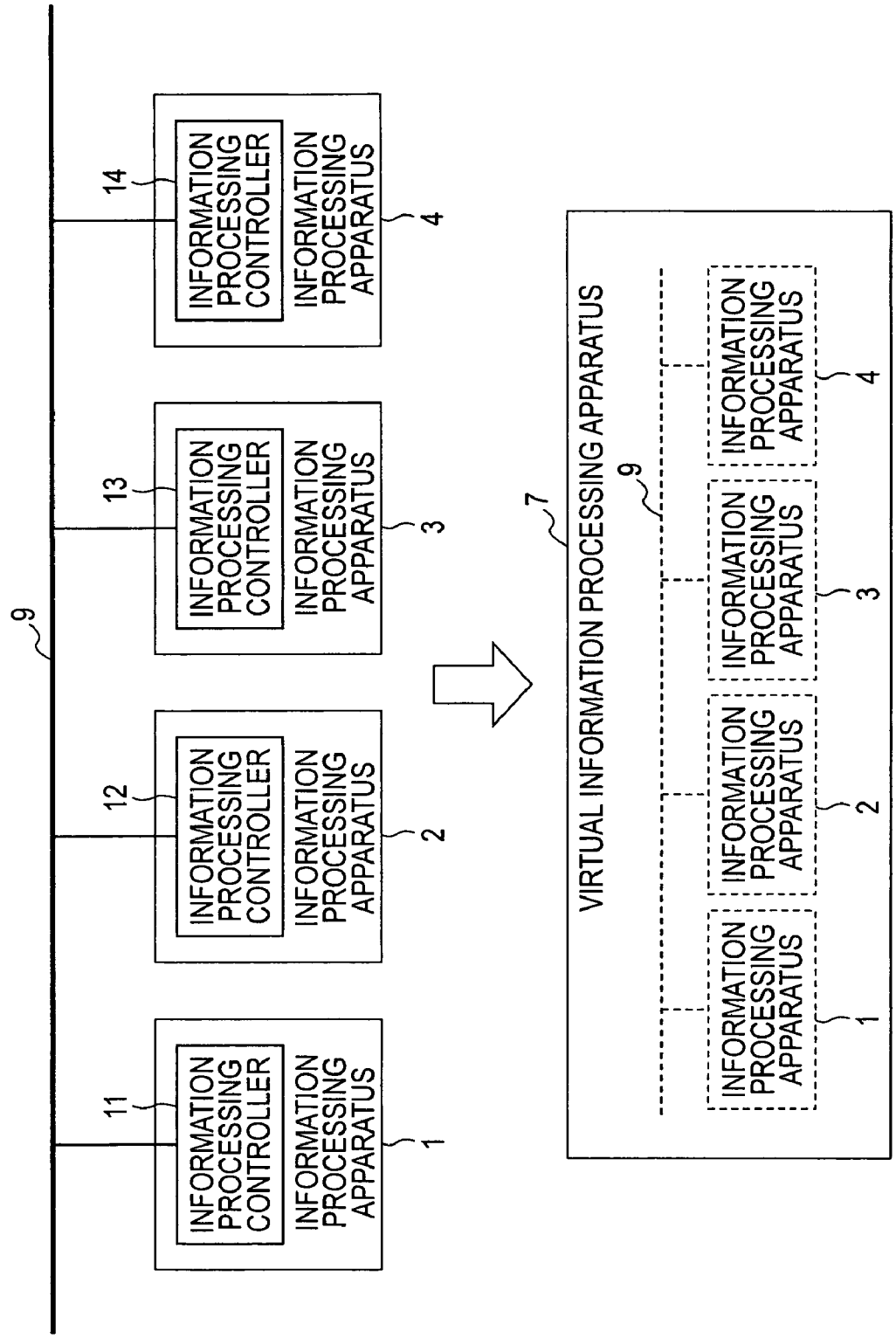

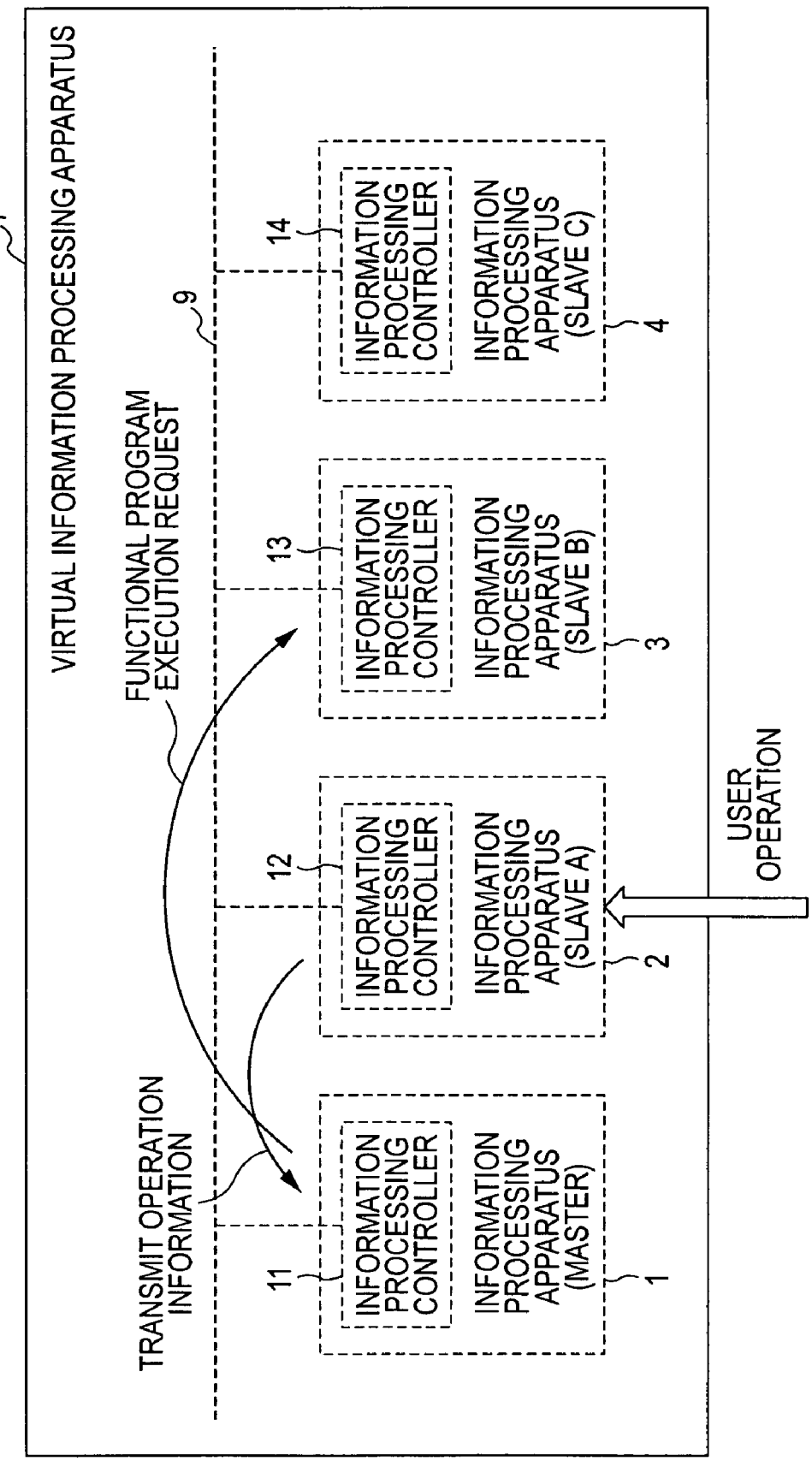

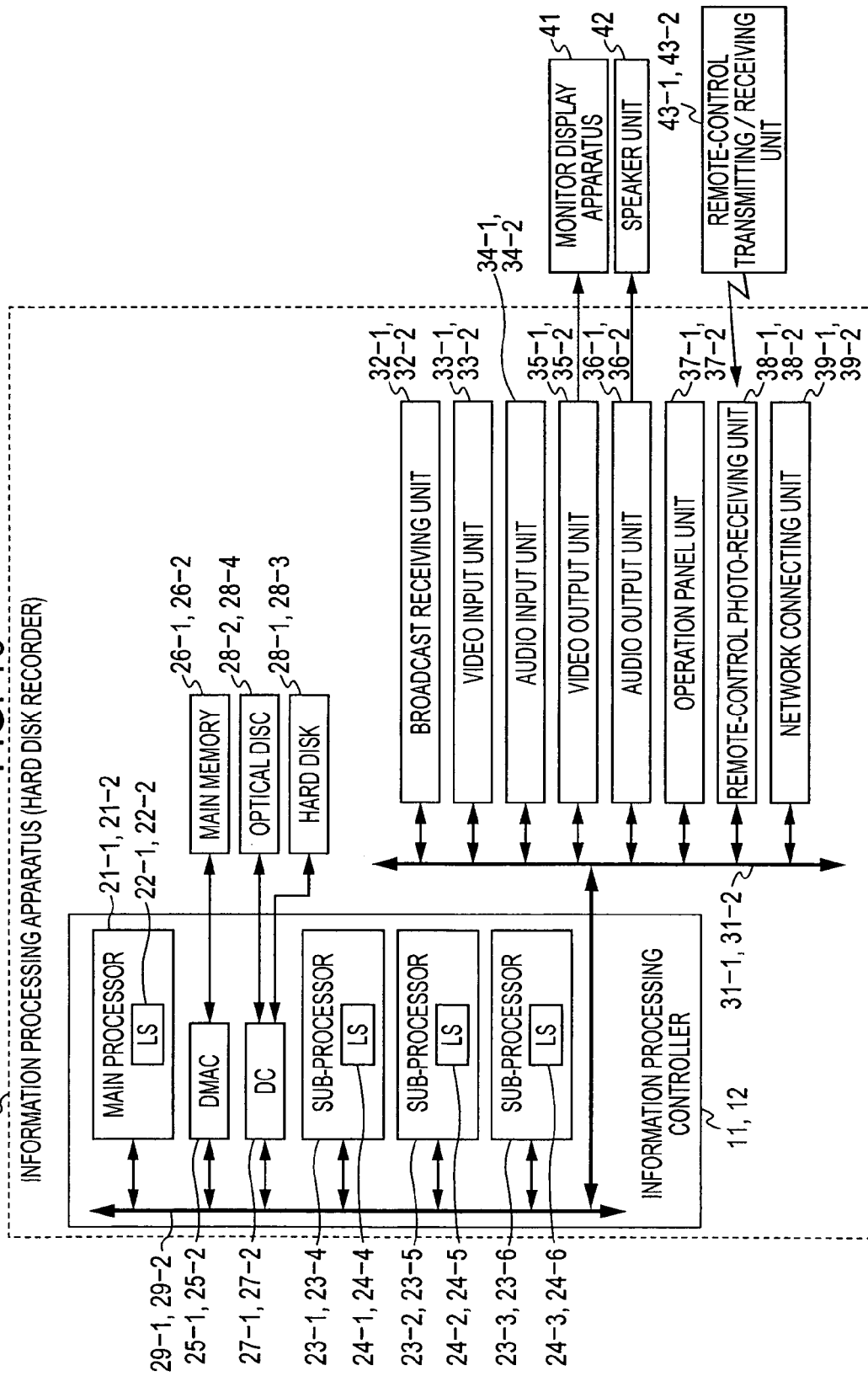

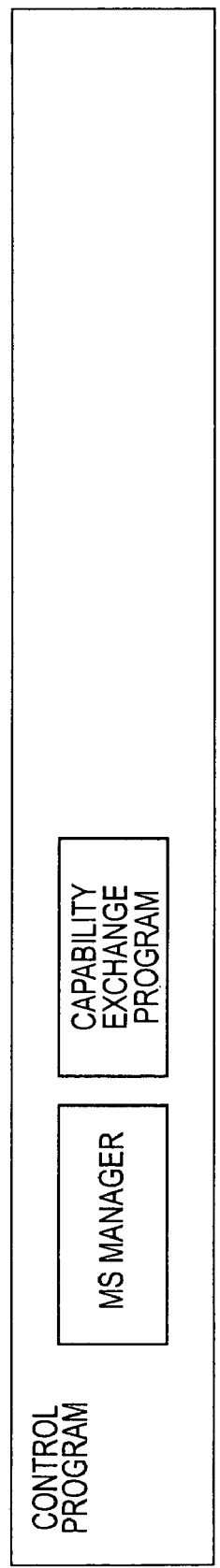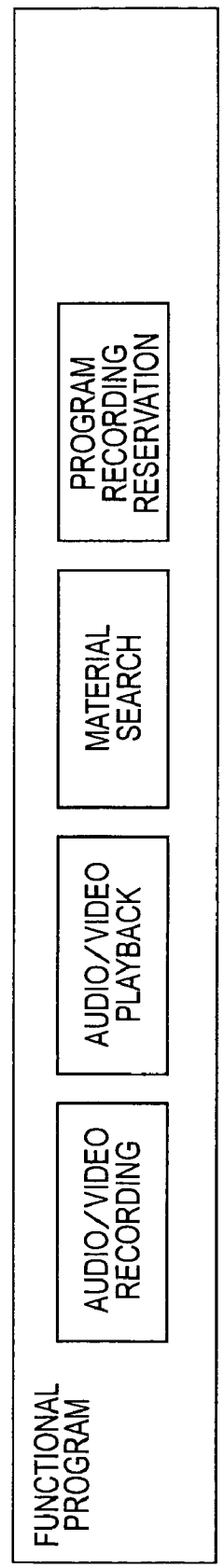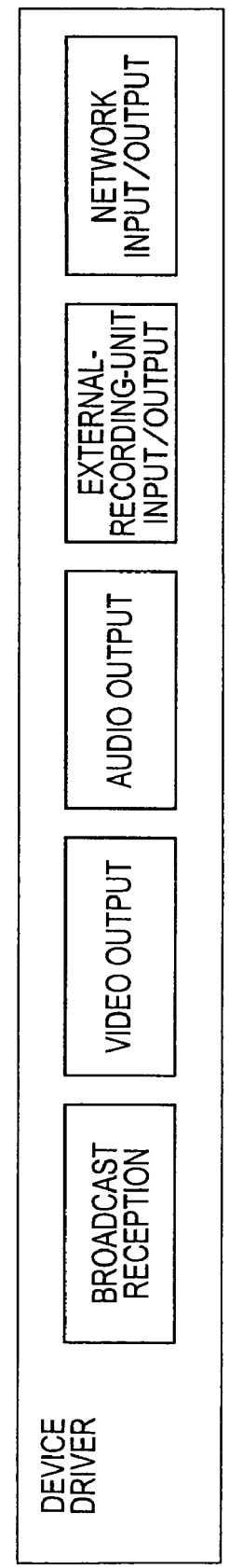

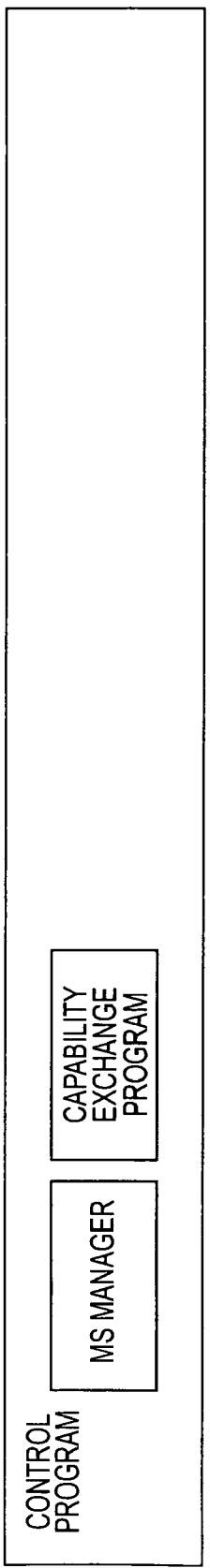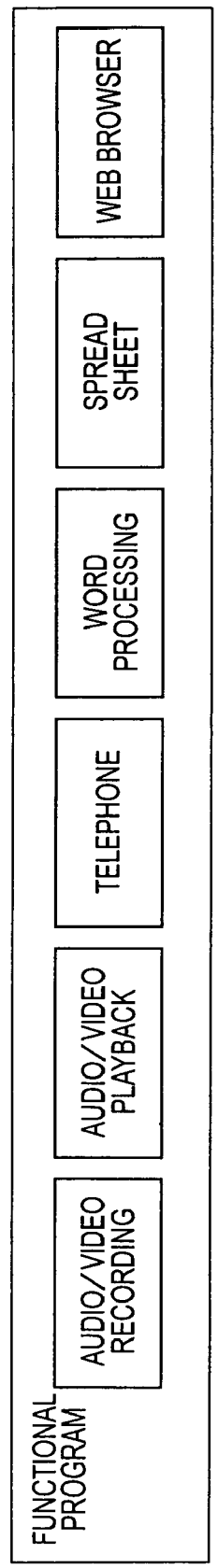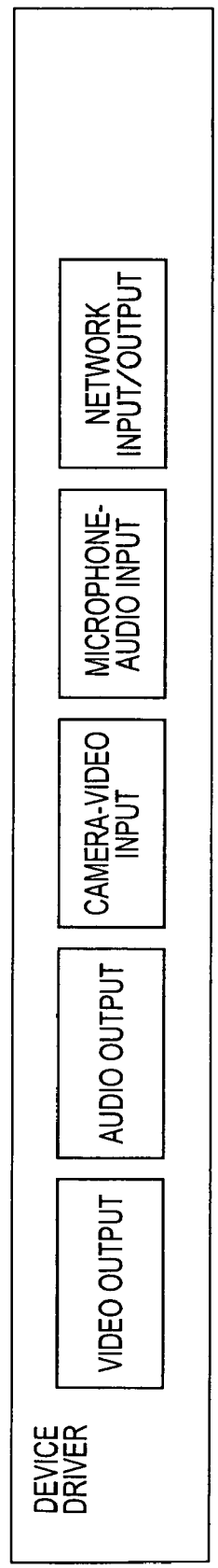

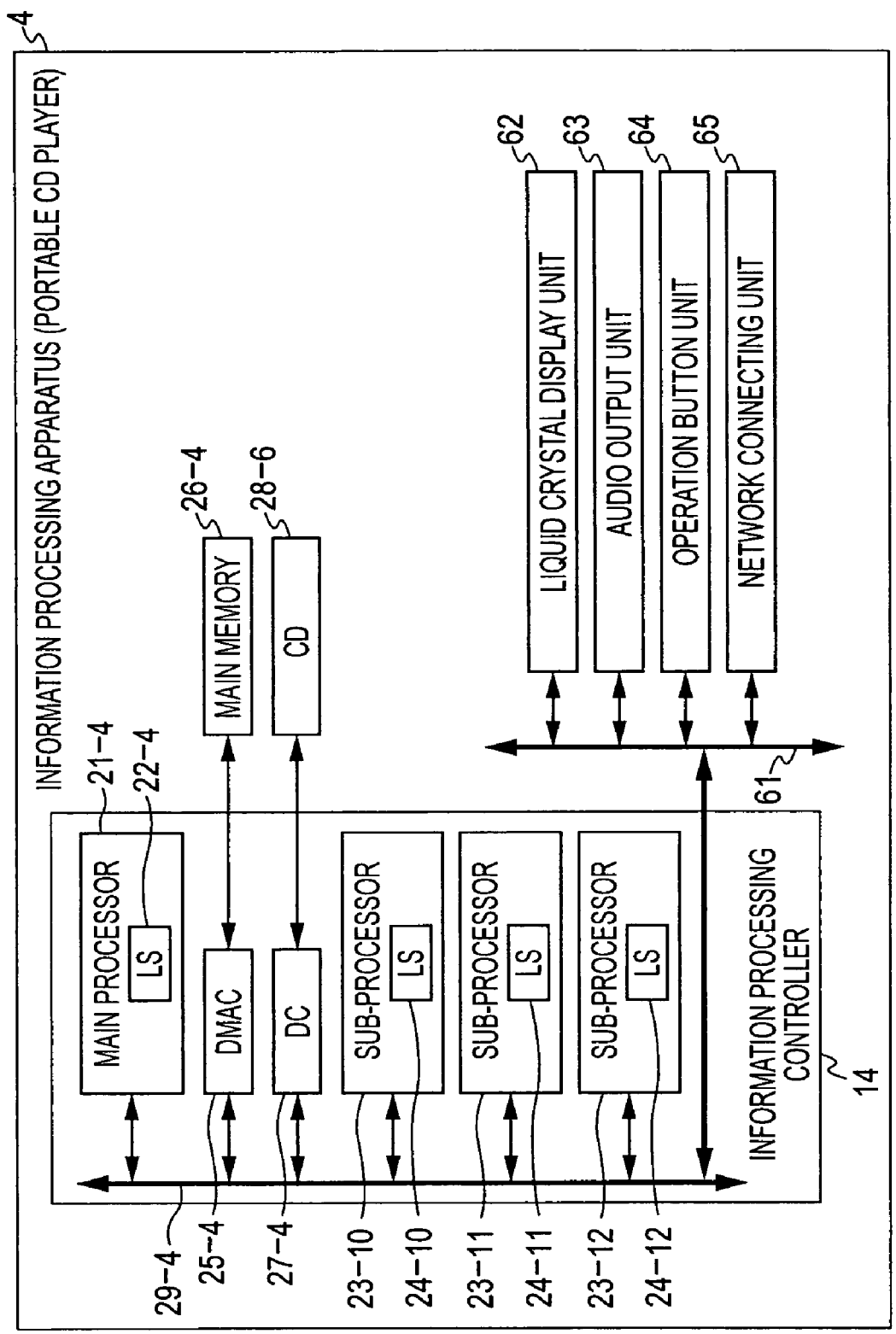

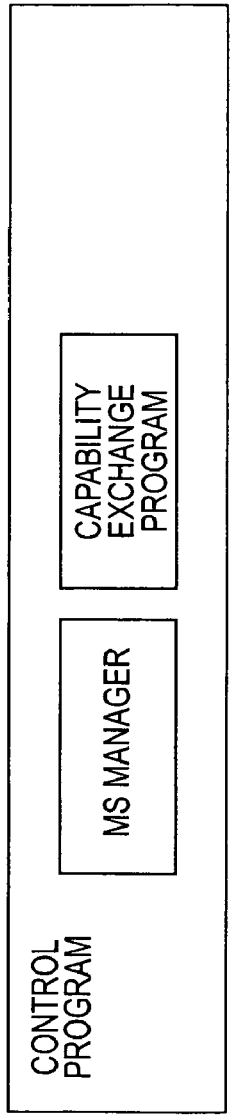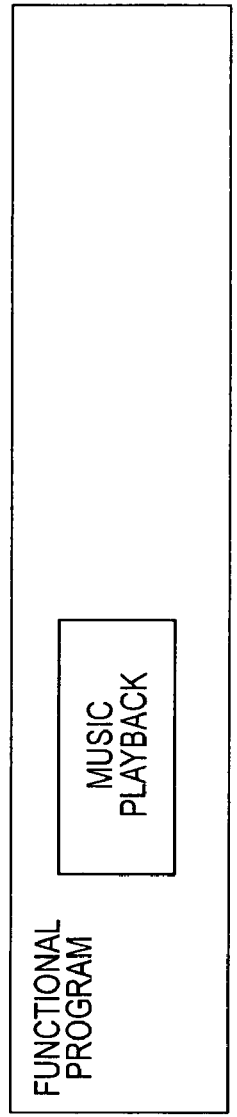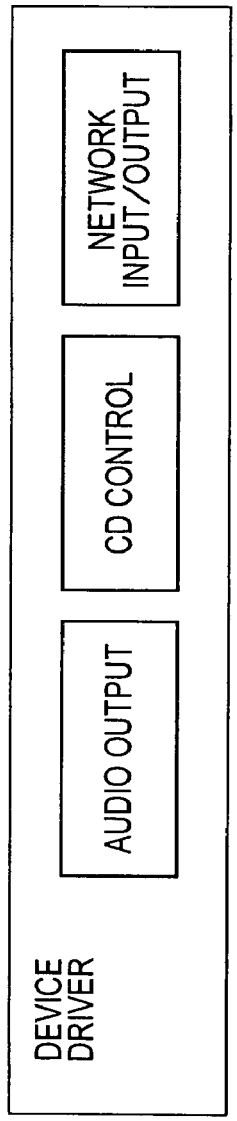

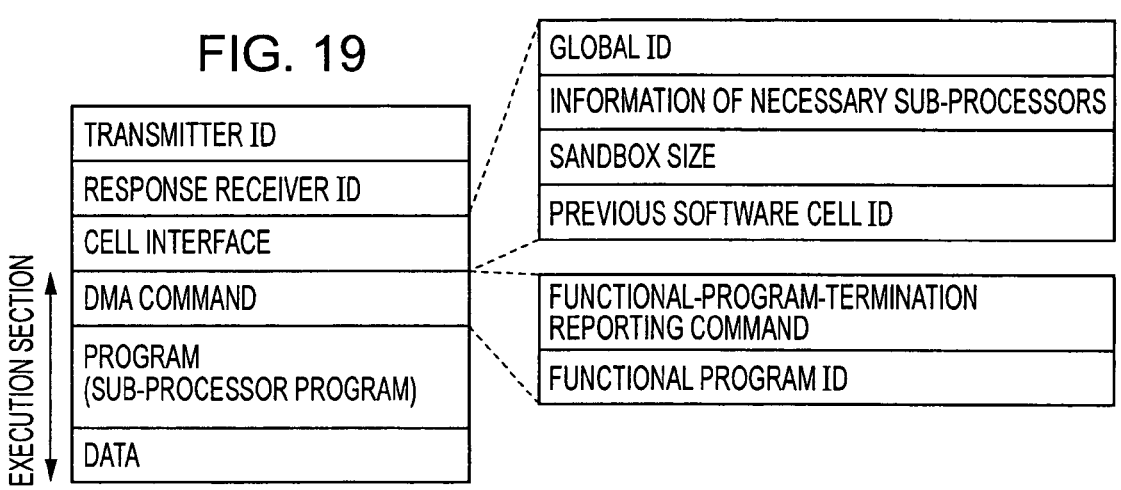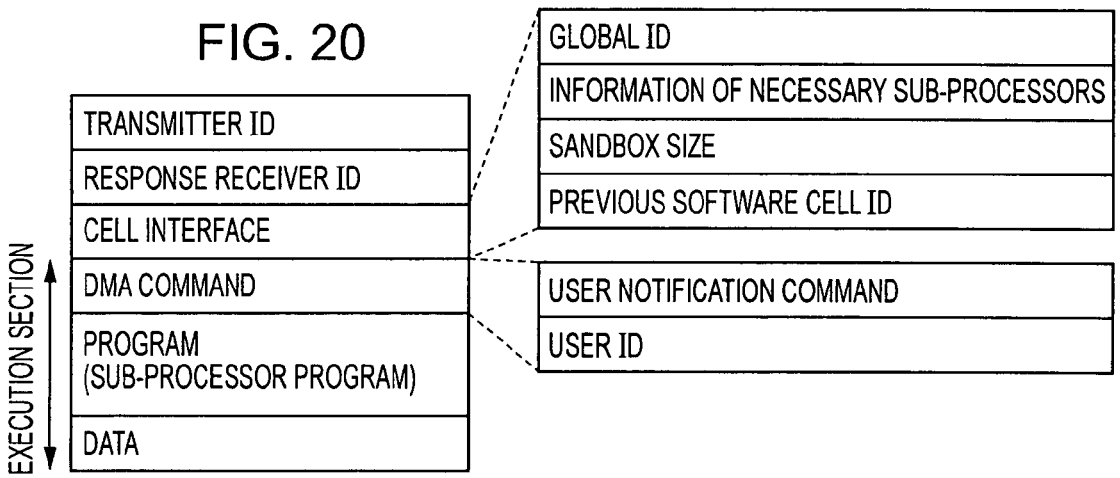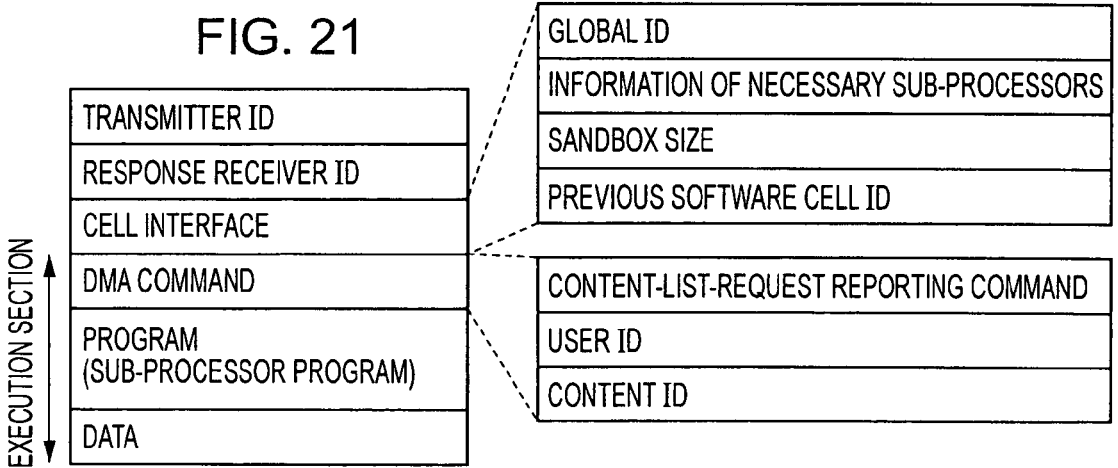

INFORMATION PROCESSING SYSTEM, INFORMATION PROCESSING METHOD, AND COMPUTER PROGRAM USED THEREWITH

CROSS REFERENCES TO RELATED APPLICATIONS

The present invention contains subject matter related to Japanese Patent Application JP 2004-212330 filed in the Japanese Patent Office on Jul. 20, 2004, the entire contents of which are incorporated herein by reference.

BACKGROUND OF THE INVENTION

1. Field of the Invention

The present invention relates to information processing systems and information processing methods that link the operation of two or more network-connected information processing apparatuses, and to computer programs used with the systems and methods. In particular, the present invention relates to an information processing system and information processing method in which a plurality of network-connected information processing apparatuses cooperatively operate to perform distributed processing, whereby the information processing apparatuses operate as a virtual information processing apparatus, and to a computer program used with the system and method.

More specifically, the present invention relates to an information processing system and information processing method which grasp the surplus processing capability of a virtual information processing apparatus including a plurality of network-connected information processing apparatuses, and which perform distributed processing on a function, whose implementation is ordered by one network-connected information processing apparatus, and to a computer program used with the system and method. In particular, the present invention relates to an information processing system having a function of automatically performing data processing, which matches user's preferences, by using the surplus processing capability of a virtual information processing apparatus including a plurality of network-connected information processing apparatuses, and to an information processing method therefor and a computer program used the system and method.

2. Description of the Related Art

It is known that, by using a network to connect a plurality of computers to one another, sharing of information resources, sharing of hardware resources, and collaboration among a plurality of users are realized. Regarding connecting media between computers, there are various types such as a local area network (LAN), a wide area network (WAN), and the Internet.

In particular, recently, technologies of computers, networks, etc., have become greatly widespread even in general households. Information equipment such as in-house personal computers and personal digital assistants (PDAs), audio/video (AV) equipment such as television receivers and video players, various types of home information appliances, consumer electronics (CE) equipment, etc., are connected to one another by a home network. In many cases, this home network is connected to an external wide area network such as the Internet through a router.

Although, as described above, a utilization form in which a plurality of AV devices are connected to a home network is assumed, this form has a problem in that there is no sufficient linkage among the AV devices.

On this problem, recently, research and development concerning grid computing for realizing high calculation performance in order to link devices on a network have been advanced (see, for example, Japanese Unexamined Patent Application Publication Nos. 2002-342165, 2002-351850, 2002-358289, 2002-366533, and 2002-366534).

According to the grid computing technology, a plurality of information processing apparatuses on a network can cooperatively operate to perform distributed processing, whereby they can operate for a user as a virtual information processing apparatus.

For example, when a plurality of information processing apparatuses having recording reservation functions are connected to a network, they can realize cooperative operation for recording reservation. Specifically, when the information processing apparatuses mutually link the recording reserving operation thereof via the home network, they operate as a virtual recorder on the home network. In addition, by using a user interface of one of the information processing apparatuses, a user can use an arbitrary apparatus connected to the home network to perform recording reservation. For example, the information processing apparatuses exchange schedule information such as their recording reservations, and a graphical user interface (GUI) of any of them displays, in merged form, information of all programs reserved for recording, whereby operability is improved when the user sets the recording reservation.

Furthermore, by linking their recording reservation functions, programs (so-called "counterprograms") having the same time at which recording is reserved can be simultaneously recorded. For example, when a plurality of programs need to be reserved for recording at the same time, by using the GUI of a particular information processing apparatus, a recording reservation status of another information processing apparatus and a free area of an external recording unit can be confirmed, and recording reservation of still another information processing apparatus can be set.

Similarly, by linking the recorded-content playback operation of a plurality of apparatuses, simultaneous and synchronized playback of content can be realized. By using the linkage of the recorded-content playback operation to simultaneously and synchronously advance playback of pieces of content recorded by different apparatuses, the concept of channel switching can be introduced in content playback.

According to such a virtual information processing apparatus, even if it is difficult for only the hardware resources and processing capability of a single information processing apparatus to comply with a request from a user, by utilizing the surplus processing capability of another information processing apparatus, which is linked to cooperatively operate on the network, the virtual information processing apparatus can meet the user's request. Furthermore, a service that is not realistic with a normal information processing apparatus can be realized.

It is considered that, when users perform data processing by using information processing apparatuses, regarding types of data processing requested and parameters for use, preferences differ for each user. For example, although various types of data processing, such as image-quality improvement in which a user edits content to have preferred quality, and re-encoding that re-encodes content encoded in an encoding system into content in another encoding system, can be used for original content, each type of data processing used by each user reflects a user's preference.

However, filtering and re-encoding for performing image quality improvement of content is data processing that needs high processing capability. Accordingly, it is necessary to confirm availability of system resources, and it is necessary to set a parameter for use in order to obtain content having preferred quality. Such data processing is time-consuming.

Furthermore, in cases such as a case in which a user wishes to perform similar data processing on plural pieces of content, it is obvious that the amount of operation, on each piece of content, needed by the user, is huge.

In addition, in general, data processing on the pieces of content needs a large number of arithmetic operations, so that a large load acts on the resources. Therefore, starting data processing in response to a request from the user may cause an adverse effect, on the entire system, such as a case in which, during the data processing, the response of other processing is delayed.

For example, a content recommending system (see, for example, Japanese Unexamined Patent Application Publication No. 2003-233622) has been proposed in which an arithmetic operation load is small and which recommends content in accordance with the probability of polarization of user's preferences. This system includes a content feature value database for storing feature values including attribute values of one or more attributes associated with pieces of content, an attribute emphasis-factor database for storing emphasis factors of user attributes, and an attribute-value-emphasis-factor database for storing emphasis factors of plural attribute values of the user attributes, and, in this system, search conditions concerning a feature value are determined based on the emphasis factor of each attribute and the emphasis factor of each attribute value, and a piece of content to be recommended is selected based on the search conditions.

However, there is a possibility that content reflecting detailed user's preferences does not originally exist.

SUMMARY OF THE INVENTION

It is desirable to provide an information processing system and information processing method in which a plurality of network-connected information processing apparatuses cooperatively operate to perform distributed processing, whereby they suitably operates as a virtual information processing apparatus, and a computer program used with the system and method.

It is further desirable to provide an information processing system and information processing method that grasp the surplus processing capability of a virtual information processing apparatus including network-connected information processing apparatuses, or perform distributed processing of a function, whose implementation is ordered by one information processing apparatus, and a computer program used with the system and method.

It is desirable to provide an information processing system and information processing method which perform automatic data processing, which matches a user's preference, by using surplus processing capability of a virtual information processing apparatus including network-connected information processing apparatuses, and a computer program used with the system and method.

It is further desirable to provide an information processing system and information processing method which learn user's preferences from content used by a user and types of processing requested by the user, and which automatically perform high-load data processing, such as image quality improvement and re-encoding of content, by utilizing a time in which resources are free, and a computer program used with the system and method.

According to an embodiment of the present invention, there is provided an information processing system for using data processing for content. The system includes a preference-data management means for managing user's preferences concerning types of the data processing which are used for the content, a content generating means for generating content by using a user-preferred type of the data processing for the content, a content storage means for storing the content as original content and the content generated by the content generating means, and a resource management means for managing system resources, and requesting the content generating means to process the content in response to availability of the system resources.

The above term "system" means a logical set of plural apparatuses (or functional modules that realize specific functions), and particularly has no relationship with a state in which the apparatuses and functional modules are located in a single housing.

According to an embodiment of the present invention, network-connected information processing apparatuses cooperatively operate to perform distributed processing, whereby they can operate as a virtual information processing apparatus.

In an information processing system of the above type, on multimedia content used as original content, a user can perform various types of data processing such as image-quality improvement in which a user edits content to have preferred quality, and re-encoding that re-encodes content encoded in an encoding system into content in another encoding system.

However, since the above types of data processing need high processing capability, it is necessary to confirm availability of system resources, and it is necessary to set a parameter for use in order to obtain content having preferred quality. Such data processing is time-consuming.

Accordingly, in an information processing system according to an embodiment of the present invention, a mechanism in which high load data processing, such as content picture-quality improvement and re-encoding, is automatically performed using a time in which the resources are free is employed. Furthermore, user's preferences are learned from content the user uses and data processing adapted for the user's preferences is automatically performed.

In other words, the resource management means may manage system resources, and may requests the content generating means to process the content in accordance with availability of the resources. In response thereto, the content generating means may automatically generate plural pieces of content for one original piece of content by using plural patterns of parameters. These pieces of content are displayed for the user, and preference information concerning data processing of the user is learned based on content preferred by the user and a type of data processing requested by the user. Accordingly, user's preferences can be reflected by data processing used when the content is generated and parameter used therefor.

The information processing system according to the above embodiment of the present invention may further include a user-operation means for selecting content. Based on a type of data processing used for the content selected by the user-operation means, the preference-data management means may learn user-preference information.

In accordance with a number of times that the user selects each type of the data processing, the preference-data management means may calculate, for each of users, the weight of the type of the data processing. Based on the weight of the type of the data processing, the content generating means may select one type of the data processing which is used for the content.

Each type of the data processing may have at least one parameter which is to be set when the type of the data processing is used for the content. In this case, in accordance with a number of times that the one parameter is selected in the type of the data processing, the preference-data management means may calculate the weight of the one parameter for each of the users. When using the type of the data processing for the content, the content generating means may determine at least one parameter for use based on the weight of the one parameter.

The content storage means may manage the original content and the content generated by the type of the data processing so that both are associated with each other. When the user requests erasure of a piece of content, the piece of content and pieces of content generated based on the piece of content may be erased. In other words, the user erases certain original content, a large number of pieces of content automatically generated based on the original content are automatically erased. Thus, the need of the user to erase the pieces of content one by one is eliminated.

According to another embodiment of the present invention, there is provided a computer program in computer-readable form for allowing a computer system to processing for using data processing for content. The computer program includes the steps of managing user's preferences concerning types of the data processing which are used for the content, generating content by using a user-preferred type of the data processing for the content, storing the content as original content and the content generated in the step of generating the content, and managing system resources, and requesting the data processing for the content by activating the step of generating the content in response to availability of the resources.

The computer program according to the embodiment of the present invention is a definition of a computer program described in computer-readable form so as to realize predetermined processing on a computer system. In other words, by installing the computer program according to the embodiment of the present invention into the computer system, the computer system has cooperative operation and can obtain operation and advantages similar to those in the information processing system according to the embodiment of the present invention.

According to an embodiment of the present invention, an information processing system and information processing method in which a plurality of network-connected information processing apparatuses cooperatively operate to perform distributed processing, whereby they suitably operates as a virtual information processing apparatus, and a computer program used with the system and method are provided.

In addition, according to an embodiment of the present invention, an information processing system and information processing method which perform automatic data processing, which matches a user's preference, by using surplus processing capability of a virtual information processing apparatus including network-connected information processing apparatuses, and a computer program used with the system and method are provided.

According to an embodiment of the present invention, data processing on plural patterns based on certain content can be automatically executed while confirming availability of resources. Thus, the need of a user to perform manual data processing is eliminated.

In addition, when a user erases certain content, a large number of pieces of content automatically generated based on the erased content can be automatically erased in conjunction therewith. Thus, the need of the user to eliminate the pieces of content one by one is eliminated.

In addition, in the case of generating plural patterns of content based on some content, by performing data processing, which matches user's preferences, with a user-preferred parameter, a possibility that, when the user requests preferred content, the content has already been generated is increased, so that a response to a user's request is improved.

Furthermore, when the genre of content is identified and data processing preferred by a user is identified based on the genre of the content, it is expected that, by weighting the data processing beforehand, automatic generation of the user-preferred content can be facilitated.

Features and advantages of embodiments of the present invention become apparent by a more detailed description based on the following embodiments of the present invention and the accompanying drawings.

BRIEF DESCRIPTION OF THE DRAWINGS

FIGS. 2A, 2B, and 2C are illustrations of accessing a main memory 24 by a sub-processor 23;

FIG. 5 is a block diagram showing a state in which a plurality of information processing apparatuses operate as a virtual information processing apparatus;

FIG. 7 is a block diagram showing a state in which four information processing apparatuses operate as a virtual information processing apparatus;

FIG. 10 is a block diagram showing the configuration of the hard disk recorder shown in FIG. 9;

FIGS. 11A, 11B, and 11C are illustrations of the software configuration of the hard disk recorder shown in FIG. 9;

FIGS. 13A, 13B, and 13C are illustrations of the software configuration of the PDA shown in FIG. 9;

FIG. 14 is a block diagram showing the hardware configuration of the portable CD player shown in FIG. 9;

FIGS. 15A, 15B, and 15C are illustrations of the software configuration of the portable CD player shown in FIG. 9;

FIG. 19 is an illustration of the configuration of a functional-program-termination reporting command;

FIG. 20 is an illustration of the configuration of a user notification command;

FIG. 21 is an illustration of the configuration of a content-list-request reporting command;

DESCRIPTION OF THE PREFERRED EMBODIMENTS

Details of embodiments of the present invention are described below with reference to the accompanying drawings.

A. System Configuration

In an embodiment of the present invention, by suitably linking the operation of at least two information processing apparatuses via a home network, a recording reserving operation in each apparatus, which is installed in a different place, is facilitated and made more efficient. In order to link apparatuses on a network, grid computing technology for realizing high calculation performance by cooperative operation of apparatuses is utilized.

Figure 1:
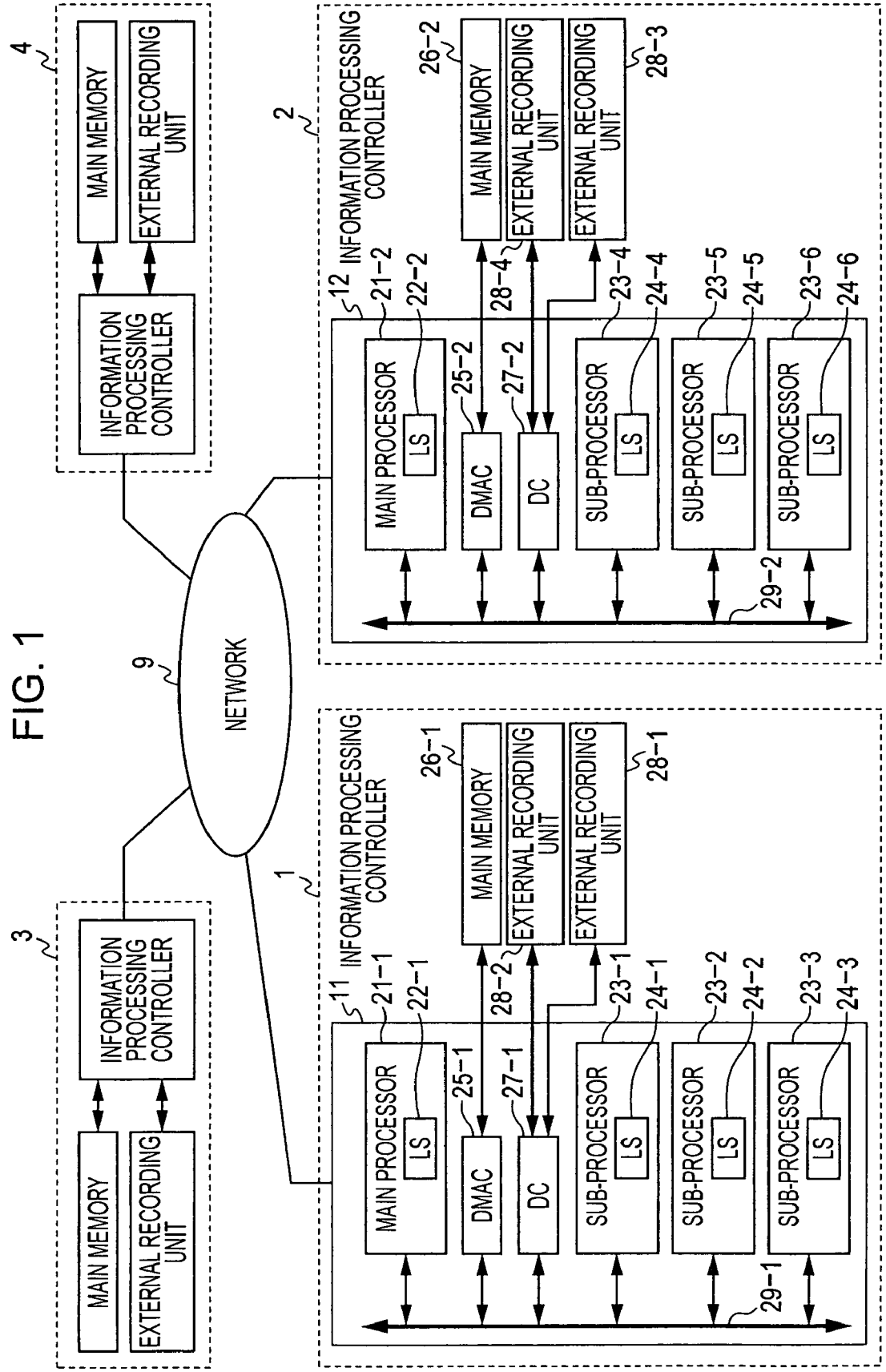
FIG. 1 is a block diagram showing the configuration of a network system according to an embodiment of the present invention.

FIG. 1 shows the schematic configuration of a network system formed by applying grid computing.

The shown network is the Internet or a wide area network. The wide area network is formed by a private network such as a LAN connected via a gateway, or a home network. The home network can be physically formed by a standard network interface such as 10BASE-T, 100BASE-TX, or Giga Ethernet. In addition, as a mechanism for one apparatus to detect another, UPnP (Universal Plug&Play) can be used. According to UPnP, network-connected apparatuses exchange definition files described in XML (eXtensible Markup Language) form, and perform mutual authentication after performing an addressing process, a discovering process, and a service requesting process. Alternatively, also by broadcasting packets describing predetermined apparatus information in the same segment, the above processes can be realized.

A plurality of information processing apparatuses are connected to a network. Examples of the information processing apparatuses include AV apparatuses, such as DVD recorders and HD recorders, having recording media loaded therein and recording reservation functions, playback-only AV apparatuses, such as compact disc players, having no recording functions, or information processing apparatuses of another type. In addition, other examples of the information processing apparatuses include calculation processing systems such as PDAs and personal computers. In the case shown in FIG. 1, a plurality of information processing apparatuses 1, 2, 3, and 4 are connected to one another by a network 9.

A-1. Information Processing Apparatus and Information Processing Controller

The information processing apparatuses 1, 2, 3, and 4 are, for example, AV apparatuses and portable apparatuses (described later) of various types.

As shown in FIG. 1, the information processing apparatus 1 includes an information processing controller 11 as a computer function unit. The information processing controller 11 includes a main processor 21-1, sub-processors 23-1, 23-2, and 23-3, a direct memory access controller (DMAC) 25-1, and a disc controller (DC) 27-1. It is preferable that the information processing controller 11 be formed as a single-chip integrated circuit (IC).

The main processor 21-1 performs schedule management of program execution (data processing) by the sub-processors 23-1, 23-2, and 23-3, and overall management of the information processing controller 11 (the information processing apparatus 1). However, the main processor 21-1 can be formed so that a program other than a program for management therein can operate. In this case, the main processor 21-1 also functions as a sub-processor. The main processor 21-1 includes a local storage (LS) 22-1.

Although the number of sub-processors in one information processing controller may be one, it is preferably plural. The case shown in FIG. 1 shows that the number of sub-processors is plural. Under the control of the main processor 21-1, the sub-processors 23-1, 23-2, and 23-3 execute programs in parallel and independently to process data. In addition, depending on circumstances, a program in the main processor 21-1 can operate, with it linked to a program in each of the sub-processors 23-1, 23-2, and 23-3. The sub-processors 23-1, 23-2, and 23-3 also include LSs 24-1, 24-2, 24-3.

The DMAC 25-1 can access programs and data stored in a main memory 26-1 including a dynamic RAM (DRAM) connected to the information processing controller 11 without using any processor. The DC 27-1 controls the operation of accessing external recording units 28-1 and 28-2 connected to the information processing controller 11.

The external recording units 28-1 and 28-2 may have any of a fixed disk (hard disks) form and a removable disk form. In addition, as removable disks, various types of recording media, such as magneto-optical discs, optical discs such as CD±RW and DVD±RW, memory disks, static RAMs (SRAM), and ROMs, can be used. The DC 27-1 is a disk controller, and is, in short, an external recording unit controller. As shown in FIG. 1, the information processing controller 11 can be formed so as to connect to a plural number of external recording units 28.

The main processor 21-1, the sub-processors 23-1, 23-2, and 23-3, the DMAC 25-1, and the DC 27-1 are connected to one another by a bus 29-1.

An identifier that can uniquely identify, in the entirety of the network, one information recording apparatus 1 including an information processing controller 11 is assigned as information-processing-apparatus ID to the information processing controller 11. In addition, identifiers for identification are similarly assigned as main processor ID and sub-processor ID to the main processor 21-1 and the sub-processors 23-1, 23-2, and 23-3.

Other information processing apparatuses 2, 3, and 4 are not described here since there have similar configurations. Here, units denoted by reference numerals whose main-parts are identical identically function unless otherwise noted, even if the sub-parts of the reference numerals differ. In addition, in the following description, when sub-parts of reference numerals are omitted, a difference in sub-part does not cause any difference.

A-2. Accessing of Main Memory by Each Sub-Processor

As described above, each sub-processor 23 in one information processing controller 11 processes data by separately executing a program. When different sub-processors simultaneously read or write data in the same area of the main memory 26, inconsistency of data can occur. Accordingly, access from the sub-processor 23 to the main-memory 26 is performed in the following process.

FIG. 2A shows locations in the main-memory 26. As shown in FIG. 2A, the main-memory 26 includes memory locations designating a plurality of addresses. Additional segments for storing data status information are assigned to the memory locations. Each additional segment includes an F/E bit, sub-processor ID, and an LS (local storage) address. In addition, an access key (described later) is assigned to each memory location. The F/E bit is defined as described below.

When the F/E bit=0, this value indicates that it is difficult to read stored data since the data is in process and is being read, or the data is invalid data that is not the latest data due to a free state. In addition, when the F/E bit=0, it is indicated that data can be written in the memory location. After the data is written, the F/E bit is set to 1.

When the F/E bit=1, this value indicates that data in the memory location has not been read by the sub-processor 23 and is the latest data that is unprocessed. The data in the memory location is readable and is set to zero after being read by the sub-processor 23. In addition, when the F/E bit=1, the value indicates that data writing in the memory location is not allowed.

In addition, in the above state in which the F/E bit=0 (inability to read data/ability to write data), reservation of reading from the memory location can be set. When reservation of reading is set for a memory location in which its F/E bit=0, the sub-processor 23 writes, in an additional segment of the memory location for which reading is reserved, as reading reservation information, the sub-processor ID and LS address of the sub-processor 23.

After that, when one sub-processor 23, which reads data, writes data in the memory location for which reading is reserved, and sets the memory location so that the F/E bit=1 (ability to read data/inability to write data), the data is read correspondingly to the sub-processor ID and LS address written beforehand as reading reservation information in the additional segment.

When it is necessary to process data in plural stages by using a plurality of sub-processors, as described above, by controlling reading/writing of data in each memory location, immediately after the sub-processor 23, which performs pre-processing, writes processed data at a predetermined address in the main-memory 26, another sub-processor 23, which performs post-processing, can read the pre-processed data.

In addition, FIG. 2B shows memory locations in an LS 24 in each sub-processor 23. As shown in FIG. 2B, the LS 24 in the sub-processor 23 includes memory locations that can designate a plurality of addresses. Similarly, additional segments are assigned to the memory locations. Each additional segment includes a busy bit.

When the sub-processor 23 loads data in the main-memory 26 into a memory location of the LS 24 of itself, it sets a corresponding busy bit to one for reservation. In a memory location having a busy bit of one, storing of other data is not allowed. After the data is loaded into the memory location of the LS 24, the busy bit is set to zero, so that the memory location can be used for an arbitrary purpose.

As shown in FIG. 2A, the main-memory 26, which is connected to each information processing controller, includes a plurality of sandboxes defining areas in the main-memory 26. The main-memory 26 includes a plurality of memory locations and the sandboxes are sets of the memory locations. Each sandbox is assigned for each sub-processor 23, and the corresponding sub-processor can exclusively use the sandbox. In other words, although each sub-processor 23 can use a sandbox assigned to itself, it is unable to access data beyond this area.

Furthermore, to realize exclusive control of the main-memory 26, the key management table shown in FIG. 2C is used. The key management table is stored in a relatively high-speed memory such as an SRAM in the information processing controller and is associated with the DMAC 25. Each entry of the key management table includes a sub-processor key and a key mask.

A process in which the sub-processor 23 uses the main-memory 26 is as follows. At first, the sub-processor 23 outputs a reading or writing command to the DMAC 25. This command includes the sub-processor ID of the sub-processor 23 and an address in the main-memory 26, whose use is requested.

The DMAC 25 refers to the key management table before executing this command and checks the sub-processor key of the sub-processor 23, which requests the use of the DMAC 25. Next, the DMAC 25 compares the checked sub-processor key of the sub-processor 23, which requests the use of the DMAC 25, and an access key assigned to a memory location (in FIG. 2A) in the main-memory 26, whose use is requested. Only when two keys match each other does the DMAC 25 execute the above command.

Regarding each key mask on the key management table shown in FIG. 2C, an arbitrary bit of the key mask is set to one, whereby a corresponding bit of the sub-processor associated with the key mask can be set to zero or one.

For example, it is assumed that a sub-processor key is 1010. Normally, by using this sub-processor key, a sandbox having an access key of 1010 can be only accessed. However, when a key mask associated with this sub-processor key is set to 0001, for only a digit in which the bit of the key mask is set to one, determination of coincidence between the sub-processor key and the access key is masked, and, by using this sub-processor key of 1010, a sandbox having an access key of 1010 or 1011 can be accessed.

As described above, exclusivity of the sandboxes in the main-memory 26 is realized. In other words, when it is necessary to process data in plural stages by using a plurality of sub-processors in one information processing controller, only one sub-processor, which performs pre-processing, and one sub-processor, which performs post-processing, can access a predetermined address in the main-memory 26, whereby data can be protected.

This exclusive memory control can be used, for example, as follows. In the beginning, immediately after the information processing apparatus starts, the values of key masks are all zeroes. A program in the main processor 21 is executed to operate in a form linked to a program in the sub-processor 23. When it is necessary to perform temporarily storing, in the main memory 26, processed data output from a first sub-processor, and inputting the processed data to a second sub-processor, a corresponding main memory area naturally needs to be capable of being accessed by either sub-processor. In this case, by changing the value of the key mask to an appropriate value, and providing a main memory area capable of being accessed by a plurality of sub-processors 26, the program in the main memory 26 enables multistage sub-processor processing.

More specifically, when multistage processing is performed in a process that performs receiving data from another information processing apparatus, processing by the first sub-processor, using a first main memory area, processing by a second sub-processor, and using a second main memory area, it is difficult for the second sub-processor to access the first main memory area, with the following settings unchanged:
the sub-processor key of the first sub-processor: 0100;
the access key of the first main memory area: 0100;
the sub-processor key of the second sub-processor: 0101; and
the access key of the second main memory area: 0101.

Accordingly, by setting the key mask of the second sub-processor to 0001, the second sub-processor is enabled to access the first main memory area.

A-3. Generation and Configuration of Software Cell

In the network system shown in FIG. 1, for distributed processing by the information processing apparatuses 1, 2, 3, and 4, software cells are transmitted among them. In other words, the main processor 21 included in an information processing controller in one information processing apparatus can distribute processing by generating software cells including commands, programs, and data, and transmitting the cells to other information processing apparatuses via the network.

Figure 3:
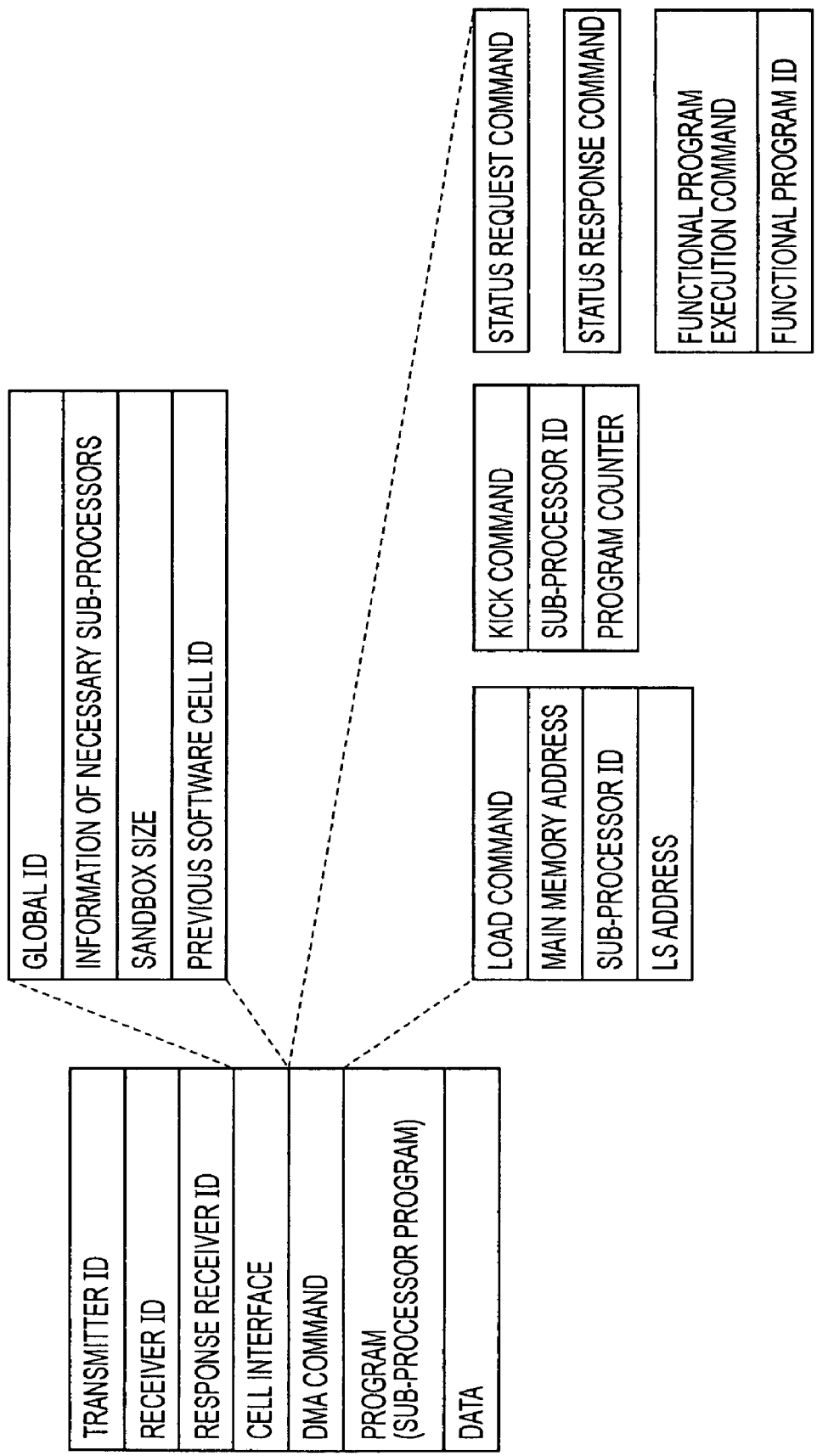
FIG. 3 is an illustration of an example of the configuration of a software cell.

FIG. 3 shows an example of the configuration of a software cell. The shown software cell includes a transmitter ID, a receiver ID, a response receiver ID, a cell interface, a DMA command, a program, and data.

The transmitter ID includes the network address of an information processing apparatus, which transmits the software cell, the information-processing-apparatus ID of an information processing controller in the information processing apparatus, and the identifiers (a main processor ID and a sub-processor ID) of a main processor and each sub-processor 23 in the information processing controller in the information processing apparatus.

Each of the receiver ID and the response receiver ID includes similar information concerning an information processing apparatus, which receives the software cell, and an information processing apparatus, which receives a response of the result of executing the software cell.

The cell interface is information necessary for using the software cell, and includes a global ID, necessary sub-processor information, a sandbox size, and a previous software cell ID.

The global ID uniquely identifies the software cell in the entirety of the network, and is created based on the transmitter ID and the date and time of creation or transmission of the software cell.

In the necessary sub-processor information, the number of sub-processors necessary for executing the software cell is set. In the sandbox size, the memory sizes of the main memory 26 and the LS 24 in the sub-processor 23, which are necessary for executing the software cell, are set.

The previous software cell ID is the identifier of a previous software cell in a group of software cells that request sequential execution of streaming data or the like.

An execution section for the software cell includes DMA commands, a program, and data. The DMA commands include a series of DMA commands necessary for starting a program. The program includes a sub-processor program to be executed by the sub-processor 23. The above data is to be processed by a program including the sub-processor program.

In addition, the DMA commands include a load command, a kick command, a functional program execution command, a status request command, and a status response command.

The load command is used to load information in the main memory 26 into the LS 24 in the sub-processor 23, and has a main memory address, a sub-processor ID, and an LS address. The main memory address represents the address of a predetermined area in the main memory 26, from which the information is loaded. The sub-processor ID and the LS address represent the identifier of the sub-processor 23, from which the information is loaded, and an address in the LS 24, respectively.

The kick command is used to initiate program execution, and has a sub-processor ID and a program counter. The sub-processor ID identifies the sub-processor 23 to be kicked, and the program counter gives an address for a program-executing program counter.

The functional program execution command is a command (described later) by which an information processing apparatus requests another information processing apparatus to execute a functional program. Based on a functional program ID (described later), an information processing controller in an information processing apparatus, which receives the functional program execution command, identifies a functional program to be started.

The status response command is used to request transmission of apparatus information concerning the present state (status) of an information processing apparatus designated by the transmitter ID to an information processing apparatus designated by the response receiver ID. The functional program is described later. It is categorized into functional programs in the configuration (shown in FIGS. 6A, 6B, and 6C) of software stored in the main memory 26 in the information processing controller. The functional program is loaded into the main memory 26 and is executed by the main processor 21.

The status response command is a command by which an information processing apparatus, which receives the status request command, responds with its apparatus information to the information processing apparatus designated by a response receiver ID included in the status request command. The status response command is used to store the apparatus information in a data area in the execution section.

Figure 4:
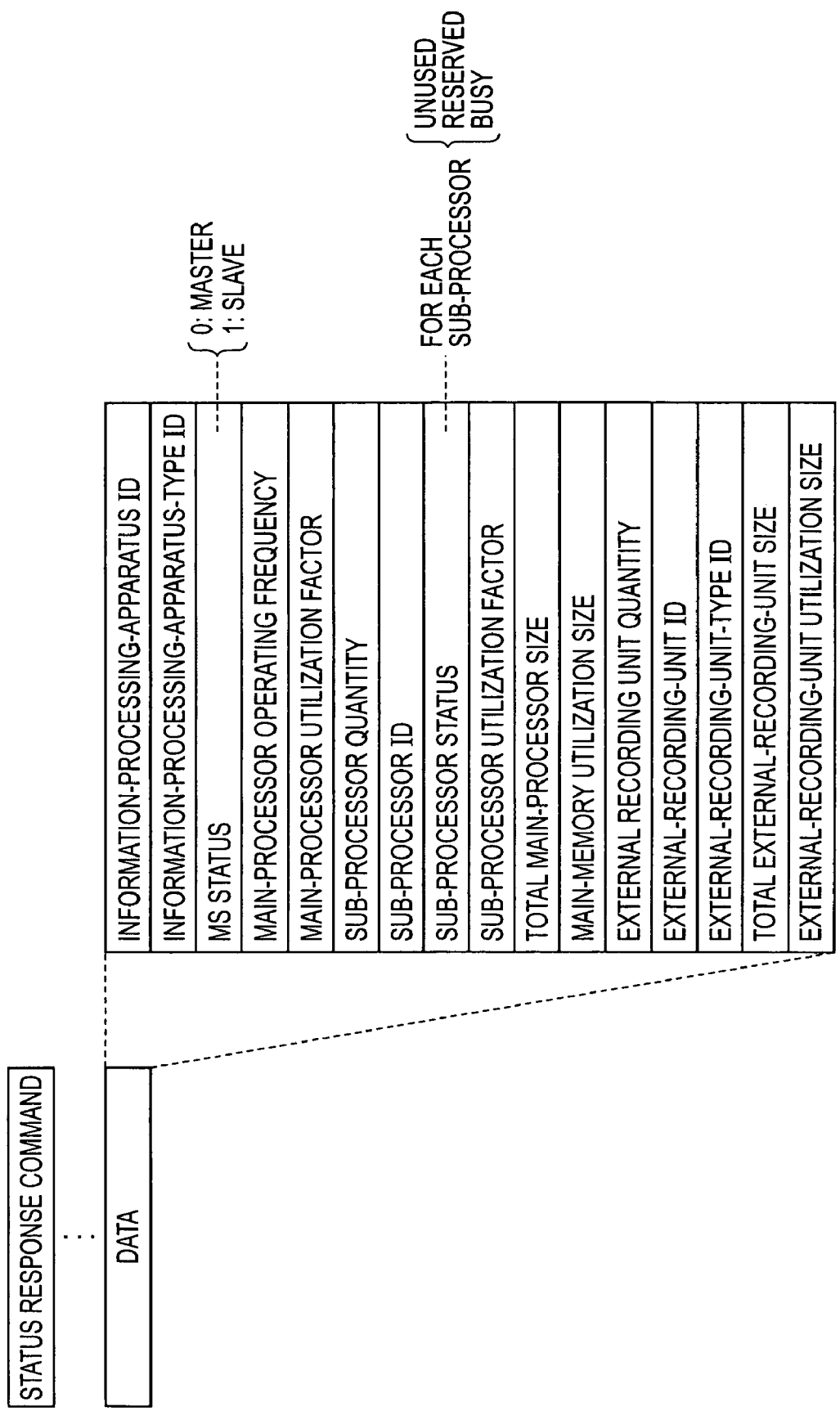
FIG. 4 is an illustration of a data area of a software cell when a DMA command is a status response command.

FIG. 4 shows the structure of a data area in the software cell when a DMA command is a status response command.

The information-processing-apparatus ID is an identifier for identifying an information processing apparatus including an information processing controller, and represents the ID of an information processing apparatus, which transmits a status response command. In a power supply mode, the information-processing-apparatus ID is generated by a main processor 21 included in an information processing controller in the information processing apparatus based on the date and time of the power supply mode, the network address of the information processing apparatus, and the number of sub-processors 23 included in the information processing controller in the information processing apparatus.

An information-processing-apparatus-type ID includes a value representing a feature of the information processing apparatus. The mentioned feature of the information processing apparatus is, for example, a hard disk recorder (described later), a personal digital assistant (PDA), a portable CD (compact disc) player, or the like. In addition, the information-processing-apparatus-type ID may be one that represents a function of the information processing apparatus, such as audio/video recording, audio/video playback, or the like. The value that represents a feature or function of the information processing apparatus is predetermined. By calling an information-processing-apparatus-type ID, the feature and function of the information processing apparatus can be grasped.

An MS (master/slave) status indicates in which of master and slave apparatus modes the information processing apparatus operates, as described above. When the MS status is set to zero, it is indicated that the information processing apparatus operates as a master apparatus. When the MS status is set to one, it is indicated that the information processing apparatus operates as a slave apparatus.

A main-processor operating frequency represents the operating frequency of the main processor 21 in the information processing controller. A main-processor utilization factor represents a rate at which all presently operating programs are used in the main processor 21. The main-processor utilization factor is a value representing a ratio of processing capability in use to the entire processing capability of a corresponding main processor. The main-processor utilization factor is calculated in MIPS (million instructions per second) that is a unit for evaluating processor processing capability, or is calculated based on a processor usage time per unit time. This also applies to a sub-processor utilization factor (described later).

The number of sub-processors represents the number of sub-processors 23 in the information processing controller. A sub-processor ID is an identifier for identifying each sub-processor 23 in the information processing controller.

A sub-processor status represents the status of each sub-processor 23, and the sub-processor 23 has unused, reserved, and busy statuses, etc. The unused status indicates that the sub-processor is not presently used and is not reserved for use. The reserved status indicates that the sub-processor is not presently used and is reserved. The busy status indicates that the sub-processor is presently used.

A sub-processor utilization factor represents a rate at which a program being presently used in the sub-processor, or a program reserved for execution in the sub-processor is used. In other words, the sub-processor utilization factor represents the present utilization factor when the sub-processor status is busy, and represents an estimated utilization factor (of later use of the sub-processor) when the sub-processor status is reserved.

For one sub-processor 23, a set of a sub-processor ID, a sub-processor status, and a sub-processor utilization factor is set, and the number thereof is set for as many as the number of sub-processors 23 in one information processing controller.

A total main-memory size and a memory utilization size respectively represent the total size of the main memory 26, which is connected to the information processing controller, and a size of the main memory 26 which is presently used.

An external recording unit quantity represents the number of external recording units 28 connected to the information processing controller. An external recording unit ID is information that uniquely identifies one external recording unit 28, which is connected to the information processing controller. An external-recording-unit-type ID represents the type (e.g., a hard disk, CD±RW, DVD±RW, a memory disk, SRAM, ROM, or the like) of the external recording unit 28.

A total external-recording-unit size and an external-recording-unit utilization size represent the total size of an external recording unit 28 identified by the external-recording-unit ID, and the size of the external recording unit 28 which is presently used, respectively.

For one external recording unit 28, a set of an external recording unit ID, an external-recording-unit-type ID, a total external-recording-unit size, and an external-recording-unit utilization size is set, and the number thereof is set for as many as the number of the external recording units 28 connected to the information processing controller. In other words, when the external recording units 28 are connected to one information processing controller, different external recording unit IDs are assigned to them, and also external-recording-unit-type IDs, total external-recording-unit sizes, and external-recording-unit utilization sizes are separately managed.

A-4. Execution of Software Cell

The main processor 21 included in an information processing controller in one information processing apparatus generates a software cell having the above-described configuration, and transmits the software cell to another information processing controller and an information processing controller in the apparatus through the network. An information processing apparatus, which transmits the software cell, an information processing apparatus, which receives the software cell, an information processing apparatus, which receives a response, and an information processing controller in each apparatus are respectively identified based on the above transmitter ID, receiver ID, and response receiver ID.

The main processor 21 included in the information processing controller in an information processing apparatus, which receives a software cell, stores the software cell in the main memory 26. In addition, the main processor 21 in an information processing apparatus, which is a receiver, reads the software cell, and processes a DMA command included in the software cell.

Specifically, at first, the main processor 21 in the information processing apparatus, which is a receiver, executes a load command. This loads information from a main memory address specified by the load command into a predetermined area in the LS 24 specified by a sub-processor ID and LS address included in the load command. The information loaded here is a sub-processor program or data included in the received software cell, or other data specified.

Next, the main processor 21 outputs a kick command to a sub-processor specified by sub-processor ID included in the kick command together with a program counter similarly included in the kick command.

The specified sub-processor executes the sub-processor program in accordance with the kick command and the program counter. After storing the result of execution in the main memory 26, the sub-processor notifies the main processor 21 of completion of the execution.

A processor that executes a software cell in an information processing controller in an information processing apparatus, which is a receiver, is not limited to the sub-processor 23, but the main processor 21 can be instructed to execute a main memory program such as a functional program included in the software cell.

In this case, an information processing apparatus, which is a transmitter, transmits, to an information processing apparatus, which is a receiver, a software cell which includes a main memory program and data to be processed by the main memory program, and in which a DMA command is a load command, instead of a sub-processor program. The information processing apparatus, which is a transmitter, stores, in the main memory 26, the main memory program and the data to be processed thereby.

Next, the information processing apparatus as the transmitter, transmits, to the information processing apparatus as the receiver, a software cell which includes a main processor ID concerning the information processing controller in the information processing apparatus as the transmitter, a main memory address, an identifier such as a functional program ID (described later) for identifying the main memory program, and a program counter, and in which a DMA command is a kick command or a functional program execution command, and controls the main processor 21 to execute the main memory program.

As described above, in a network system according to this embodiment, an information processing apparatus as a transmitter transmits, to an information processing apparatus as a receiver, in the form of a software cell, a sub-processor program or main memory program, and controls the sub-processor 23 included in an information processing controller in the information processing apparatus as the receiver to load the sub-processor program, whereby the sub-processor program or the main memory program can be executed by the information processing apparatus as the transmitter.

When the program included in the received software cell is a sub-processor program, the information processing controller in the information processing apparatus as the transmitter controls a sub-processor to load the sub-processor program. In addition, it controls the sub-processor to execute the sub-processor program or main memory program included in the software cell.

Accordingly, in the information processing controller in the information processing apparatus as the receiver, the sub-processor program or main memory program can be automatically executed without operating by the user the information processing apparatus as the receiver.

As described above, when, in an information processing apparatus, its information processing controller includes no main memory program such as a sub-processor program or functional program, the information processing apparatus can acquires the main memory program. In addition, DMA data transfer is performed between sub-processors and the above-described sandboxes are used, whereby, even if it is necessary for one information processing controller to process data in plural stages, the processing can be executed at high speed and with high security.

A-5. Distributed Processing in the Form of Network System

FIG. 5 shows a state in which a plurality of information processing apparatuses operate as one virtual information processing apparatus. As the result of distributed processing by using software cells, as shown in an upper part of FIG. 5, a plurality of information processing apparatuses 1, 2, 3, and 4 that are connected to a network 9 operate as one virtual information processing apparatus 7, as shown in a lower part of FIG. 5. However, to realize the above virtual operation, the following processing needs to be executed in the following configuration.

A-6. Software Configuration of System and Loading of Programs

Figure 6A:
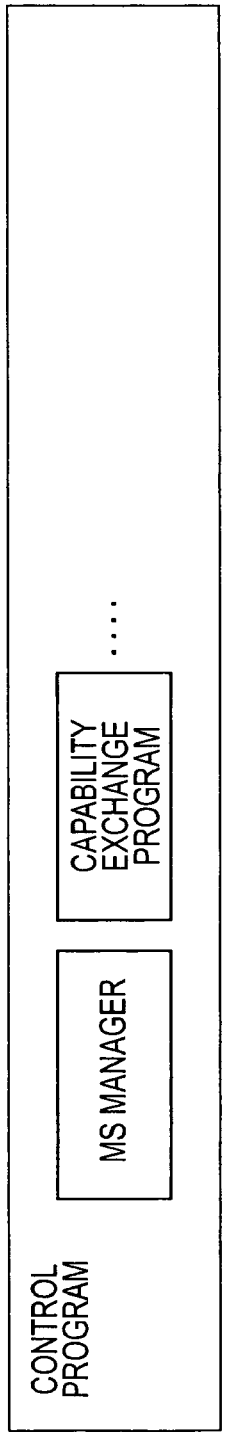
FIGS. 6A, 6B, and 6C are illustrations of an example of the software configuration of an information processing controller.
Figure 6B:
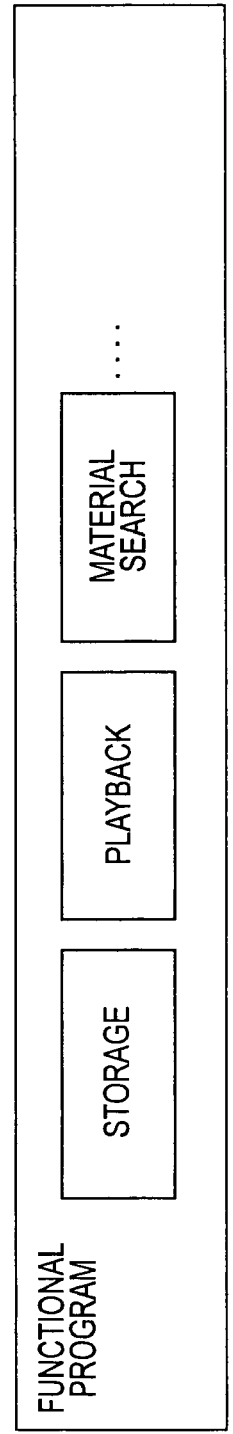
Figure 6C:
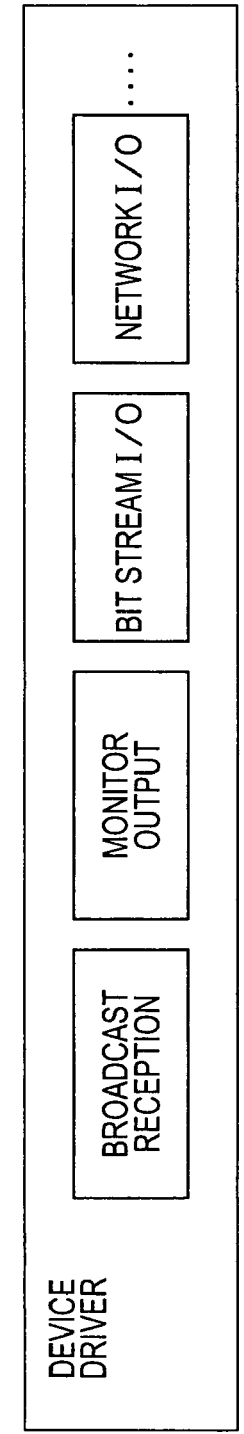

FIGS. 6A, 6B, and 6C show the configuration of software stored in the main memory 26 in each information processing controller. The software (programs) are recorded in the external recording unit 28 connected to the information processing controller before power is supplied to the information processing apparatus. The programs are classified by function or feature into control programs, functional programs, and device programs.

The information processing apparatuses have the same control programs, and the control programs are executed by the main processor 21 in each information processing controller and include a master/slave (MS) manager and a capability exchange program, which are described later.

The functional programs are executed by the main processor 21. Each information processing controller has functional programs which match the information processing controller and which are used for recording, playback, material search, etc.

The device drivers are used for input/output (transmission/reception) for the information processing controller (information processing apparatus). Each information processing controller includes device drivers for broadcast reception, monitor output, bit stream input/output, network input/output, etc., which match the information processing apparatus.

In a state in which an information processing apparatus is physically connected to the network 9 by cable plugging or the like, by supplying main power to the information processing apparatus and electrically and functionally connecting the information processing apparatus to the network 9, the main processor 21 in the information processing controller in the information processing apparatus loads, into the main memory 26, programs belonging to the control programs and programs belonging to the device drivers.

In a program loading process, at first, the main processor 21 reads programs from the external recording unit 28 by controlling the DC 27 to execute a reading command, and next writes the programs in the main memory 26 by controlling the DMAC 25 to execute a writing command.

Regarding the programs belonging to the functional programs, only a necessary program may be loaded into the main memory 26 when needed. Alternatively, similarly to programs belonging to other categories, each program may be loaded immediately after supplying main power.

It is not necessary for each program belonging to the functional programs to be recorded in the external recording units 28 in all the information processing apparatuses 1 to 4 connected to the network 9. If the program is recorded in the external recording unit 28 in any one of the information processing apparatuses 1 to 4, it can be loaded from another information processing apparatus. As a result, as shown in the lower part of FIG. 5, the information processing apparatuses 1 to 4 can execute the functional programs in the form of the virtual information processing apparatus 7.

As described above, the functional programs processed by the main processor 21 may operate in a form linked to the sub-processors processed by the sub-processor 23. Accordingly, the main processor 21 reads a functional program from the external recording unit 28, and, when there is a sub-processor program that operates in a form linked to the functional program, which is to be written in the main memory 26, the sub-processor program is also written in the main memory 26. In this case, the number of sub-processor programs that operate in linked form may be one or plural. When the number of sub-processor programs is plural, all sub-processor programs that operate in linked form are written in the main memory 26. After that, the sub-processor programs written in the main memory 26 are written in the LS 24 in the sub-processor 23, and operate in a form linked to the functional programs processed by the main processor 21.

Sub-processor program IDs are also assigned to the sub-processor programs. This enables unique identification of the sub-processor programs. An assigned sub-processor program ID may be an identifier that is related to the functional program ID of a functional program to which the sub-processor program is liked in operation, for example, an identifier in which the functional program ID is used as a main number and a sub-number is added to the end of the main number. Alternatively, the assigned number may be an identifier that is not related to the functional program ID of the functional program to which the sub-processor program is liked in operation. In any case, when a functional program and a sub-processor program operate, with both linked to each other, both need to store a program ID as the identifier of each. Also when a functional program operates in a form linked to a plurality of sub-processor programs, the functional program stores the sub-processor program IDs of all the sub-processor programs.

As indicated by the software cell in FIG. 3, an identifier capable of uniquely identifying each program is assigned as a functional program ID to a functional program. The functional program ID is determined, in a functional program creating stage, based on the data and time of creation and an information-processing-apparatus ID.

The main processor 21 reserves, in the main memory 26, an area for storing apparatus information (operating-state information) of the information processing apparatus, in which the main processor 21 operates, and records the operation status information as an apparatus-information table of the information processing apparatus. The above operating-state information is information, such as an information-processing-apparatus ID, in a data area of the status response command shown in FIG. 4.

A-7. Determination of Master/Slave in System

In the above-described network system, when main power is supplied to one information processing apparatus, the main processor 21 in the information processing controller of the information processing apparatus loads a master/slave (MS) manager into the main memory 26 and executes the loaded manager.

When detecting that an information processing apparatus in which the MS manager operates establishes connection to the network 9, the MS manager confirms the existence of other information processing apparatuses connected to the same network 9. The term "connection" or "existence" in this context indicates that, as described above, the information processing apparatus is not only physically connected to the network 9 but is electrically and functionally connected to the network 9.

In addition, the information processing apparatus in which the MS manager operates is referred to as the "MS manager apparatus", and other information processing apparatuses are referred to as "other apparatuses". The apparatuses represent the information processing apparatuses.

A method in which the MS manager confirms the existence of another information processing apparatus connected to the same network 9 is described below.

Regarding the MS manager, a DMA command is a status request command, and a transmitter ID and a response receiver ID represent the information processing apparatuses. The MS manager generates a software cell in which a receiver ID is not specified, transmits the software cell to the network 9, to which the information processing apparatuses are connected, and sets a timer for confirming network connection. Time-out of the timer is, for example, ten minutes.

When a different information processing apparatus is connected to the network system, the different apparatus receives a software cell of the above status request command, and transmits, to one information processing apparatus, which issues a status request command specified by the response receiver ID, a software cell in which the DMA command is a status request command and which includes, as data, its apparatus information. The software cell of the status request command includes at least information (such as an information-processing-apparatus ID, main processor information, and sub-processor information) specifying the different apparatus, and an MS status of the different apparatus.

Until time-out of the time for confirming network connection occurs, the MS manager in the information processing apparatus, which issues the status request command, monitors reception of a software cell of a status request command transmitted from a different apparatus on the network 9. When the result of monitoring indicates that a status request command in which an MS status=0 (master) is received, an MS status in the apparatus-information table of the MS manger apparatus is set to one. This causes the above apparatus to serve as a slave.

In addition, when the status request command is not received at all until the time-out of the time for confirming network connection occurs, or a status request command in which the MS status=0 (master) is not received, the MS status in the apparatus-information table of the MS manager apparatus is set to zero. This causes the apparatus to serve as a master.

In other words, when, in a state in which any information processing apparatus is not connected to the network 9, or no master exists on the network 9, a new information processing apparatus is connected to the network 9, the new information processing apparatus is set to serve a master. Conversely, when, in a state in which a master already exists on the network 9, a new information processing apparatus is connected to the network 9, the new information processing apparatus is set to serve as a slave.

In either as a master or as a slave, the MS manager monitors the state of a different information processing apparatus by referring to status information by periodically transmitting a status request command to a different information processing apparatus on the network 9. Accordingly, when the connection state of the network 9 changes, such as a case in which a status request command is not sent back from a particular different information processing apparatus in a predetermined period set for determination beforehand such that the main power to the information processing apparatus connected to the network 9 is cut off or the information processing apparatus is separated from the network 9, and a case in which a new information processing apparatus is connected to the network 9, information of the change is reported to a capability exchange program (described later).

A-8. Acquisition of Apparatus Information by Master and Slave

When being notified of reference check of a different information processing apparatus connected to the network 9, and completion of MS status setting, the main processor 21 executes the capability exchange program.

When one information processing apparatus, in which the MS manager operates, servers a master, the capability exchange program acquires apparatus information, concerning all different information processing apparatuses connected to the network 9, that is, apparatus information of each slave, is acquired.

Acquisition of apparatus information of a different information processing apparatus can be performed, as described above, such that the DMA command generates and transmits, to the different information processing apparatus, a software cell of a status request command, and subsequently receives, from the different information processing apparatus, a software cell in which the DMA command is a status request command and which includes, as data, apparatus information of the different information processing apparatus.

Similarly to the apparatus-information table of the MS manager apparatus as a master, the capability exchange program reserves, in the main memory 26 of the MS manager apparatus, an area for storing apparatus information concerning all the different information processing apparatuses connected to the network 9, and records the information as an apparatus-information table of different apparatuses (slaves). In other words, the main memory 26 in the master, the apparatus information of all the information processing apparatuses connected to the network 9, including the MS manager apparatus, is recorded.

In addition, when the MS manager apparatus serves as a slave, the capability exchange program acquires apparatus information concerning all the different information processing apparatuses connected to the network 9, that is, apparatus information of slaves other than the master and the MS manager apparatus, and records, in the main memory 26 of the MS manager apparatus, information-processing-apparatus IDs and MS statuses included in the apparatus information. In other words, in the main memory 26 in the slave, the apparatus information of the MS manager apparatus is recorded in the form of an apparatus-information table, and information-processing-apparatus IDs and MS statuses of the master and slaves connected to the network 9 are recorded in the form of another apparatus-information table.

When being notified as described above by the MS manager that a new information processing apparatus is connected to the network 9, either for the master or for the slave, the capability exchange program acquires apparatus information of the new information processing apparatus and records the acquired information in the main memory 26, as described above.

The execution of the MS manager and the capability exchange program is not limited to execution by the main processor 21, but both may be executed by one sub-processor 23. In addition, it is preferable that the MS manager and the capability exchange program be resident programs that constantly operate while information-processing-apparatus main power is on.

A-9. When Information Processing Apparatus is Disconnected from Network

When being notified as described above by the MS manager that the main power for an information processing apparatus connected to the network 9 is turned off, or an information processing apparatus is disconnected from the network 9, either in the master or in the slave, the capability exchange program deletes the apparatus-information table of the information processing apparatus from the main memory 26 of one information processing apparatus, in which the capability exchange program operates.

Furthermore, when the information processing apparatus disconnected from the network 9, as described above, serves as a master, a new master is determined by the following method.

For example, each of information processing apparatuses, which are not disconnected from the network 9, replaces its and other information-processing-apparatus IDs by numerical values, and compares its ID value with the other ID values. When its ID value is the least among the ID values of the information processing apparatuses, which are not disconnected from the network 9, the apparatus, which serves as a slave, changes to serve as a master, and sets the MS status to zero. The apparatus, which serves a master, acquires apparatus information of all the other information processing apparatuses (slaves) connected to the network 9, records the apparatus information in the main memory 26.

A-10. Distributed Processing Based on Apparatus Information

In order that, as shown in the lower part of FIG. 5, the information processing apparatuses 1 to 4 connected to the network 9 may operate as the virtual information processing apparatus 7, the master needs to grasp a user's operation and the operating state of the slaves.

FIG. 7 shows a state in which four information processing apparatuses 11, 12, 13, and 14 operate as one virtual information processing apparatus 7. In the example shown in FIG. 7, the information processing apparatus 1 operates as a master, and the information processing apparatuses 2, 3, and 4 operate as slaves A, B, and C, respectively.

When the user operates one information processing apparatus connected to the network 9, if the operated apparatus is the master 1, information of the operation is directly grasped by the master 1. If the operated apparatus is one of the slaves, information of the operation is transmitted from the operated slave to the master 1. In other words, regardless of whether the apparatus operated by the user is either of the master 1 and the slave, the operation information is constantly grasped by the master 1. Transmission of the operation information is performed by a software cell whose DMA command is, for example, an operation-information transmitting command.

The main processor 21-1 included in the information processing controller 11 in the master 1 selects a functional program, which is to be executed, in accordance with the operation information. In this case, the main processor 21-1 in the information processing controller 11 in the master 1 uses the above method to load the functional program from the external recording units 28-1 and 28-2 in the master 1 to the main memory 26-1, if necessary. However, one of the other information processing apparatuses (slaves) may transmit the functional program to the master 1.

In the functional program, apparatus-requirements specifications (see FIG. 4), such as an information-processing-apparatus-type ID, processing capability of a main processor or a sub-processor program, a memory utilization size, and external-recording-unit conditions, which are necessary in each executable unit of the functional program, are defined.

The main processor 21-1 in the information processing controller 11 in the master 1 reads the requirements specifications, which are necessary for each functional program. In addition, by referring to the apparatus-information table recorded in the main memory 26-1 beforehand by the capability exchange program, the main processor 21-1 reads apparatus information of each information processing apparatus. The information read represents the information, shown in FIG. 4, such as the information-processing-apparatus ID, and is information of the main processor 21, the sub-processor 23, the main memory 26, and the external recording unit 28.

The main processor 21-1 in the information processing controller 11 in the master 1 sequentially compares the apparatus information of each information processing apparatus connected to the network 9 with the above requirements specifications necessary for executing the functional program.

For example, when the functional program needs a video recording function, only an information processing apparatus having a video recording function is specified and extracted based on the information-processing-apparatus-type ID. Furthermore, a slave in which conditions, concerning main-processor or sub-processor processing capability, main memory utilization size, and external recording units, necessary for executing the functional program, can be ensured is specified as an execution-request candidate apparatus. If a plurality of execution-request candidate apparatuses are specified, one is selectively specified from among them.

After the slave, in which execution is requested, is specified, the main processor 21-1 in the information processing controller 11 in the master 1 updates, for the specified slave, the apparatus-information table of the slave, which is recorded in the main memory 26-1 in the information processing controller 11 in the master 1.

The main processor 21-1 in the information processing controller 11 in the master 1 generates a software cell whose DMA command is a functional program execution command, sets, in the cell interface of the software cell, information of necessary sub-processors and sandbox size (see FIG. 3) concerning the functional program, and transmits the software cell to the slave.

The slave, in which the execution of the functional program is requested, executes the functional program and updates the apparatus-information table of the slave. On this occasion, the main processor 21 in the information processing controller in the slave uses the above method to load, from the external recording unit 28, into the main memory 26, a functional program and a sub-processor program which operates in a form linked thereto.

When, in the external recording unit 28 in the slave, in which the execution of the functional program is requested, the functional program and the sub-processor program which operates in a form linked thereto are not recorded, the network system may be formed so that a different information processing apparatus can transmit the functional program or the sub-processor program to the slave, in which the execution of the functional program is requested.

The sub-processor program may also be executed by the different information processing apparatus by using the above-described load command and kick command.

After finishing the execution of the functional program, the main processor 21 in the information processing controller in the slave, which executes the functional program, transmits a termination report to the main processor 21-1 in the information processing controller 11 in the master 1, and updates the apparatus-information table of the slave. On receiving the termination report, the main processor 21-1 in the information processing controller 11 in the master 1 updates the apparatus-information table of the slave, which executes the functional program.

Based on the result of reference to the apparatus-information tables of the master 1 and the other information processing apparatuses, the main processor 21-1 in the information processing controller 11 in the master 1 may select the master 1 itself as an information processing apparatus capable of executing the functional program. In this case, the master 1 executes the functional program.

Distributed processing in which, in the example shown in FIG. 7, the user operates slave A (information processing apparatus 2) and a functional program corresponding to the operation is executed by different slave B (information processing apparatus 3) is described below with reference to FIG. 8.

Figure 8:
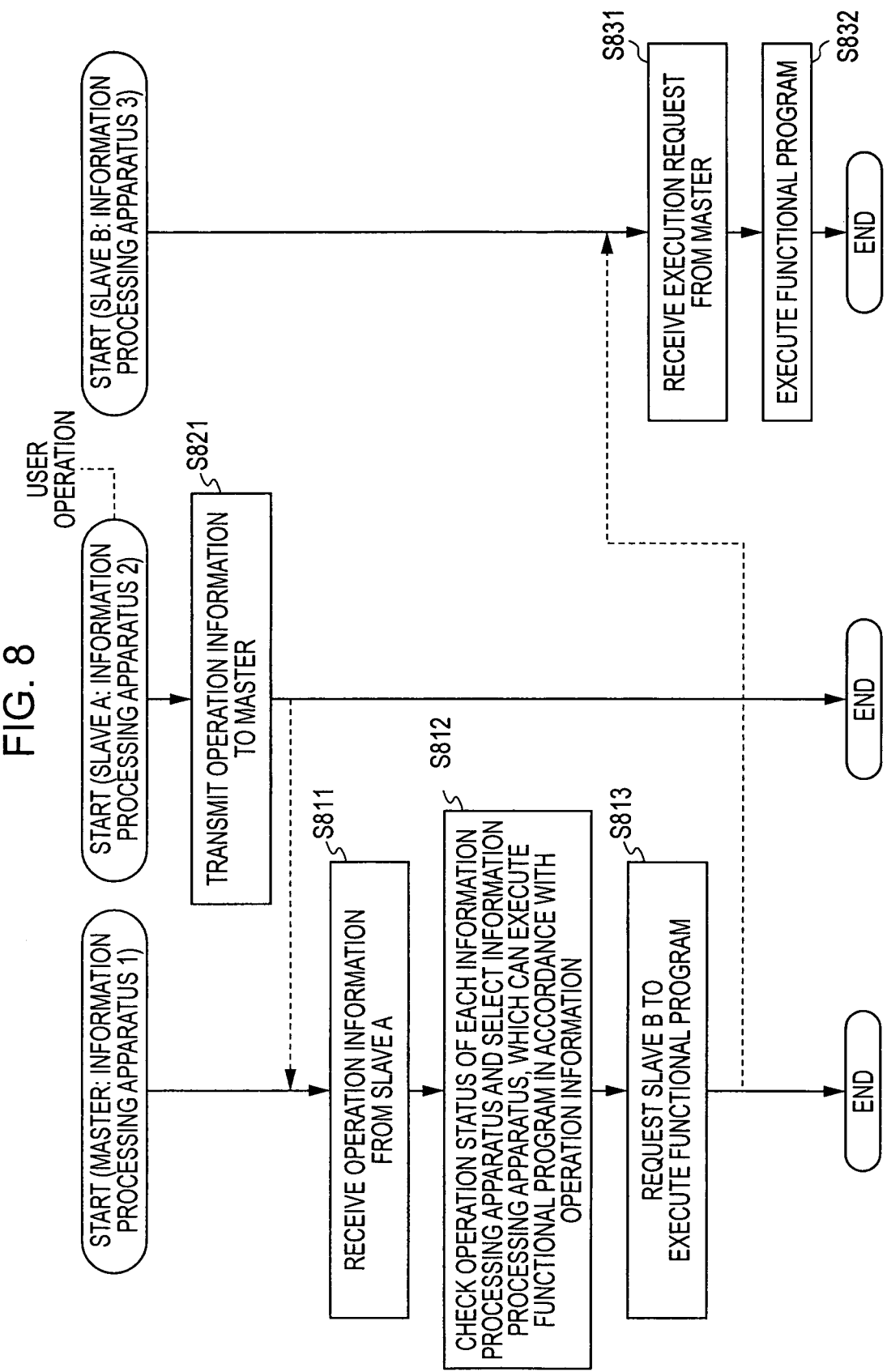
FIG. 8 is a flowchart showing distributed processing in the system shown in FIG. 7.

In the example shown in FIG. 8, distributed processing in the entire network system including slave A is initiated such that the user operates slave A. At first, in step S821, slave A transmits the operation information to the master 1.

In step S811, the master 1 receives the operation information. In step S812, the master 1 checks the operation status of each information processing apparatus from the apparatus-information tables of the master 1 and the other information processing apparatuses which are recorded in the main memory 26-1 in the master 1, and selects one information processing apparatus, which can execute a functional program corresponding to the received operation information. In the example shown in FIG. 8, slave B is selected.

Next, in step S813, the master 1 requests the selected slave B to execute the functional program.

In step S831, slave B receives the execution request. In step S832, slave B executes the functional program whose execution is requested.

As described above, by operating only one information processing apparatus without operating the other information processing apparatuses, the user can allow information the processing apparatuses 1, 2, 3, and 4 to operate as the virtual information processing apparatus 7.

A-11. Specific Example of Each Information Processing Apparatus and System

Figure 9:
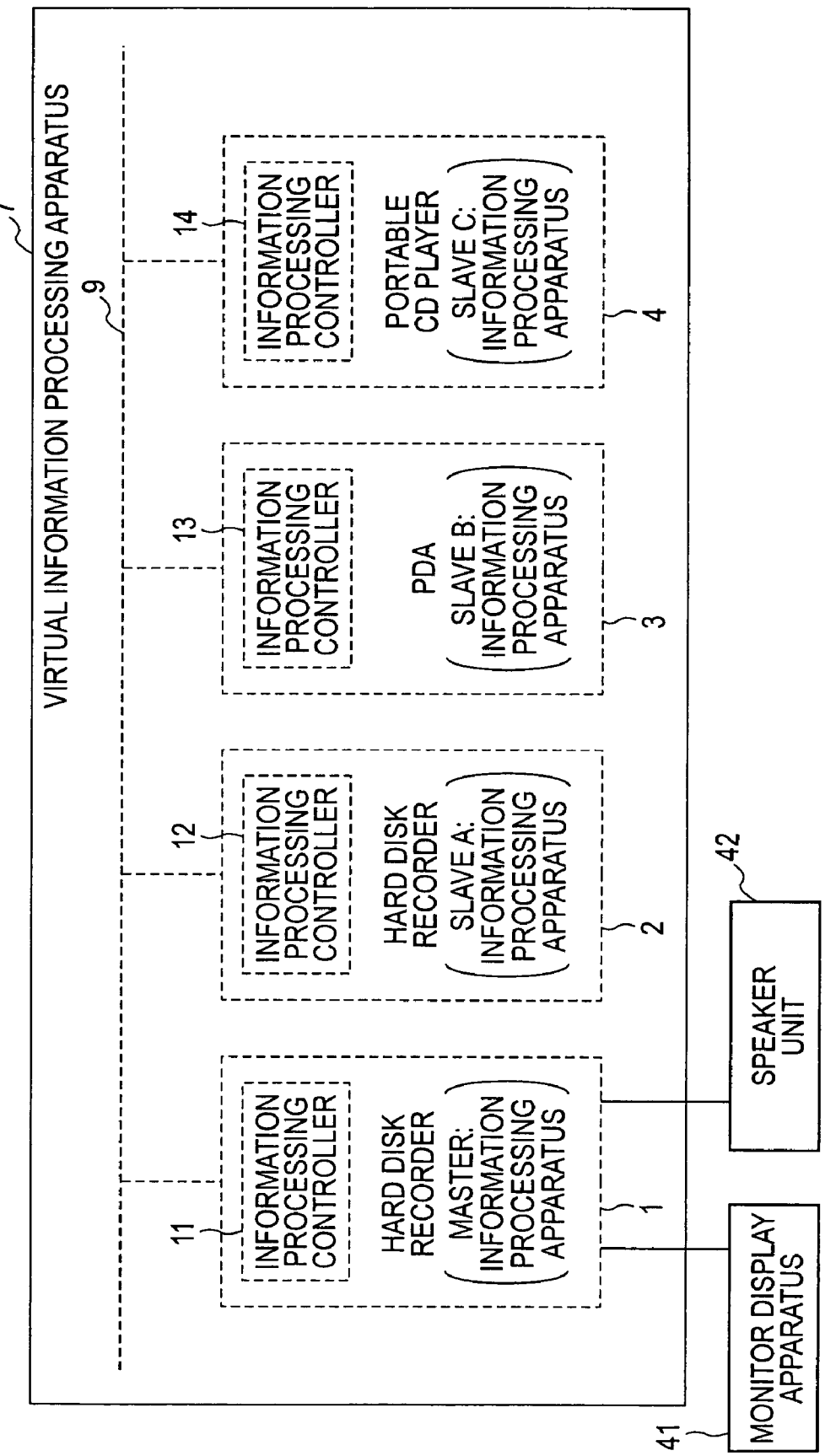
FIG. 9 is a block diagram showing specific examples of information processing apparatuses and a system.

The information processing apparatuses 1, 2, 3, and 4, connected to one another by the network 9, may have any configurations if, in the configurations, information processing is performed by the above-described information processing controllers 11, 12, 13, and 14. FIG. 9 shows an example of the configuration of the virtual information processing apparatus 7.

An example of the information processing apparatus 1 including the information processing controller 11 is a hard disk recorder. FIGS. 10 and 11 show the hardware configuration and software configuration of the hard disk recorder in FIG. 9, respectively. Regarding the hardware configuration of the hard disk recorder, the hard disk recorder has a built-in hard disk as the external recording unit 28-1 shown in FIG. 1, and is designed so that an optical disc, such as DVD±R/RW, CD±R/RW, or Bluray Disc, can be loaded. A bus 31-1 connected to a bus 29-1 in the information processing controller 11 connects to a broadcast receiving unit 32-1, a video input unit 33-1, an audio input unit 34-1, a video output unit 35-1, an audio output unit 36-1, an operation panel unit 37-1, a remote-control photo-receiving unit 38-1, and a network connecting unit 39-1.

The broadcast receiving unit 32-1 receives a broadcast signal, or the video input unit 33-1 and the audio input unit 34-1 respectively receive video audio signals input from the exterior. Each unit converts the received signal into digital data and sends the data to the bus 31-1 for processing in the information processing controller 11. The video output unit 35-1 and the audio output unit 36-1 respectively process video data and audio data sent from the information processing controller 11 to the bus 31-1, and send the processed data to the exterior of the information processing apparatus 1 in unchanged digital data form or in analog signal form. The remote-control photo-receiving unit 38-1 receives a remote control infrared signal from the remote-control transmitting/receiving unit 43-1.

As shown in FIGS. 9 and 10, the video output unit 35-1 and audio output unit 36-1 in the information processing apparatus 1 (hard disk recorder) connect to a monitor display apparatus 41 and a speaker unit 42, respectively.

Also the information processing apparatus 2 (shown in FIG. 2) including the information processing controller 12 is identical in configuration to the information processing apparatus 1, as denoted by the bracketed reference numerals shown in FIG. 10. However, as shown in FIG. 9, no monitor display apparatus and speaker unit are connected to the information processing apparatus 2 (hard disk recorder).

Regarding the software configuration of the information processing apparatuses 1 and 2 (hard disk recorders), that is, the information processing controllers 11 and 12, as shown in FIGS. 11A, 11B, and 11C, they have an MS manager and a capability exchange program as control programs, and, as functional programs, programs for audio/video recording, audio/video playback, material search, and program recording reservation. In addition, they have, as device drivers, programs for broadcast reception, video output, audio output, external-recording-unit input/output, and network input/output.

Figure 12:
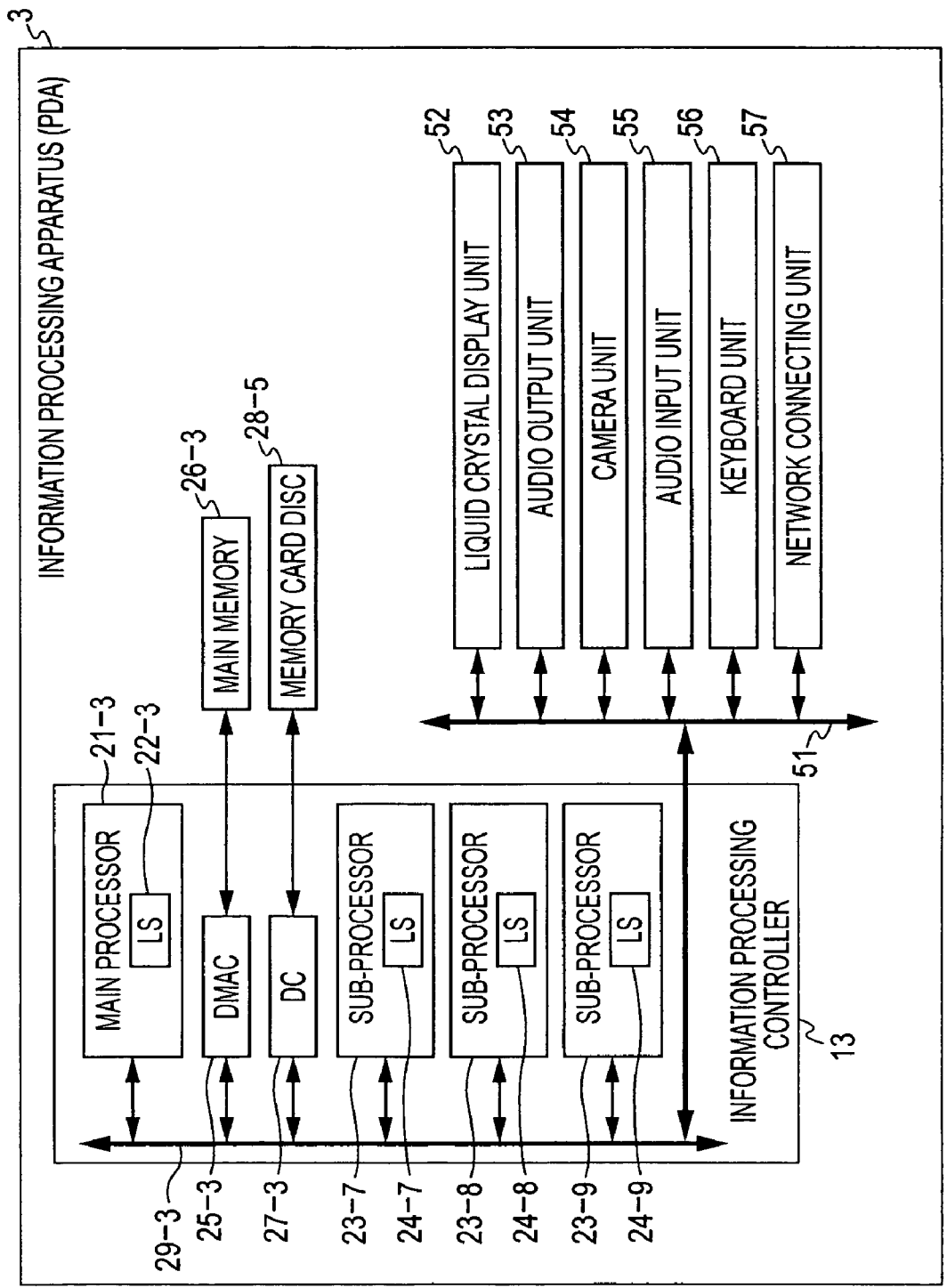
FIG. 12 is a block diagram showing the hardware configuration of the PDA shown in FIG. 9.

Another example of the information processing apparatus including the disc control unit 13 is a PDA (personal digital assistant). FIG. 12 shows the hardware configuration of the information processing apparatus 3, which is formed as a PDA. In the example shown in FIG. 12, the information processing apparatus 3 is designed so that a memory disc can be loaded as an external recording unit in the information processing apparatus 3 shown in FIG. 1. A bus 51, connected to a bus 29-3 in an information processing controller in the information processing apparatus 3, connects to a liquid crystal display unit 52, an audio output unit 53, a camera unit 54, an audio input unit 55, a keyboard unit 56, and a network connecting unit 57.

The information processing controller in the information processing apparatus 3, whose inside is not shown in FIG. 1, includes a main processor 21-3, sub-processors 23-7, 23-8, and 23-9, a DMAC 25-3, a DC 27-3, and a bus 29-3. The main processor 21-3 includes an LS 22-3. The sub-processors 23-7, 23-8, and 23-9 include LSs 24-4, 24-8, and 24-9, respectively.

In addition, FIGS. 13A, 13B, and 13C show the software configuration of the information processing apparatus 3 (PDA), that is, the information processing controller in the information processing apparatus 3. As shown in FIGS. 13A, 13B, and 13C, the information processing apparatus 3 has an MS manager and a capability exchange program as control programs, and, as functional programs, programs for audio/video recording, audio/video playback, telephone, word processing, spread sheet, and web browser. The information processing apparatus 3 has, as device drivers, programs for video output, audio output, camera-video input, microphone-audio input, and network input/output.

In addition, the information processing apparatus 4 including the user-operation input unit 14 is a portable CD player. FIG. 14 shows the configuration of the portable CD player. In the example shown in FIG. 14, the portable CD player is designed so that a CD (compact disc) can be loaded as the external recording unit 28-6 shown in FIG. 1. A bus 61 connected to a bus 29-4 in the user-operation input unit 14 connects to a liquid crystal display unit 62, an audio output unit 63, an operation button unit 64, and a network connecting unit 65.

The information processing controller 14, whose inside is not shown in FIG. 1, includes a main processor 21-4, sub-processors 23-10, 23-11, and 23-12, a DMAC 25-4, a DC 27-4, and a bus 29-4. The main processor 21-4 includes an LS 22-4. The sub-processors 23-10, 23-11, and 23-12 include LSs 24-10, 24-11, and 24-12, respectively.

FIGS. 15A, 15B, and 15C show the software configuration of the information processing apparatus 4 (portable CD player), that is, the information processing controller 14. As shown in FIGS. 15A, 15B, and 15C, the information processing apparatus 4 has an MS manager and capability exchange program as control programs, a music playback program as a functional program, and, as device drivers, audio output, CD control, and network input/output.

In the network system shown in FIG. 9, the information processing apparatuses 1, 3, and 4 are connected to the network 9, and the information processing apparatus 1 is set to serve as a master (MS status=0), and the information processing apparatuses 3 and 4 are set to serve as slaves (MS status=1).

When, in this state, the information processing apparatus 2 is newly connected to the network 9, the MS manager, which is executed in the main processor 21-2 in the information processing controller 12 in the information processing apparatus 2, uses the above-described method to recognize that the information processing apparatus 1 already exists as a master by referring to the MS statuses in the other information processing apparatuses 1, 3, and 4, and sets the information processing apparatus 2 to serve as a slave (MS status=1). In addition, the master 1, which is set to serve as a master, collect apparatus information of the other information processing apparatuses including the newly added information processing apparatus 2, and updates the apparatus-information table in the main memory 26-1.

A case in which, in this state, the information processing apparatus 3 (PDA) as the slave is operated by the user in order to reserve recording of a two-hour broadcast program is described below.

In this case, the information processing apparatus 3 (PDA) as the slave receives, from the user, input recording reservation information including information such as a recording-start time, a recording-end time, a broadcast channel to be recorded, and recording quality, and generates and transmits, to the information processing apparatus 1 as the master, a software cell including the recording reservation information and a recording reservation command as a DMA command.

The main processor 21-1 in the information processing controller 11 in the information processing apparatus 1, which receives the software cell whose DMA command is a recording reservation command, reads the recording reservation command, and specifies one information processing apparatus, which can execute the recording reservation command, by referring to the apparatus-information table in the main memory 26-1.

At first, the main processor 21-1 reads the information-processing-apparatus-type ID, included in the apparatus-information table, of each of the information processing apparatuses 1, 2, 3, and 4, extracts one information processing apparatus, which can execute a functional program corresponding to the recording reservation command. Here, the information processing apparatuses 1 and 2, which have information-processing-apparatus-type IDs each representing the recording function, are specified and the information processing apparatuses 3 and 4 are excluded from candidate apparatuses.

Next, by referring to the apparatus-information table, the main processor 21-1 in the information processing controller 11 in the information processing apparatus 1 as the master reads apparatus information such as main-processor or sub-processor processing capability of the information processing apparatuses 1 and 2, and main memory information, and determines whether the information processing apparatuses 1 and 2 satisfy requirements specifications necessary for executing the functional program corresponding to the recording reservation command. Here, both the information processing apparatuses 1 and 2 satisfy the requirements specifications necessary for executing the functional program corresponding to the recording reservation command.

Furthermore, by referring to the apparatus-information table, the main processor 21-1 reads external-recording-unit information of the information processing apparatuses 1 and 2, and determines whether a free area size of the external recording unit satisfies an area size necessary for executing the execution of the recording reservation command. Since the information processing apparatuses 1 and 2 are hard disk recorders, a difference between the total size and utilization size of each of the hard disks 28-1 and 28-3 corresponds to the free area size of each apparatus.

It is assumed that, in this case, the free area size of the hard disk 28-1 in the information processing apparatus 1 is ten minutes in terms of a recording time and the free area size of the hard disk size 28-3 in the information processing apparatus 2 is twenty hours in terms of a recording time.

At this time, the main processor 21-1 in the information processing controller 11 in the information processing apparatus 1 as the master specifies, as a slave in which the execution of the command is requested, one information processing apparatus, which can reserve a free area size for two hours which is necessary for executing the recording reservation command.

As a result, only the information processing apparatus 2 is selected as a slave in which the execution of the command is requested, and, by transmitting the recording reservation command (including the recording reservation information) transmitted from the information processing apparatus 3, which is operated by the user, the main processor 21-1 in the information processing controller 11 in the information processing apparatus 1 as the master requests the execution of reservation of recording of the two-hour broadcast program.

The main processor 21-2 in the information processing controller 12 in the information processing apparatus 2 analyzes the recording reservation command, loads a functional program necessary for recording from the hard disk 28-3 into the main memory 26-2, and executes recording in accordance with the recording reservation information. As a result, audio/video data of the two-hour broadcast program whose recording is reserve red is recorded on the hard disk 28-3.

As described above, also in the network system shown in FIG. 9, by operating only one information processing apparatus without operating the other information processing apparatuses, the user can allow the information processing apparatuses 1, 2, 3, and 4 to operate as the virtual information processing apparatus 7.

B. Automatic Content Processing Based on Preferences of User

As described above, in a grid computing system, a plurality of network-connected information processing apparatuses cooperatively operate to perform distributed processing, whereby they operate as one virtual information processing apparatus.

For example, the information processing apparatuses are used to perform, on the original content, various types of data processing such as picture-quality improvement in which a user edits multimedia content so that it has quality matching user's preferences, and re-encoding in which content encoded in an encoding system is re-encoded into that in another encoding system.

Since filtering for picture-quality improvement on content, and re-encoding are data processing that needs high processing capability, it is necessary to confirm a free state of system resources, and it is necessary to set parameters for use in order to obtain content having quality matching the user's preferences, so that the filter and re-encoding are complex.

In the system described in the above section A in which apparatuses operate in linked form, based on surplus processing capabilities of apparatuses constituting the system, one information processing apparatus which executes a commanded function is dynamically selected to enable distributed processing. Unlike that, in this section B, by applying this distributed processing technology, a mechanism in which high load data processing, such as content picture-quality improvement and re-encoding, is automatically performed using a time in which the resources are free is introduced into the above-described system. Furthermore, user's preferences are learned from content the user uses and data processing adapted for the user's preferences is automatically performed.

B-1. System Configuration

Figure 16:
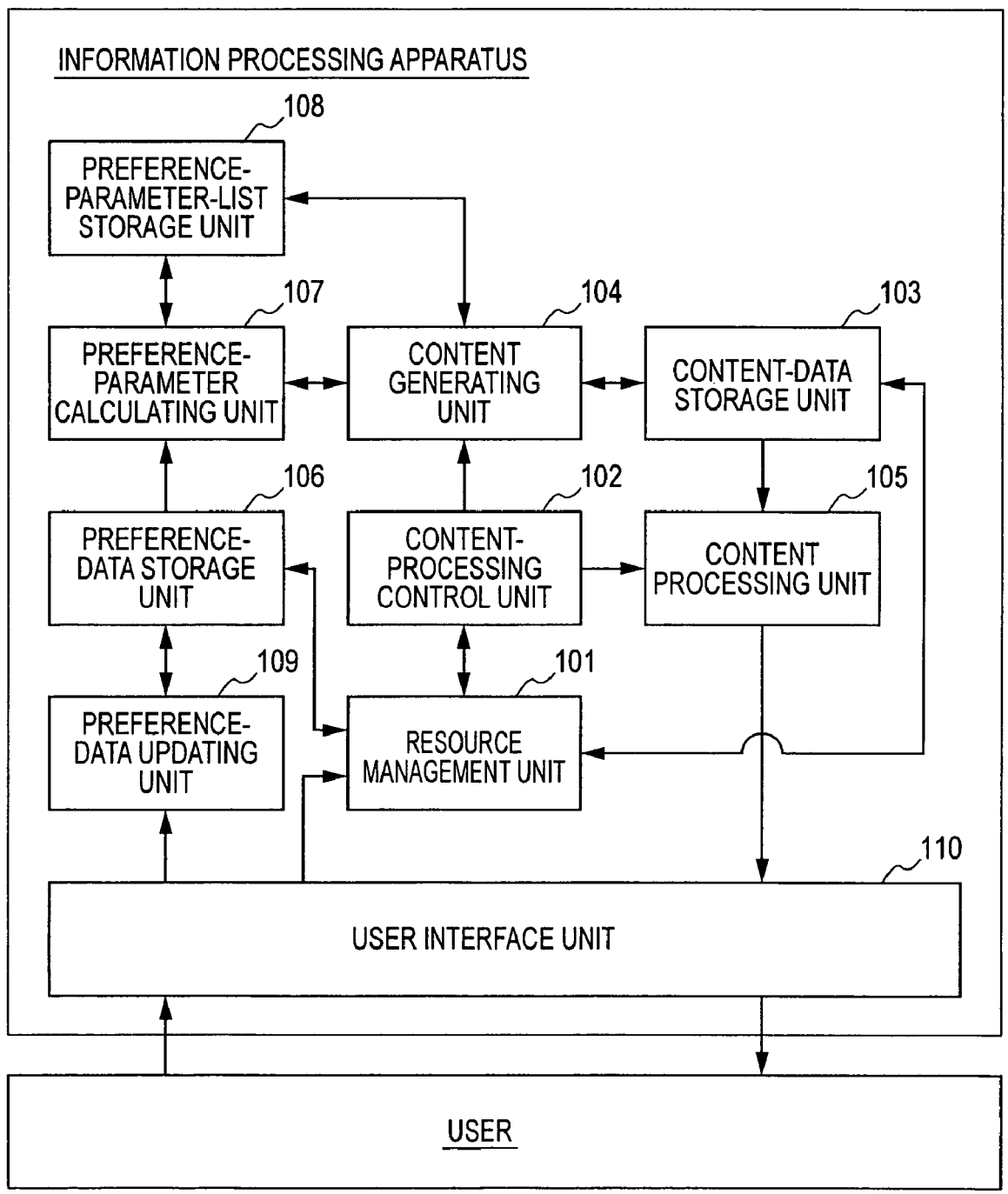
FIG. 16 is a block diagram showing the functional configuration of an information processing system which learns user's preferences and which automatically performs data processing preferred by the user.

FIG. 16 shows the functional configuration of a content processing system 100 that learns user's preferences and automatically performs data processing adapted for the user's preferences. The system shown in FIG. 16 is realized by actually regarding a plurality of information processing apparatuses as a virtual information processing apparatus on a network, forming master-slave relationships among the information processing apparatuses, and executing a user-specified functional program by using a sub-processor in an information processing controller in one information processing apparatus, which serves as a slave.

As shown in FIG. 16, the content processing system 100 includes a resource management unit 101, a content-processing control unit 102, a content-data storage unit 103, a content generating unit 104, a content processing unit 105, a preference-data storage unit 106, a preference-parameter calculating unit 107, a preference-parameter-list storage unit 108, a preference-data updating unit 109, and a user interface unit 110.

The resource management unit 101 receives a user request from the user interface unit 110, and requests the content-processing control unit 102 to perform data processing on each piece of content. In addition, by managing the preference-data storage unit 106 and the content-data storage unit 103, the resource management unit 101 manages stored data.

In response to a request from the resource management unit 101, the content-processing control unit 102 controls processing by the content generating unit 104 and the content processing unit 105.

The content-data storage unit 103 stores pieces of content (hereinafter referred to as "original content") in a state before data processing on the pieces of content is performed, and content obtained by using various parameters to perform data processing on the pieces of content.

In response to a request from the content-processing control unit 102, the content generating unit 104 acquires the original content, which is to be processed, from the content-data storage unit 103. The content generating unit 104 also allows the preference-parameter calculating unit 107 to a list (preference-parameter list) of parameters (preference parameters) for content data processing, acquires the list from the preference-parameter-list storage unit 108, and generates content.

In response to a request from the content-processing control unit 102, the content processing unit 105 acquires content from the content-data storage unit 103 and transmits the acquired content to the user interface unit 110 in order to provide it to the user.

The preference-data storage unit 106 stores preference-data processing tables by user, and preference-parameter tables by type of data processing for each user.

Each preference-data processing table manages, for each user, a number of times that each type of data processing is selected, and weight calculated based on the number of times the type of data processing is selected. When data processing is executed, some parameters need to be set. For example, the parameters include a picture size in an image quality improving mode and a bit rate in a re-encoding mode. Each preference-parameter table manages a number of times that the user selects the parameters in each type of data processing, and weight calculated based on the number of times. Details of the tables are described later.

In response to a request from the content generating unit 104, the preference-parameter calculating unit 107 acquires preference data from the preference-data processing tables and preference-parameter tables in the preference-data storage unit 106, and generates and stores, in the preference-parameter-list storage unit 108, a preference parameter list for use in content processing.

The preference-parameter-list storage unit 108 stores a preference parameter generated by the preference-parameter calculating unit 107.

After acquiring the user-preference information from the user interface unit 110, the preference-data updating unit 109 updates the preference-data processing tables and preference-parameter table of the user which are stored in the preference-data storage unit 106.

The user interface unit 110 provides the user with content sent from the content processing unit 105, and sends preference information from the user to the preference-data updating unit 109. In addition, the user interface unit 110 reports, to the resource management unit 101, data processing requested by the user.

The following Table 1 shows characters used in the following description and their definitions.

TABLE 1

| Alpha-numeric Characters | Meanings |
|---|---|
| C | the number of unprocessed pieces of original content |
| U | the number of users who handle certain original content |
| L | the number of pieces of new content generated for certain original content |
| D | the number of types of data processing |
| DN | a number of times that each type of data processing is selected |
| Dw | the weight of each type of data processing |
| DL | the number of pieces of content generated in each type of data processing |
| P | the number of parameters in each type of data processing |
| M | the number of patterns of parameters in each type of data processing |
| PN | a number of times that each pattern of parameters in each type of data processing is selected |
| Pw | the weight of each pattern of parameters in each type of data processing |
| x | an index specifying unprocessed original content |
| y | an index specifying a type of data processing |
| z | an index specifying a user who handles certain original content |
| i | an index specifying a parameter |
| j | an index specifying a pattern of numerical values that each parameter takes |
| k | an index specifying a preference parameter in the preference parameter list. |

In addition, terms used in this specification are described below.

Original Content

Original content is originally content stored in the system, and is used for distinction from content automatically generated by using a mechanism concerning automation of data processing according to this embodiment.

Data Processing

The data processing in this specification means picture-quality improving data processing such as re-encoding from MPEG-2 to MPEG-4, interlaced progressive conversion, or noise reduction filtering. These types of data processing need parameter in the process of execution. The number of parameters differs depending on each type of data processing. In this specification, as shown in the following tables, the upper limit of the number of parameters in the y-th data processing is defined as $P_y$.

TABLE 2

| Type of Data Processing | Number of Parameters |
|---|---|
| Data Processing 1 | $P_1$ |
| Data Processing 2 | $P_2$ |
| Data Processing 3 | $P_3$ |
| Data Processing 4 | $P_4$ |
| ... | ... |
| Data Processing D | $P_D$ |

Preference-Data Processing Table

The preference-data processing table manages, for each user, each number of times that each type of data processing is selected, and each weight calculated based on the number of times. An example of the preference-data processing table is as follows:

TABLE 3

| Type of Data Processing (y) | Number $DN_y$ of Times of Selection | Weight $Dw_y$ |
|---|---|---|
| Data Processing 1 | 1 | 1/D |
| Data Processing 2 | 1 | 1/D |
| Data Processing 3 | 1 | 1/D |
| Data Processing 4 | 1 | 1/D |
| ... | ... | ... |
| Data Processing (D – 1) | 1 | 1/D |
| Data Processing D | 1 | 1/D |

The preference-data processing table is provided for each user, and stores a number of times ($DN_y$) that the y-th data processing is selected by the user, and the weight $Dw_y$ of the data processing. The processing value of the number $DN_y$ of times of selection is one. Here, a change in the number $DN_y$ of times of selection updates weight $Dw_y$ based on the following expression:

$$Dw_y = \frac{DN_y}{\sum_{y=1}^{y=D} DN_y} \quad (1)$$

For example, when a user selects data processing 2 in a preference-data processing table as shown as Table 3, the preference-data processing tables for the user is updated as shown in the following Table 4.

TABLE 4

| Type of Data Processing (y) | Number $DN_y$ of Times of Selection | Weight $Dw_y$ |
|---|---|---|
| Data Processing 1 | 1 | 1/D |
| Data Processing 2 | 2 | 2/D |
| Data Processing 3 | 1 | 1/D |
| Data Processing 4 | 1 | 1/D |
| ... | ... | ... |
| Data Processing (D – 1) | 1 | 1/D |
| Data Processing D | 1 | 1/D |

Preference Parameter Table

The preference parameter table manages, for each user, each number of times that each parameter is selected in each type of data processing, and each weight calculated based on the number of times of selection. Preference parameter tables are provided, for each user, for as many as the number of types of data processing. An example of the preference parameter table is shown in the following Table 5.

TABLE 5

| Parameter (i) | Numerical Value (j) | Number $PN_{ij}$ of Times of Selection | Weight $Pw_{ij}$ |
|---|---|---|---|
| Parameter 1 | numerical value 1 | 1 | 1/3 |
| Parameter 1 | numerical value 2 | 1 | 1/3 |
| Parameter 1 | numerical value 3 | 1 | 1/3 |
| Parameter 2 | numerical value 1 | 1 | 1/5 |
| Parameter 2 | numerical value 2 | 1 | 1/5 |
| Parameter 2 | numerical value 3 | 1 | 1/5 |
| Parameter 2 | numerical value 4 | 1 | 1/5 |

TABLE 5-continued

| Parameter (i) | Numerical Value (j) | Number $PN_{ij}$ of Times of Selection | Weight $Pw_{ij}$ |
|---|---|---|---|
| Parameter 2 | numerical value 5 | 1 | 1/5 |
| ... | ... | ... | ... |
| Parameter P | numerical value 1 | 1 | 1/4 |
| Parameter P | numerical value 2 | 1 | 1/4 |
| Parameter P | numerical value 3 | 1 | 1/4 |
| Parameter P | numerical value 4 | 1 | 1/4 |

In Table 5, the parameters in the first column represent parameter types. The value of the number P of parameters differs depending on each type of data processing, as described above.

The numerical values in the second column represent numerical values that the parameters in the first column can have. As the following Table 6 shows, the number $M_i$ of patterns that each parameter can have is defined.

TABLE 6

| Parameter | Number of patterns |
|---|---|
| Parameter 1 | $M_1$ |
| Parameter 2 | $M_2$ |
| Parameter 3 | $M_3$ |
| Parameter 4 | $M_4$ |
| ... | ... |
| Parameter D | $M_P$ |

The number $PN_{ij}$ in the third column in Table 5 is a numerical value that is incremented by one in each parameter when a parameter value of preference is selected by the user, and its initial value is one.

The weight $Pw_{ij}$ in the fourth column is the value of the weight of each parameter calculated from the following expression:

$$Pw_{ij} = \frac{PN_{ij}}{\sum_{j=1}^{j=M_i} PN_{ij}} \quad (2)$$

For example, when a preference parameter table of a user for a type of data processing has the contents shown in Table 5, and the user selects content obtained by using the following parameters to perform the data processing, the preference parameter table for the user is updated as shown in the following Table 7, and the weight of a numerical value selected by the user increases.

parameter 1=numerical value 2 parameter 2=numerical value 4 parameter 3=numerical value 1

TABLE 7

| Parameter (i) | Numerical Value (j) | Number $PN_{ij}$ of Times of Selection | Weight $Pw_{ij}$ |
|---|---|---|---|
| Parameter 1 | numerical value 1 | 1 | 1/4 |
| Parameter 1 | numerical value 2 | 2 | 2/4 |
| Parameter 1 | numerical value 3 | 1 | 1/4 |
| Parameter 2 | numerical value 1 | 1 | 1/6 |
| Parameter 2 | numerical value 2 | 1 | 1/6 |

TABLE 7-continued

| Parameter (i) | Numerical Value (j) | Number $PN_{ij}$ of Times of Selection | Weight $Pw_{ij}$ |
|---|---|---|---|
| Parameter 2 | numerical value 3 | 1 | 1/6 |
| Parameter 2 | numerical value 4 | 3 | 2/6 |
| Parameter 2 | numerical value 5 | 1 | 1/6 |
| ... | ... | ... | ... |
| Parameter P | numerical value 1 | 2 | 2/5 |
| Parameter P | numerical value 2 | 1 | 1/5 |
| Parameter P | numerical value 3 | 1 | 1/5 |
| Parameter P | numerical value 4 | 1 | 1/5 |

Preference Data

The preference data is data including items constituting the preference-data processing table and items constituting the preference parameter table.

Preference Parameter

The preference parameter is a set of parameters and numerical values (parameter 1=numerical value α, parameter 2=numerical value β, and parameter P=numerical value γ). Since, in a type of data processing, the number of parameters is $P_y$, and the number of numerical value patterns that each parameter can have is $M_i$, the number of preference parameters is $M_1 \times M_2 \times \ldots \times M_{py}$.

Preference Parameter List

As described above, a possible number of preference parameters is huge. Accordingly, only L preference parameters, which are set beforehand, are listed. At first, the number $DL_y$ of pieces of content generated in each type of data processing is calculated by using the following expression. Therefore, the greater the number of times of selection by the user, the greater the number of pieces of content which are automatically generated.

$$DL_y = L \times Dw_y \quad (3)$$

Next, regarding an evaluation value for use in listing preference parameters reflecting user's preferences from a type of data processing in which the value of $DL_y$ is the largest, preference parameter evaluation is performed by using the following expression:

$$v = Pw_{1j_1} \times Pw_{2j_2} \times \ldots \times Pw_{Pj_P} \quad (4)$$

where:

$Pw_{1j_1}$ represents the weight of the $j_1$-th numerical value of parameter 1;

$Pw_{2j_2}$ represents the weight of the $j_2$-th numerical value of parameter 2; ..., and $Pw_{Pj_P}$ represents the weight of the $j_P$-th numerical value of parameter P.

By calculating evaluation value v of preference parameter for each value of each numerical value, and listing top $DL_y$ preference parameters in order of evaluation value magnitude, the preference parameter list is obtained. The preference parameter list is provided for each user in units of pieces of the original content. An example of the preference parameter list is shown below.

TABLE 8

| Content ID | Content Pattern ID | Destination to Store Content | Data Processing ID | Parameter | Numerical Value |
|---|---|---|---|---|---|
| 1 | 1 | S | 4 | parameter 1 | value 1 |
|   |   |   |   | parameter 2 | value 2 |
|   |   |   |   | ... | ... |
|   |   |   |   | parameter $P_4$ | value 1 |
|   | 2 | S | 4 | parameter 1 | value 2 |
|   |   |   |   | parameter 2 | value 4 |
|   |   |   |   | ... | ... |
|   |   |   |   | parameter $P_4$ |   |
|   | ... |   |   | ... | ... |
|   | L | T | 8 | parameter 1 | value 3 |
|   |   |   |   | parameter 2 | value 5 |
|   |   |   |   | ... | ... |
|   |   |   |   | parameter $P_8$ | value 2 |

In the above preference parameter list, the content ID in the first column is a unique ID assigned to each piece of content. The content pattern IDs in the second column are IDs for distinction in type of data processing. The destinations (store content) in the third column represent positions storing pieces of content generated by performing the data processing specified by the data processing IDs in the fourth column by using the preference parameters defined in the fifth and sixth columns. The data processing IDs in the fourth column are unique IDs for specifying data processing. The parameters in the fifth column are types of parameters. The values in the sixth column are the numerical values of the parameters.

The smaller the content pattern ID, as described above, the greater the evaluation value v of the preference parameter.

Software Cell

In a system in which network-connected information processing apparatuses operate in liked form to operate as a virtual information processing apparatus, a feature in that a software cell including a command, a program, and data is transmitted between information processing apparatuses is as described above. A software cell used when data processing based on user's preferences is automatically executed in the content processing system according to this embodiment is described below.

Figure 17:
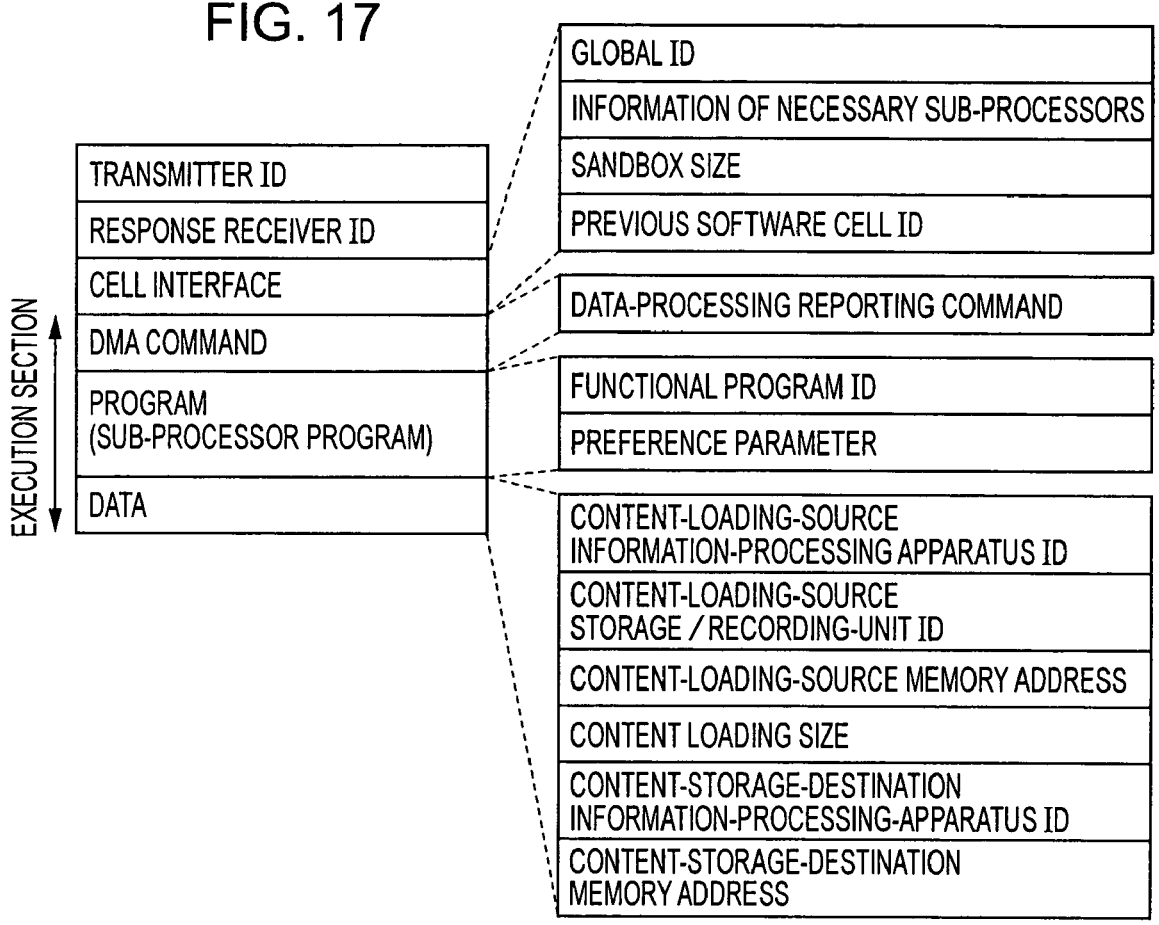
FIG. 17 is an illustration of the configuration of a data-processing reporting command.

FIG. 17 shows the configuration of a data-processing reporting command. This software cell is used in order for a master to report the following information to a slave.

The information includes a set of a functional program corresponding to data processing and preference parameters for use in the functional program, a place in which content to be processed is stored, and a destination in which the content is used to perform data processing.

A DMA command part of this software cell has a data-processing reporting command. A program area of the software cell has a functional program ID for specifying a functional program corresponding to data processing which is to be performed, and a preference parameter. A data part of the software cell has information of a place in which content to be processed is stored, and a place in which content generated by processing is stored.

Figure 18:
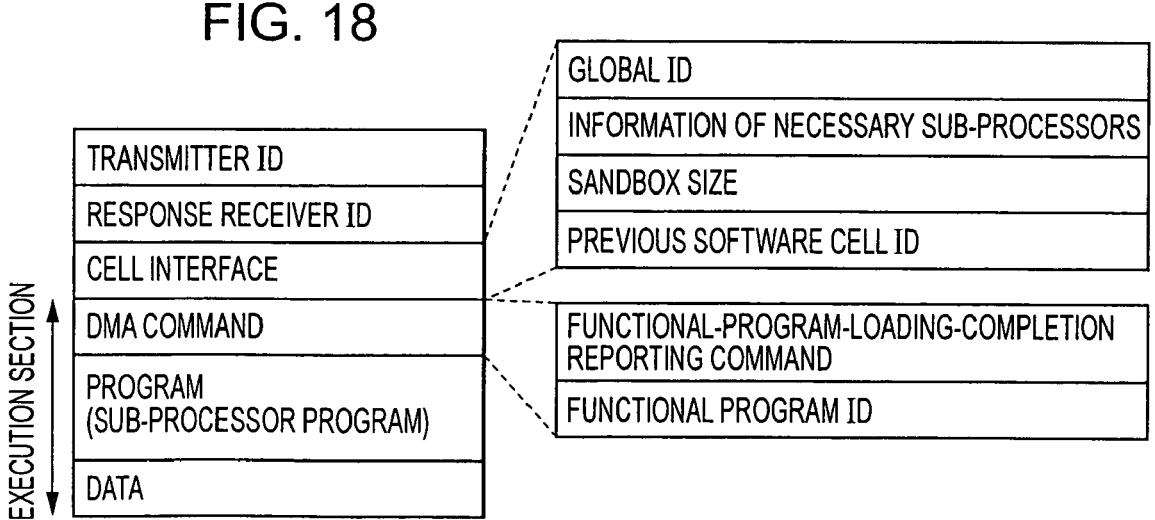
FIG. 18 is an illustration of the configuration of a functional-program-loading-completion reporting command.

FIG. 18 shows the configuration of a functional-program-loading-completion reporting command. This is a software cell for a slave to report, to the master, completion of loading of the functional program. A DMA command part of this software cell has a functional-program-loading-completion reporting command and a functional program ID.

FIG. 19 shows the configuration of a functional-program-termination reporting command. This is a software cell for a slave to report, to the master, completion of functional program processing requested by the master. A DMA command part of this software cell has the functional-program-termination reporting command and a functional program ID.

FIG. 20 shows the configuration of a user notification command. This is a software cell for a slave to notify the master of who is a user operating the slave. A DMA command part of this software cell has a user notification command and a user ID.

FIG. 21 shows the configuration of a content-list-request reporting command. This is a software cell for a slave to report, to the master, that the user requests display of a list of pieces of content automatically generated for certain content. A DMA command part of this software cell has a content-list-request reporting command and a content ID.

Figure 22:
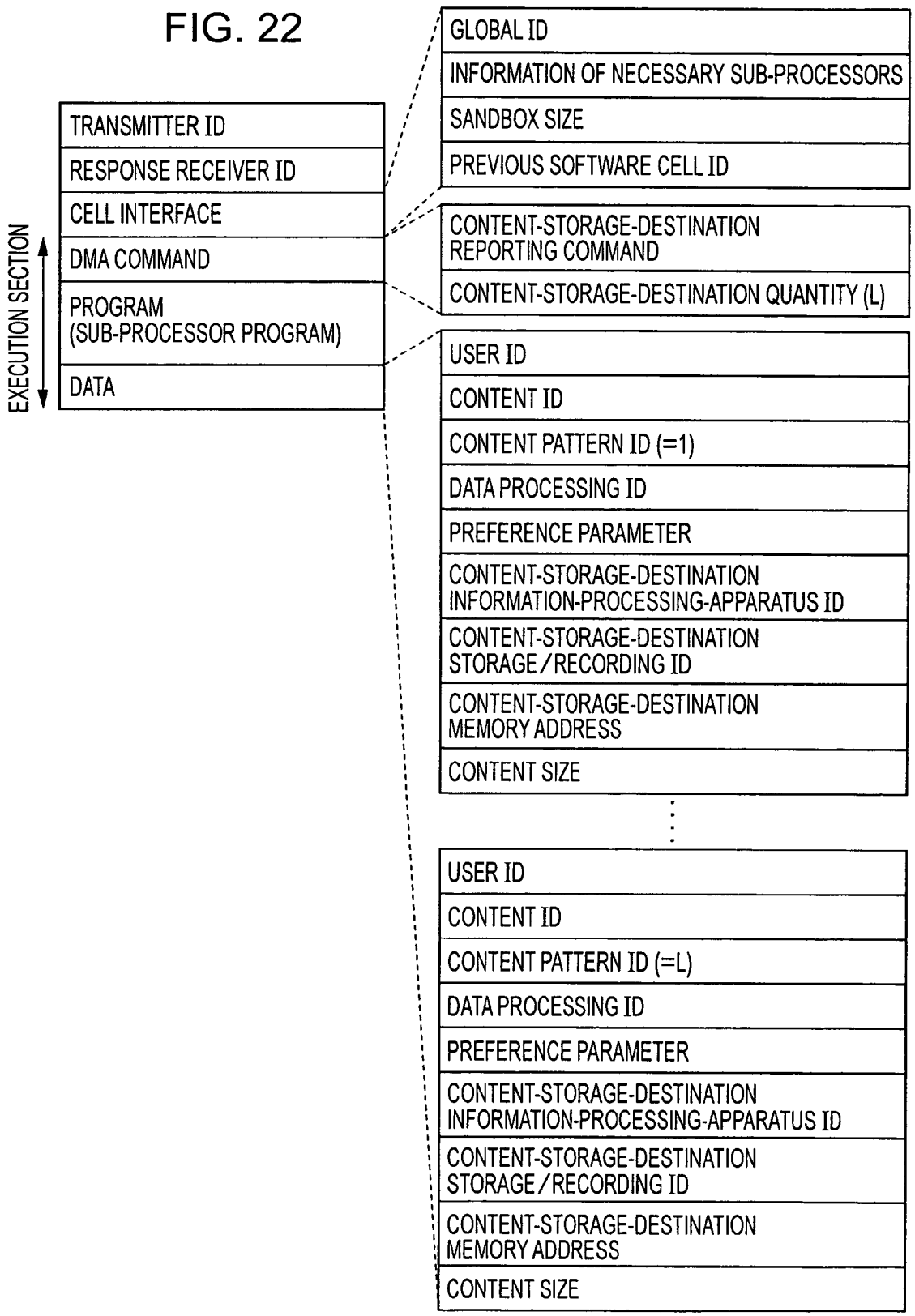
FIG. 22 is an illustration of the configuration of a content-storage-destination reporting command.

FIG. 22 shows the configuration of a content-storage-destination reporting command. This is a software cell for the master to report, to a slave operated by the user, in response to the content-list-request reporting command shown in FIG. 21, a destination to store a piece of content. A DMA command part of this software cell has a content-storage-destination reporting command and a content-storage-destination quantity. A data part of this software cell has a content ID in a preference parameter list, a content pattern ID, a data processing ID, a preference parameter, and content-storage-destination information.

Figure 23:
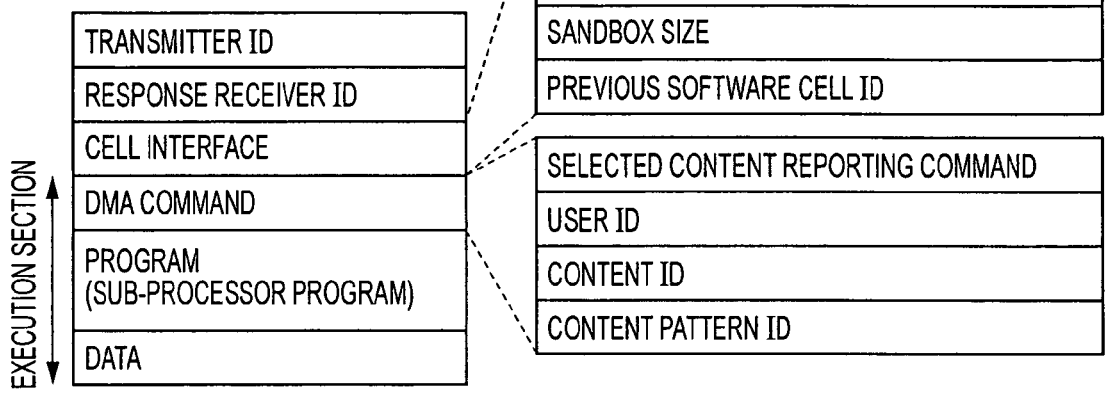
FIG. 23 is an illustration of the configuration of a selected content reporting command.

FIG. 23 shows the configuration of a selected content reporting command. This is a software cell for a slave to report content selected by a user who operates the slave. A DMA command part of this software cell has a selected content reporting command, a user ID, a content ID, and a content pattern ID of selected content.

Figure 24:
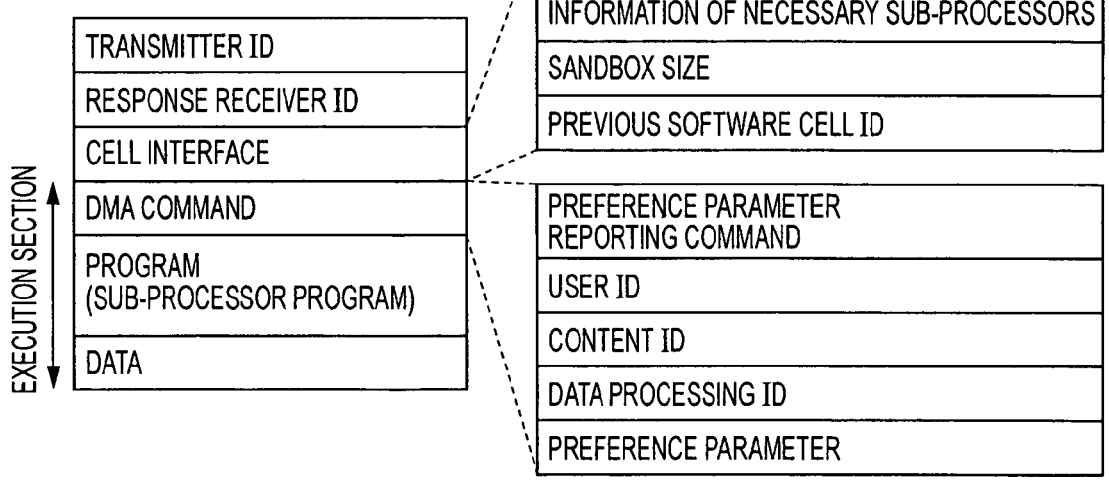
FIG. 24 is an illustration of the configuration of a preference parameter reporting command.

FIG. 24 shows the configuration of a preference parameter reporting command. This is a software cell for a slave to report, to the master, data processing preferred by the user and a parameter for use in the data processing. A DMA command part of this software cell has a preference parameter reporting command, a user ID, a content ID, and a set of a data processing ID and a parameter a preference parameter used therewith as processing details preferred by the user.

Figure 25:
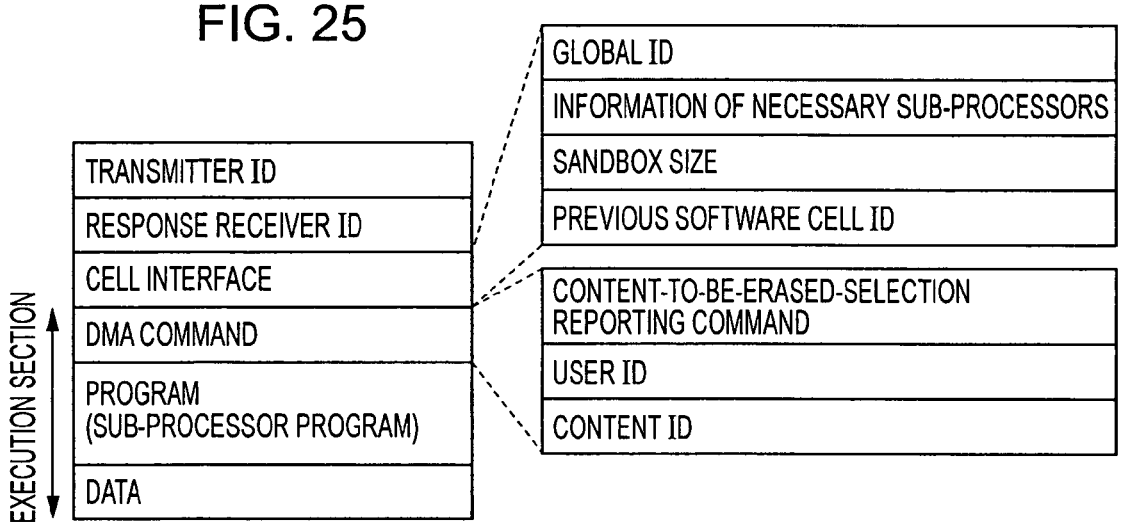
FIG. 25 is an illustration of the configuration of a content-to-be-erased-selection reporting command.

FIG. 25 shows the configuration of a content-to-be-erased-selection reporting command. This is a software cell for a slave to report, to the master, content whose erasure is requested by the user. A DMA command part of this software cell has a content-to-be-erased-selection reporting command, a user ID, and the content ID of selected content.

Figure 26:
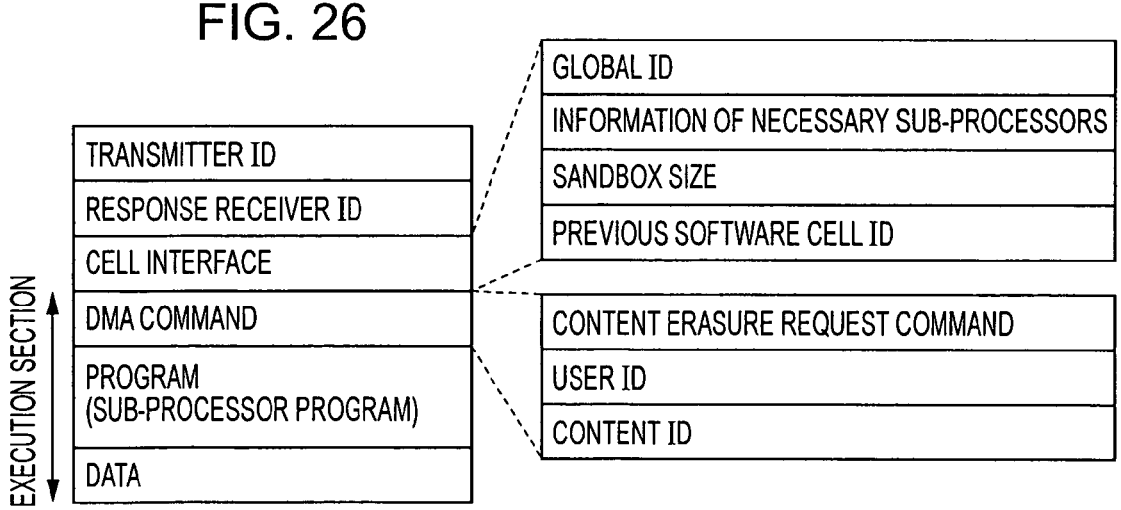
FIG. 26 is an illustration of the configuration of a content erasure request command.

FIG. 26 shows the configuration of a content erasure request command. This is a software cell for the master to request a slave storing content to erase original content, whose erasure is requested by the user, and content automatically generated based on the original content. A DMA command part of this software cell has a content erasure request command, a user ID, and the content ID of selected content.

Figure 27:
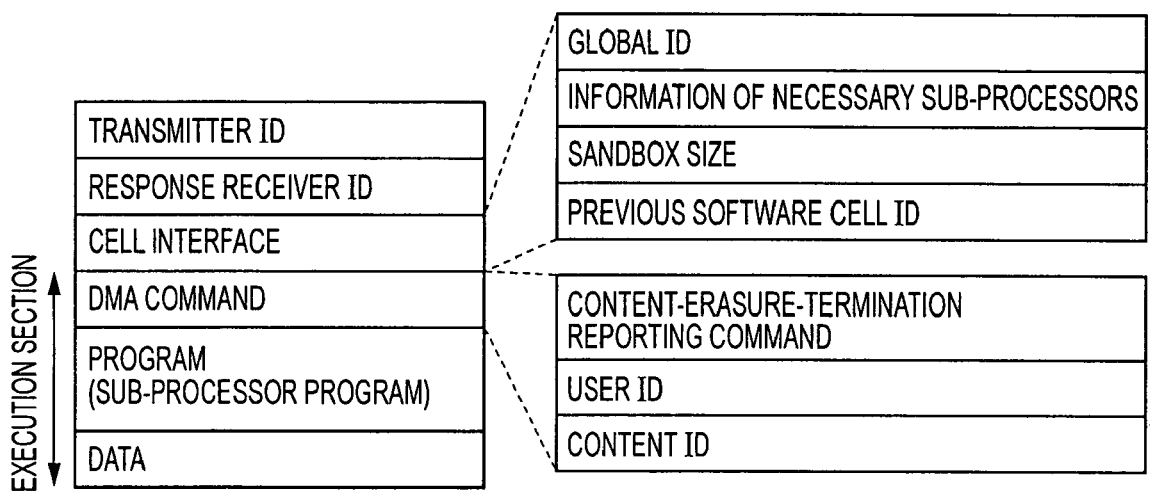
FIG. 27 is an illustration of the configuration of a content-erasure-termination reporting command.

FIG. 27 shows the configuration of a content-erasure-termination reporting command. This is a software cell for a slave to report, to the master, termination of content erasure requested by the master. A DMA command part of this software cell has a content-erasure-termination reporting command, a user ID, and a content ID.

B-2. Embodiments

A content processing system according to each of embodiments of the present invention learns user's preferences from content used by the user and processing details requested by the user, and performs automatic data processing that matches the user's preferences. The above data processing can be realized by using an information processing apparatus, having surplus processing capability, among a plurality of information processing apparatuses that operate in linked form as a virtual information processing apparatus. Alternatively, the above data processing can be realized, in an information processing apparatus including a multiprocessor information-processing controller including at least one sub-processor and a main processor for ordering the sub-processors to execute a program, one sub-processor having surplus processing capability.

B-2-1. First Embodiment

At first, a use case is described below in which, when a plurality of information processing apparatuses operate, with them mutually linked, by automatically performing data processing on original content stored in one information processing apparatus by using a free time of resources of the information processing apparatuses, plural patterns of content are newly generated for one piece of the original content. In addition, a mechanism which displays the generated patterns of content and which learns user's preferences, a mechanism that, when the user erases the original content, erases the original content and content generated based on the original content are described below.

In the following description, content to be processed is a still image but may be content such as audio or video. In addition, quality-improving filtering is used as data processing preferred by the user. However, the data processing in the present invention is particularly not limited to such filtering.

Figure 28:
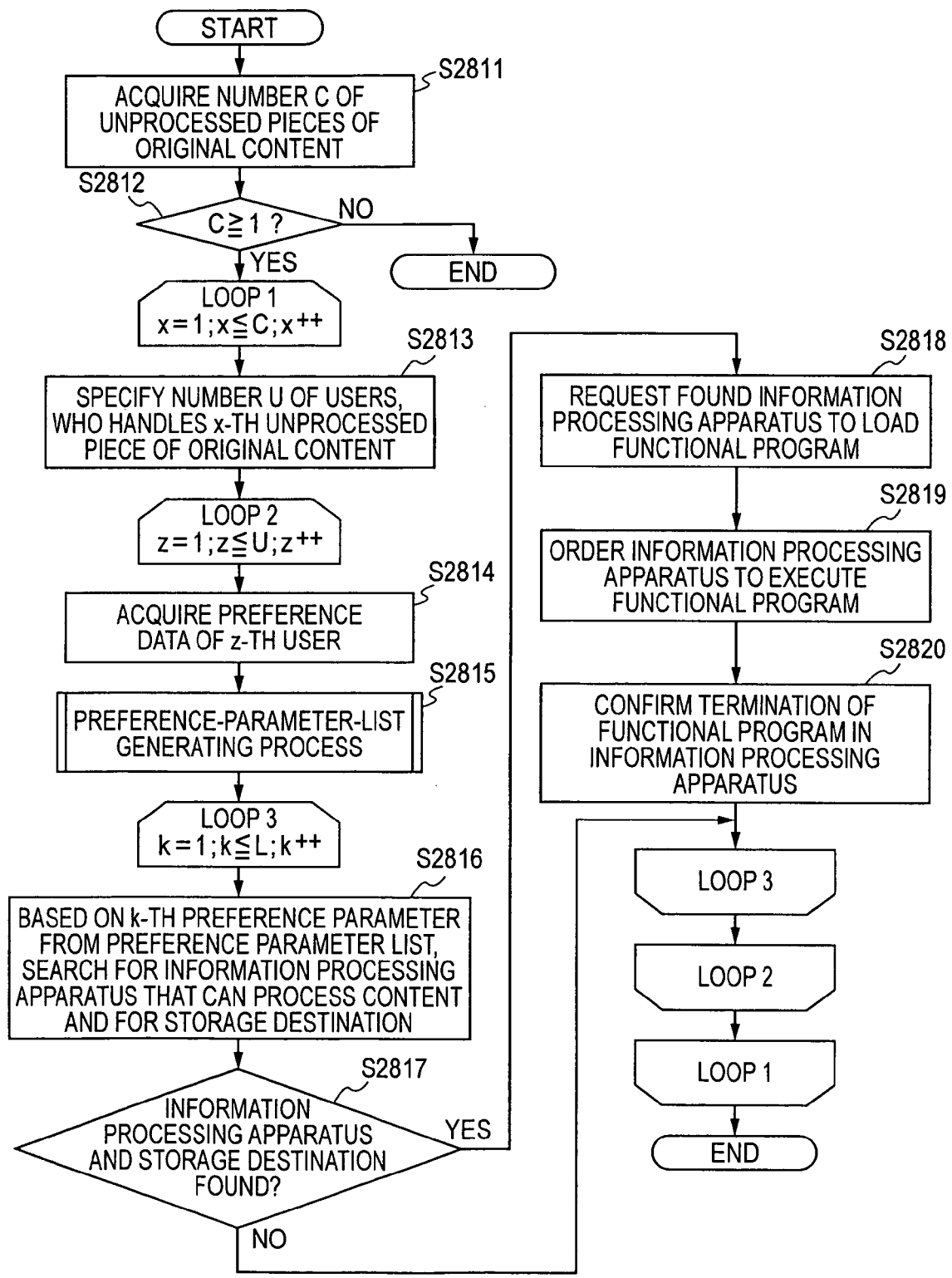
FIG. 28 is a flowchart a process of a master in the case of automatically generating plural patterns of content in data processing for the purpose of improving quality.

FIG. 28 shows, in flowchart form, a process of a master in which, in a use case for automatically generating content, plural patterns of content are automatically generated in data processing for the purpose of quality improvement.

In step S2811, the master searches for unprocessed pieces of original content and acquires the number C of pieces of original content.

In step S2812, it is determined whether or not the number C of pieces of original content is one or greater. If the number C of pieces of original content is not one or greater (i.e., zero), the process is finished since it is necessary to automatically generate content. If the number C of pieces of original content is one or greater, the process proceeds to the next step.

In step S2813, regarding the x-th (x=1 to C) unprocessed piece of original content, the master acquires the number U of users who handle the x-th unprocessed piece of original content.

In step S2814, the master acquires preference data of the z-th (z=1 to U) user.

In step S2815, based on the preference data, the master generates a total of L preference parameters by performing a preference-parameter-list generating process (defined separately), and generates a preference parameter list (see Table 8). Details of the preference-parameter-list generating process are described later.

In step S2816, the master extracts the k-th (k=1 to L) preference parameter from the preference parameter list, and uses the preference parameter to search for an information processing apparatus that can process the original content, and a storage destination.

If, in step S2817, it is determined that the server has found the information processing apparatus that can process the original content and the storage destination, the server transmits the software cell (see FIG. 17) of the data-processing reporting command to request the information processing apparatus (hereinafter referred to simply as the "slave") to load the quality-improving functional program. If, in step S2817, it is determined that the server has not found the information processing apparatus that can process the original content and the storage destination, the process returns to step S2816 and searches for an information processing apparatus that can process the original content and a storage destination concerning the next preference parameter.

In step S2819, after receiving the software cell (see FIG. 18) of the functional-program-loading-completion reporting command from the slave and confirming completion of loading into the slave of the quality-improving functional program, the master transmits the software cell of the functional program execution command to order the slave to execute the quality-improving functional program.

In step S2820, the master confirms the termination of the quality-improving process of the slave by receiving the software cell (see FIG. 19) of the functional-program-termination reporting command. After that, the master adds a storage destination of generated content to a content storage destination section of the preference parameter.

After that, a process that generates new content by using the preference parameter is performed L times which is the number of preference parameter lists (loop 3).

In addition, a process that generates a preference parameter list for each of users and generates new content by using a preference parameter is performed U times which is the number of users (loop 2).

Furthermore, a process that, for the original content, for each user, generates pieces of new content, whose number is the number of preference parameter lists, is performed C times which is the number of unprocessed pieces of original content (loop 1).

If, in step S2817, it is determined that the server has not found the information processing apparatus that can process the original content and the storage destination, no data processing is performed, so that a storage destination in the preference parameter list is in blank. For data processing in which the storage destination in the preference parameter list is in blank, as soon as an information processing apparatus that can perform the data processing and a storage destination are later found, by performing the data processing in order, automatic generation of content can be performed while confirming availability of the resources.

Figure 29:
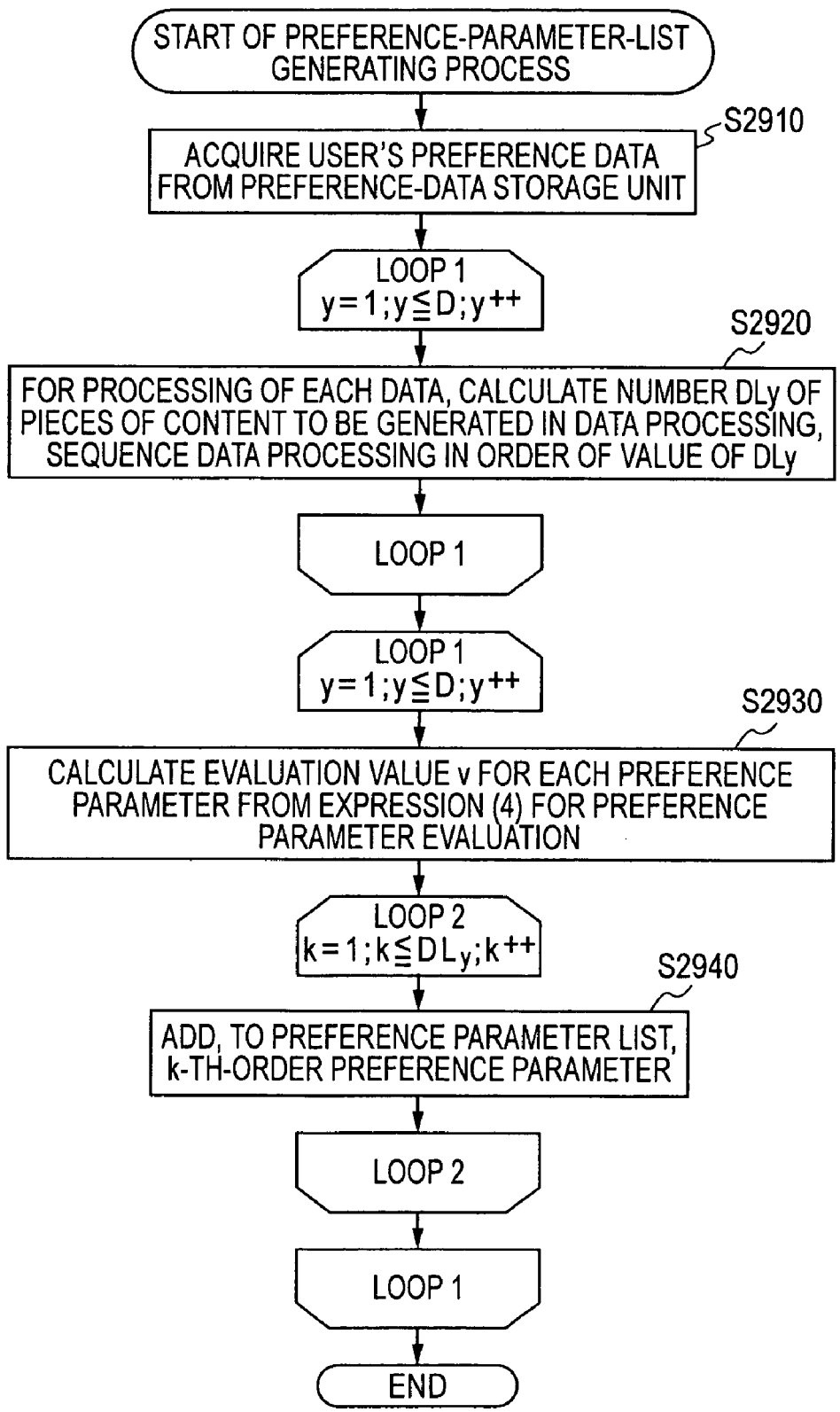
FIG. 29 is a flowchart showing a process for generating a preference parameter list.

FIG. 29 shows, in flowchart form, the preference-parameter-list generating process executed in step S2815.

In step S2910, the master acquires user's preference data, which is to be processed.

In step S2920, for each type of data processing, expression (3) is used to calculate the number $DL_y$ of pieces of content which are generated in the type of data processing, and the types of data processing are sequenced in descending order of the values of $DL_y$.

In step S2930, sequentially from a type of data processing in which the value of $DL_y$ is the largest, for combinations of preference parameters having all possible numerical value patterns of each parameter in each type of data processing, evaluation value v of each preference parameter is calculated from the above preference parameter evaluation expression (4).

In step S2940, the preference parameters are stored in order in the preference parameter list in descending order of the value of v.

Figure 30:
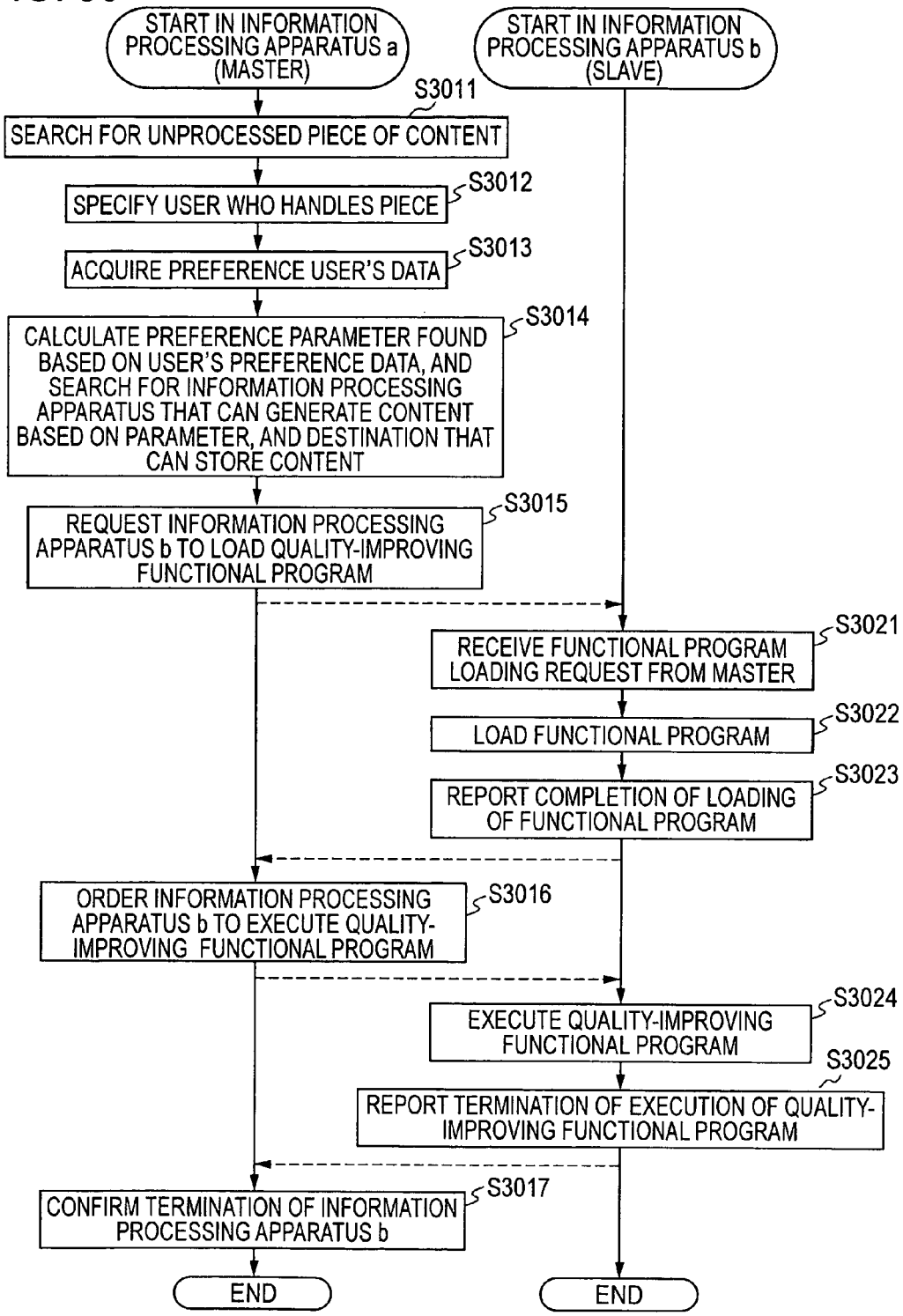
FIG. 30 is a flowchart showing an operation sequence between a master and a slave in the case of automatically generating content.

FIG. 30 shows an operation sequence between a master and a slave in the case of automatically generating content. In FIG. 30, information processing apparatus a operates as a master and information processing apparatus b operates as a slave.

The master searches for unprocessed content in step S3011, specifies a user who handles the content in step S3012, and acquires preference data of the user in step S3013. In step S3014, the master calculates a preference parameter found based on the user's preference data, and searches for an information processing apparatus that can generate content and for a destination that can store the content.

Here, it is assumed that information processing apparatus b, which operates as a slave, is found as an information processing apparatus that can generate an information processing apparatus. Accordingly, in step S3015, the master requests this slave to load a quality-improving functional program that executes data processing preferred by the user.

When receiving the functional program loading request from the master in step S3021, the slave loads the functional program (in step S3022) and reports completion of the loading to the master (in step S3023).

In step S3016, when receiving the completion of the loading of the functional program, the master orders the slave to execute the quality-improving functional program.

In response to this order, the slave executes the quality-improving functional program in step S3024, and, when the execution of the program terminates, the slave reports the termination to the master in step S3025. In step S3017, the master confirms the termination of the program-improving functional program.

In such a mechanism, data processing preferred by the user is automatically performed by using free resources of the system, whereby content is generated before being requested by the user.

After the user requests a content list, the user can select preferred content from the content list. The content processing system learns the user's preferences when the content is selected. The phrase "the content is selected" means selecting the content and requesting some processing, such as the user' requesting display of the content, and the user's requesting copy of the content to another storage destination.

Figure 31:
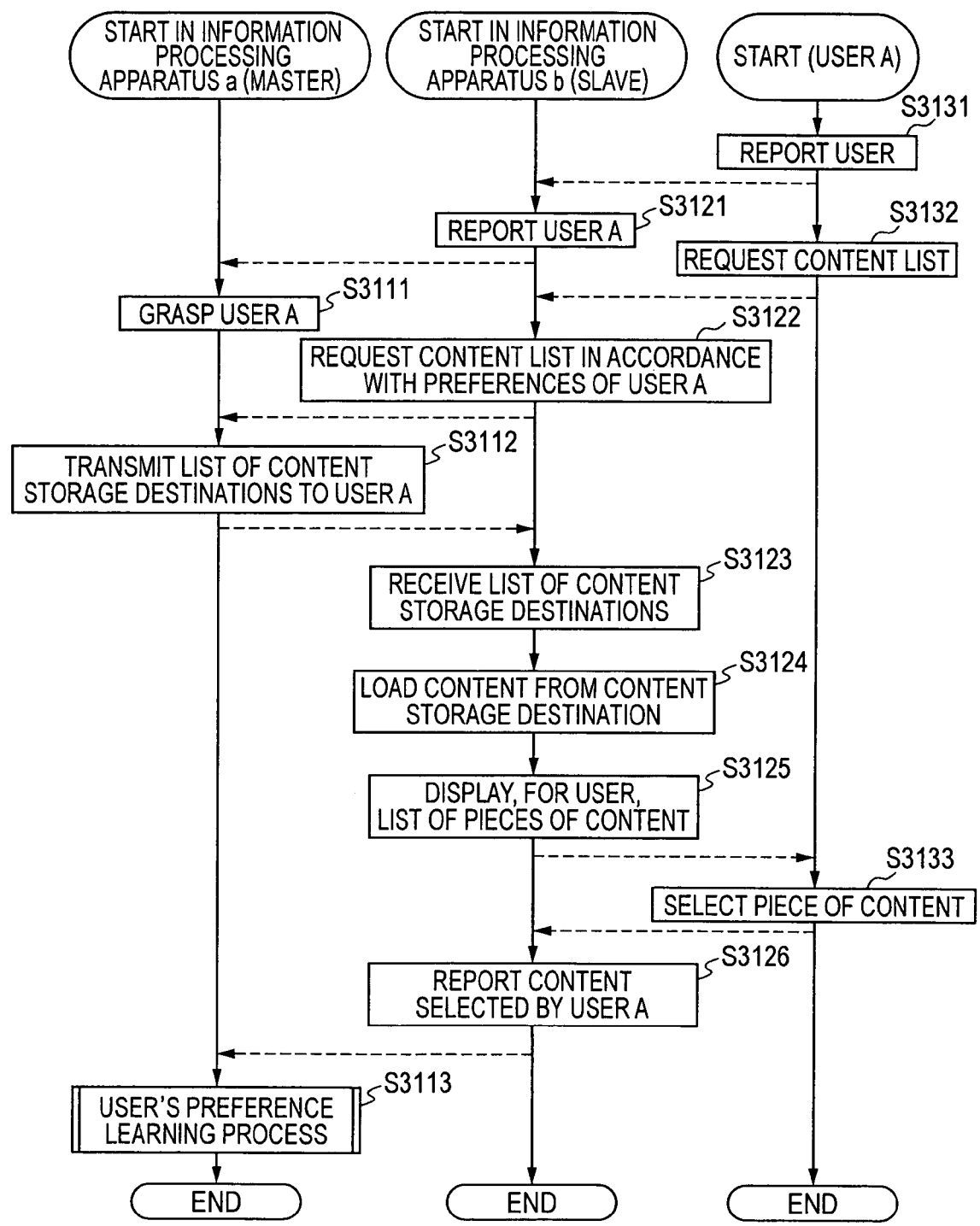
FIG. 31 is a flowchart showing an operation sequence for learning user's preferences in the content processing system.

FIG. 31 shows an operation sequence for learning user's preferences in the content processing system. In the example shown in FIG. 31, the content processing system includes information processing apparatus a, which operates as a master, and information processing apparatus b, which operates as a slave. When user A performs an operation on the slave, preferences of user A is learned.

In step S3131, user A reports, to information processing apparatus b, who the user A is. In step S3121, the slave, which is operated by the user, acquires the user ID of the user and transmits the software cell (see FIG. 20) of the user notification command to the master.

When, for certain original content, the user requests a list of automatically generated pieces of content in step S3132, in step S3122, the slave acquires the content ID of the content, and reports the content list to the master by transmitting the software cell (see FIG. 21) of the content-list-request reporting command.

The master uses the user ID and the content ID to specify a preference parameter list (see Table 8) of the user, and transmits storage destinations of pieces of content to the slave in a form stored in the software cell of the content-storage-destination reporting command (in step S3113).

After receiving information of the content from the received software cell in step S3123, the slave loads all the pieces of content from the storage destinations into its main memory in step S3124. In step S3125, the slave displays a content list for the user.

Accordingly, viewing the displayed content list, the user can select a desired piece of content in step S3133. After some piece of content is selected, the slave stores the content pattern ID of the piece of content in the software cell (see FIG. 23) of the selected content reporting command, and transmits the software cell to the master in step S3126.

In step S3133, the master performs a user's preference learning process in response to the selected content report from the slave.

Figure 32:
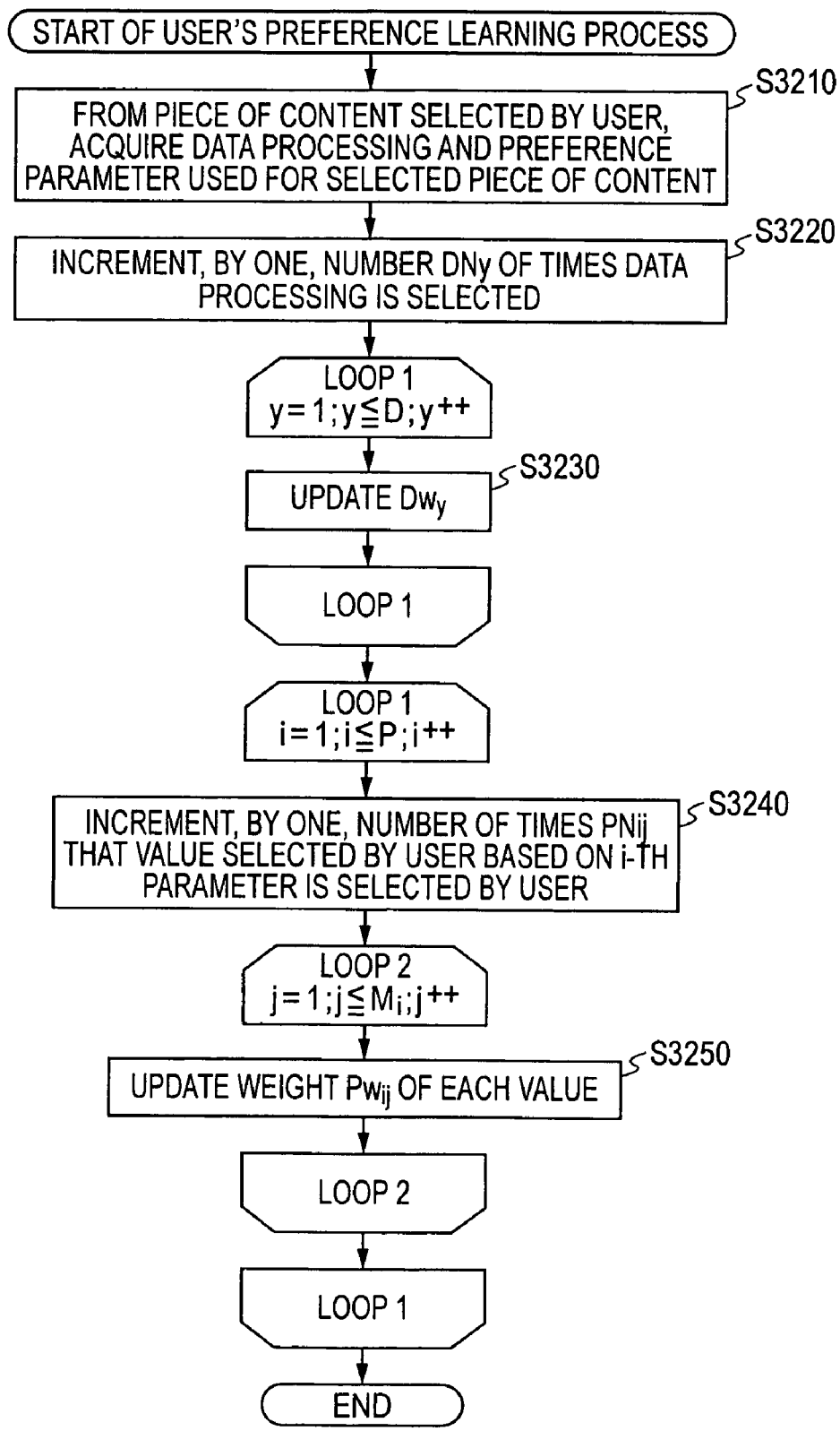
FIG. 32 is a flowchart showing a process of a master for learning user's preferences.

FIG. 32 shows, in flowchart form, a user's preference learning process of the user.

After receiving the software cell of the selected content reporting command, the master acquires a type of data processing used for generating the piece of content from the content pattern ID of the piece of content selected by the user, and a preference parameter from the preference parameter list (step S3210).

In step S3220, in the preference-data processing table, the number $DN_y$ of times that data processing is selected by the user is incremented by one. In step S3230, by using the above-described weight updating expression (1), the weight of each type of data processing is updated.

In step S3240, in the preference parameter table, the number $PN_{ij}$ of times that the preference parameter is selected is incremented by one. In step S3250, by using the above-described weight updating expression (2), the weight $Pw_{ij}$ of each value is updated.

By learning the user's preferences, even in the case of performing the same data processing, evaluation value v calculated by the preference parameter expression (4), which is based on the user's preference parameters and the numerical values, is large. Consequently, the user's preference parameter is listed at a higher level in the preference parameter list. Therefore, when the data processing is automatically performed by using a free part of the resources, timing with which content preferred by the user is generated is faster. Thus, when the user requests preferred content, a possibility that the content has already been generated is high. In other words, an improvement in system response can be expected.

Next, a mechanism in a case in which, in the content processing system according to this embodiment, the user erases original content is described below.

When the user erases original content, a large number of pieces of content automatically generated based on the content are automatically erased. Thus, the need for the user to erase the pieces of content one by one is eliminated.

Figure 33:
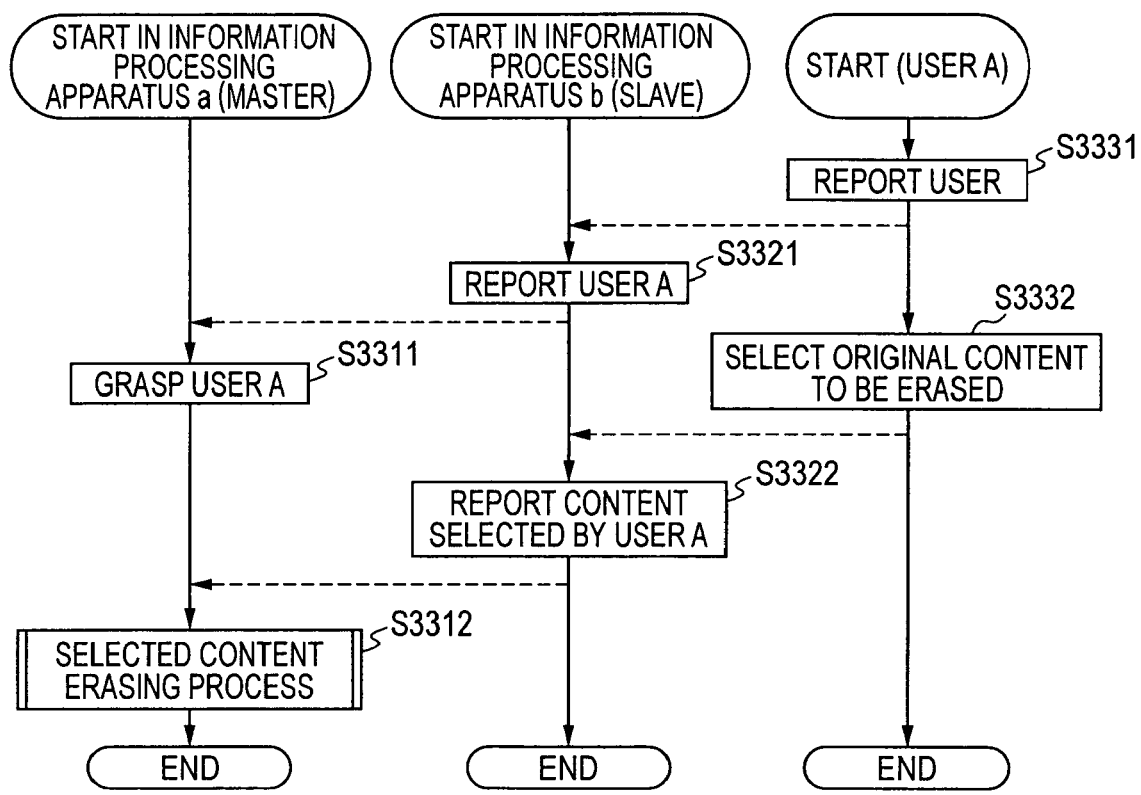
FIG. 33 is a flowchart showing an operation sequence in a case in which, in the content processing system, original content to be erased is selected by a user.

FIG. 33 shows an operation sequence in a case in which, in the content processing system, original content to be erased is selected by the user.

In step S3331, user A reports the identification of user A to information processing apparatus b, which operates as a slave. The slave, which is operated by user A, acquires the user ID of user A, and reports user A to a master in step S3321 by transmitting the software cell (see FIG. 20) of the user notification command to the master.

In step S3332, user A selects content to be erased. In step S3322, the slave stores the user ID and the content ID of the content in the software cell (see FIG. 25) of the content-to-be-erased-selection reporting command, and transmits the software cell to the master.

In step S3312, the master performs a selected content erasing process after receiving the software cell of the content-to-be-erased-selection reporting command.

Figure 34:
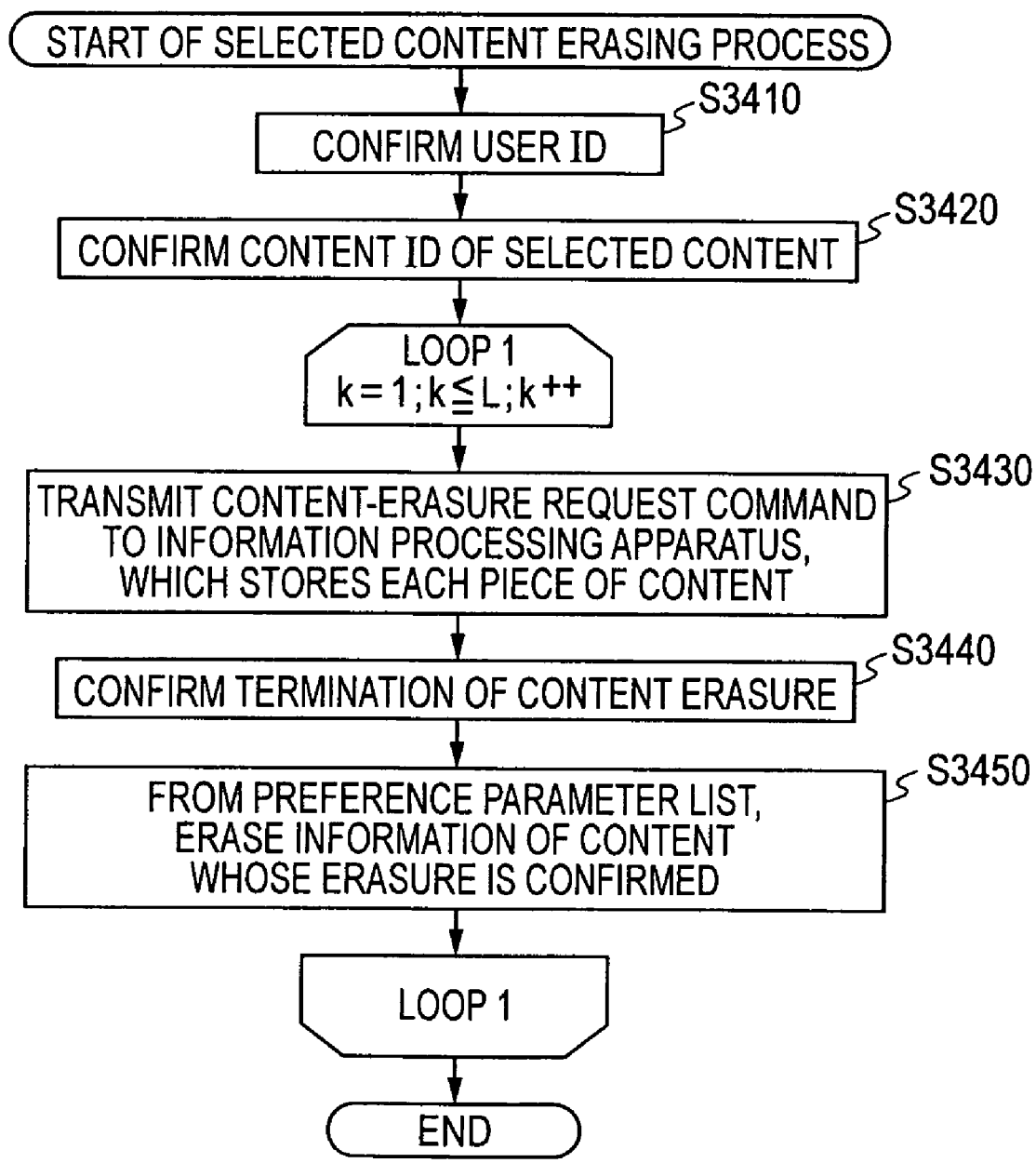
FIG. 34 is a flowchart showing a process a process in which the master erases the content in response to selection of content to be erased.

FIG. 34 shows, in flowchart form, a process in which the master erases the content in response to selection of content to be erased.

The master analyzes the software cell (see FIG. 25) of the content-to-be-erased-selection reporting command and confirms the user ID and the content ID (in steps S3410 and S3420). From the preference parameter lists (see Table 8) of the user, the master extracts a preference parameter list of content, whose erasure is requested, and acquires a storage destination of each content pattern.

In step S3430, the master transmits the software cell (see FIG. 26) of the content erasure request command to each information processing apparatus, which stores each piece of content.

Next, in step S3440, the master receives the software cell (see FIG. 27) of the content-erasure-termination reporting command from the information processing apparatus, to which the master transmits the software cell (see FIG. 26) of the content erasure request command. In step S3450, the master erases the item of the content pattern, whose erasure is confirmed, from the preference parameter list.

The above-described process that transmits the content erasure request command to a storage destination of content generated from the original content and confirms content erasure is performed L times, which is the number of preference parameter lists, by the master.

Figure 35:
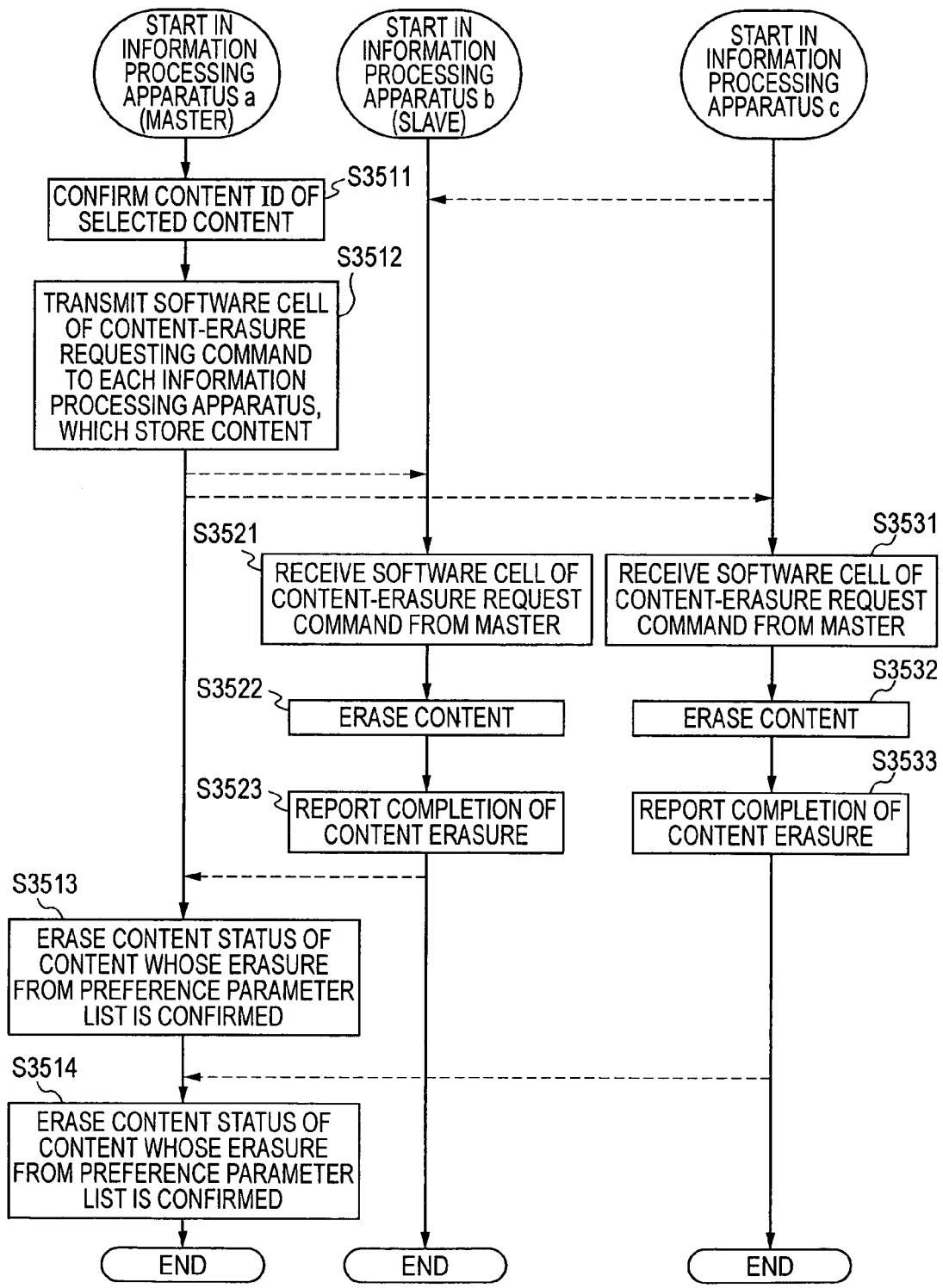
FIG. 35 is a flowchart showing an operation sequence for performing a selected content erasing process in a content processing system.

FIG. 35 shows an operation sequence for performing the selected content erasing process in the content processing system.

Although FIG. 35 exemplifies a case in which two information processing apparatuses b and c, which operate as slaves, are used as storage destinations to store pieces of content generated from the selected original content, even in a case having more storage destinations, the selected content erasing process can be realized by a similar operation sequence. In addition, also in a case in which a plurality of content, whose erasure is requested, are stored in one information processing apparatus, the software cell (see FIG. 26) of the content erasure request command is received from the master a number of times, which is the number of pieces of content stored.

By confirming the selected content ID (in step S3511) and referring to the preference parameter list, information processing apparatus a, which operates as a master (in step S3512), specifies each information processing apparatus, which serves as a storage destination for each piece of content generated in data processing based on the selected content. In the example shown in FIG. 35, information processing apparatuses b and c, which operate as slaves, are specified. Information processing apparatus a transmits the software cell (see FIG. 26) of the content erasure request command to each of information processing apparatuses b and c.

When each of information processing apparatuses b and c receives the software cell of the content erasure request command (in step S3521, S3531), it erases content specified by the command (in step S3522, S3532), and transmits a software cell of a content-erasure-completion reporting command to information processing apparatus a (in step S3523, S3533).

After being notified of completion of content erasure from each information processing apparatus, which transmits the content-erasure-completion reporting command, information processing apparatus a erases an information entry of the content, whose erase is confirmed.

When, as described above, the user erases certain original content, a large number of pieces of content automatically generated based on the original content are automatically erased. Therefore, the need of the user to erase the pieces of content one by one is eliminated.

B-2-2. Second Embodiment

A use case is described below in which, in an information processing apparatus including a multiprocessor information processing controller including at least one sub-processor and a main processor for ordering the sub-processors to execute a program, by performing automatic data processing using sub-processors having surplus processing capabilities, plural patterns of content are generated for one original content.

Figure 36:
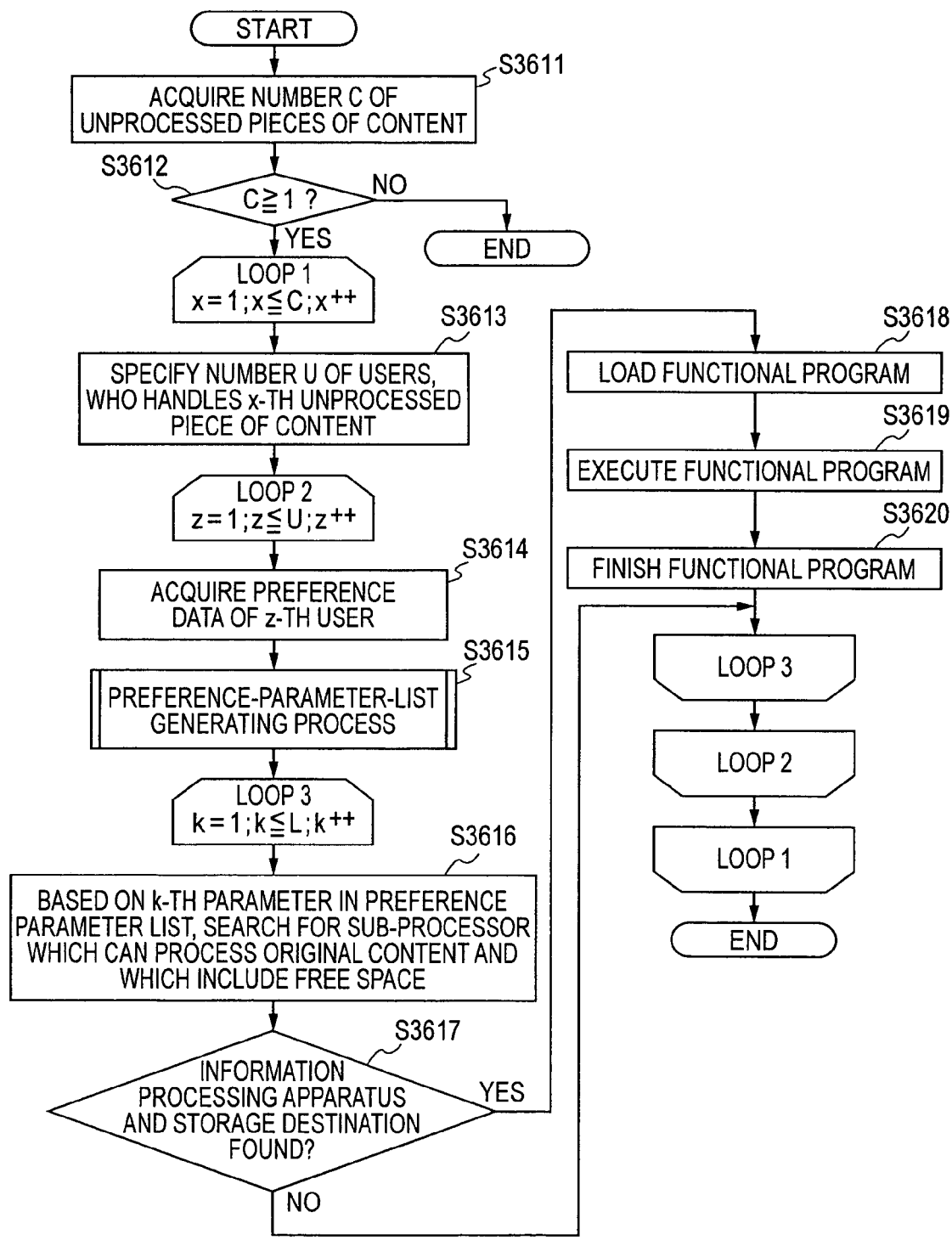
FIG. 36 is a flowchart showing a process in which one information processing apparatus performs automatic data processing by using sub-processors in an information processing controller having surplus processing capability.

FIG. 36 shows, in flowchart form, a process in which one information processing apparatus performs automatic data processing by using sub-processors in an information processing controller having surplus processing capability.

In step S3611, the main processor searches for unprocessed pieces of original content, and acquires the number C of pieces of original content.

When, in step S3612, the number C of pieces of original content is not one or greater, that is, zero, the process finishes since it is not necessary to automatically generate content. When, in step S3612, the number C of pieces of original content is one or greater, the subsequent steps are performed.

In step S3613, the main processor acquires the number U of users, who handle the x-th (x=1 to C) piece of original content.

In step S3614, the main processor acquires preference data of the z-th (z=1 to U) user.

In step S3615, by performing a preference-parameter-list generating process, which is separately defined, from the preference data, the main processor generates a total of L preference parameters and generates a preference parameter list (see Table 8).

In step S3616, the main processor extracts the k-th preference parameter (k=1 to L) from the preference parameter, and uses the preference parameter to search for a sub-processor which can process original content and which include free space in its storage area.

If the sub-processor which can process original content and which include free space in its storage area is found (in step S3617), a quality-improving functional program is loaded into the local storage of the sub-processor (in step S3618). Alternatively, if the sub-processor which can process original content and which include free space in its storage area is not found, the process returns to step S3616, and, for the next preference parameter, the main processor searches for a sub-processor which can process original content and which include free space in its storage area.

In step S3619, after the quality-improving functional program is loaded, the sub-processor executes the loaded functional program. After, in step S3620, the main processor confirms the termination of the functional program by the sub-processor, the main processor adds a storage destination of the generated content, to a section of content storage destinations in the preference parameter list.

After that, generation of new content by using a preference parameter is performed L times, which is the number of preference parameter lists (in loop 3).

In addition, generation of a preference parameter list for each user and generation of new content by using a preference parameter are performed U times (in loop 2).

Moreover, generation, from original content, of new pieces of content, whose number is the number of preference parameter lists, is performed C times, which is the number of the unprocessed pieces of content (in loop 1).

If, in step S3617, a sub-processor which can process the original content and which includes free space in its storage area, data processing corresponding thereto is not performed, so that a storage destination in the preference parameter list has blank space. Regarding data processing in which the storage destination in the preference parameter list has blank space, the data processing is sequentially performed as soon as a sub-processor which can perform the data processing and which includes free space in its storage area is found, whereby automatic generation of content can be performed while confirming resource availability.

Figure 37:
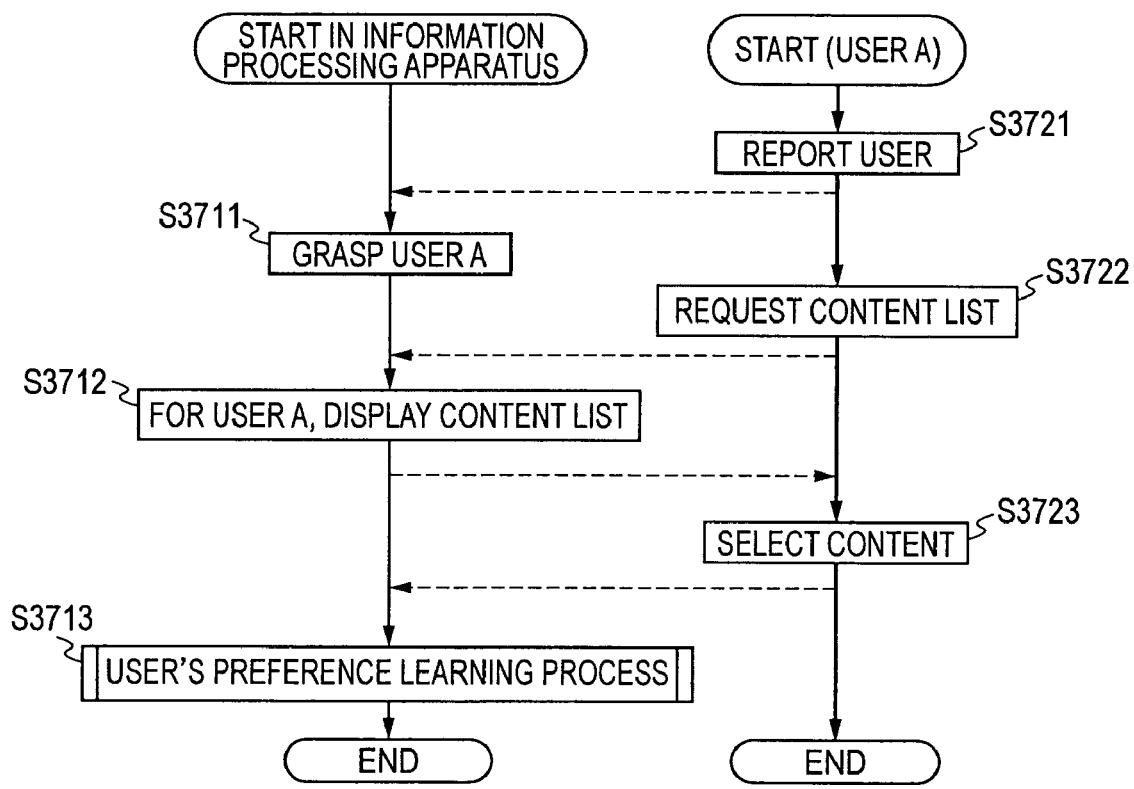
FIG. 37 is a flowchart showing an operation sequence for one information processing apparatus to perform user's preference learning by using sub-processors in an information processing controller having surplus processing capability.

FIG. 37 shows an operation sequence for one information processing apparatus to perform user's preference learning by using sub-processors in an information processing controller having surplus processing capability.

In step S3721, user A reports, to the information processing apparatus, who the user A is.

When, in step S3722, user A requests a list of automatically generated pieces of content from the information processing apparatus, the information processing apparatus displays the content list for user A in step S3712.

Accordingly, viewing the content list, user A can select a desired piece of content. Selection of some piece of content in step S3723 causes the information processing apparatus to perform, for user A, a preference learning process based on the piece of content selected by user A.

Figure 38:
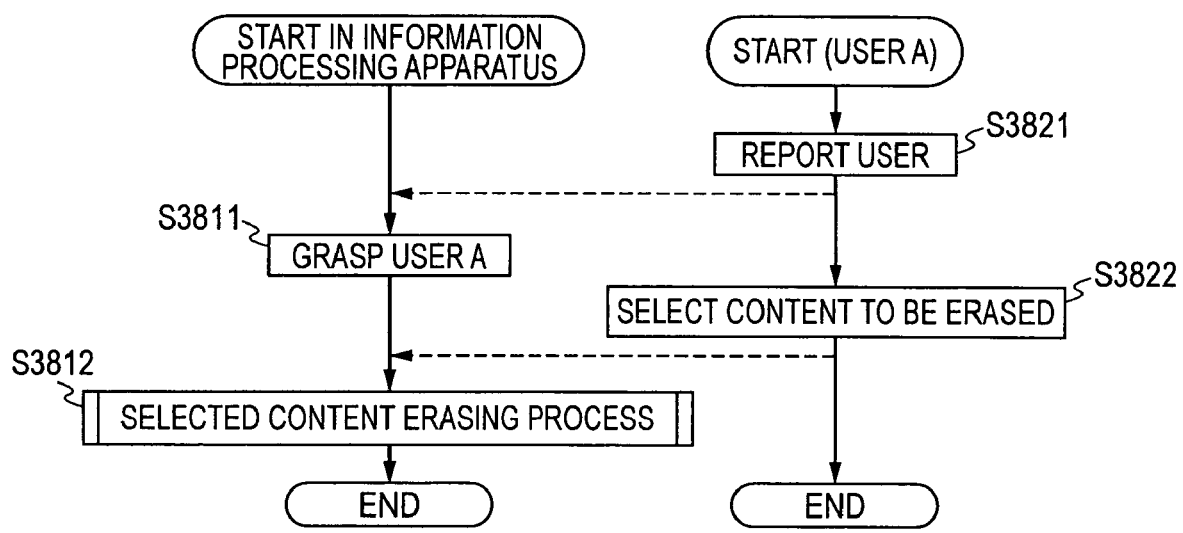
FIG. 38 is a flowchart showing an operation sequence for one information processing apparatus to erase original content, which is to be erased, by using sub-processors in an information processing controller having surplus processing capability.

FIG. 38 shows an operation sequence for one information processing apparatus to erase original content, which is to be erased, by using sub-processors in an information processing controller having surplus processing capability.

In step S3821, user A reports, to the information processing apparatus, who the user A is. In step S3811, the information processing apparatus grasps user A.

When, in step S3822, user A selects content to be erased, the information processing apparatus performs a selected content erasing process in step S3812.

Figure 39:
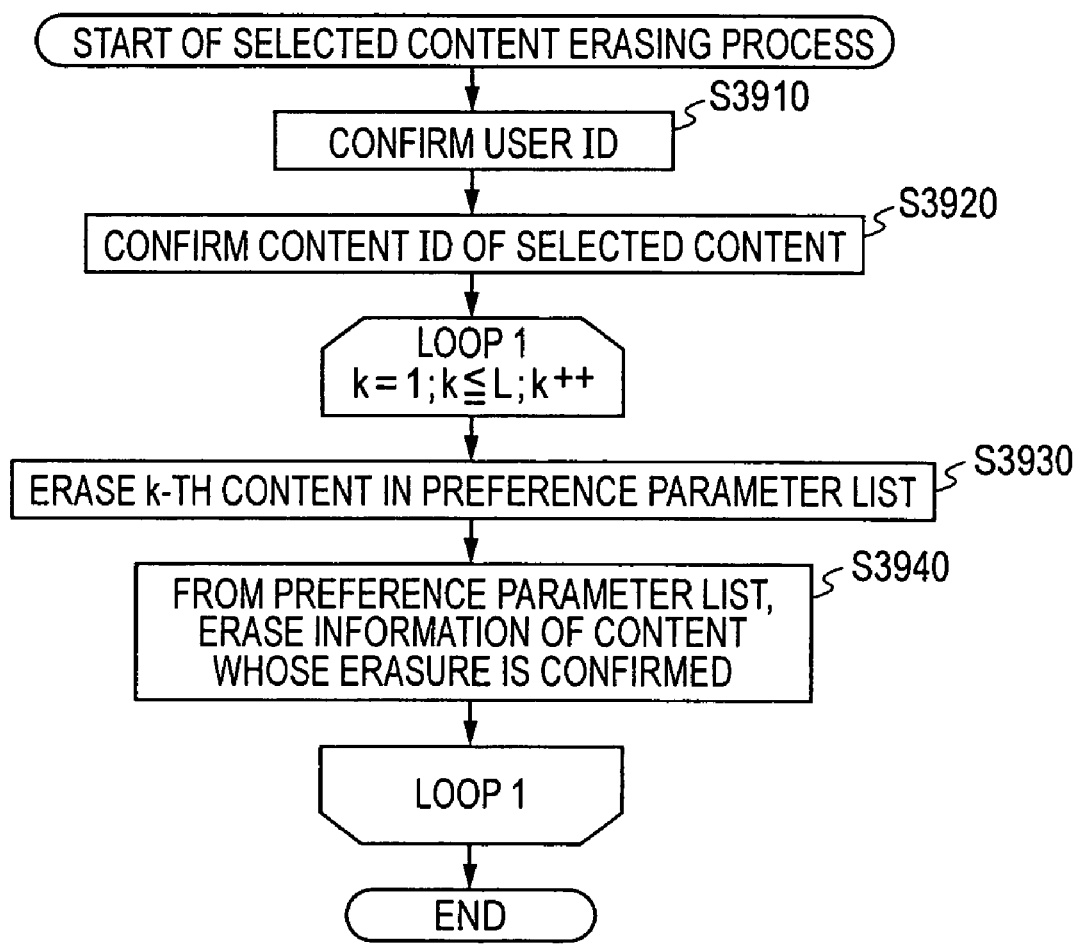
FIG. 39 is a flowchart showing a process in which, by using sub-processors in an information processing controller having surplus processing capability, one information processing apparatus erases content in response to user's selection of content to be erased.

FIG. 39 shows, in flowchart form, a process in which, by using sub-processors in an information processing controller having surplus processing capability, one information processing apparatus erases content in response to user's selection of content to be erased.

The main processor confirms user ID in step S3910 and confirms the selected content ID in step S3920. In addition, from preference parameter lists (see Table 8) for the user, the main processor extracts a preference parameter list for content, whose erasure is requested, and acquires a storage destination of each content pattern.

In step S3930, the main processor orders the sub-processors to erase each piece of content.

After content erasure is executed by a sub-processor, which stores the piece of content, the main processor erases, from the preference parameter list, the item of the content pattern, whose erasure is confirmed.

The above process that performs ordering a sub-processor, which stores each piece of content generated from original content, and erasing information of the piece of content from the preference parameter list is performed L times, which is the number of preference parameter lists.

B-2-3. Provision of Content Requested by User

This section describes a use case in which, when the user requests content on which certain data processing has already been performed, an information processing apparatus provides the content to the user after checking whether the content has already been generated.

Although the content in this embodiment is video, it may be types of content such as audio and still images. In addition, it is assumed that this content has metadata added thereto, which indicates that the content genre is "English conversation". Furthermore, the data processing is a type of processing in which video data encoded by MPEG-2 is re-encoded to MPEG-4 data. However, other data processing may be employed.

At first, processing is described in which, when a plurality of information processing apparatuses are mutually linked to operate, content requested by the user is provided.

When, for content stored in an information processing apparatus, the user requests content on which certain data processing has been performed, the information processing apparatus provides the content to the user after checking whether the content has already been generated. If the content (requested by the user) on which certain data processing has been performed has not been generated yet, resource availability is confirmed and the content is generated by using an information processing apparatus having surplus processing capability. The generated content is provided to the user.

In this case, it is assumed that user-preferred content has been generated by performing the automatic content generation (see FIG. 30) and the user's preference learning (see FIGS. 31 and 32). When it is indicated that the content genre is "English conversation", and the user sets beforehand the weight of "re-encoding (here referred to as data processing 3) from MPEG-2 to MPEG-4" to be large, as described in the preference data processing table shown as the following table 9, by setting a large value as the initial value of a number times data processing 3 is selected, compared with the initial value of a number of time other data processing is selected, the weight of data processing 3 can be set to be large.

TABLE 9

| Type of Data Processing (y) | Number $DN_y$ of Times of Selection | Weight $Dw_y$ |
| --- | --- | --- |
| Data Processing 1 | 1 | 1/(D + 9) |
| Data Processing 2 | 1 | 1/(D + 9) |
| Data Processing 3 | 10 | 1/(D + 9) |
| ... | ... | ... |
| Data Processing (D − 1) | 1 | 1/(D + 9) |
| Data Processing D | 1 | 1/(D + 9) |

Figure 40:
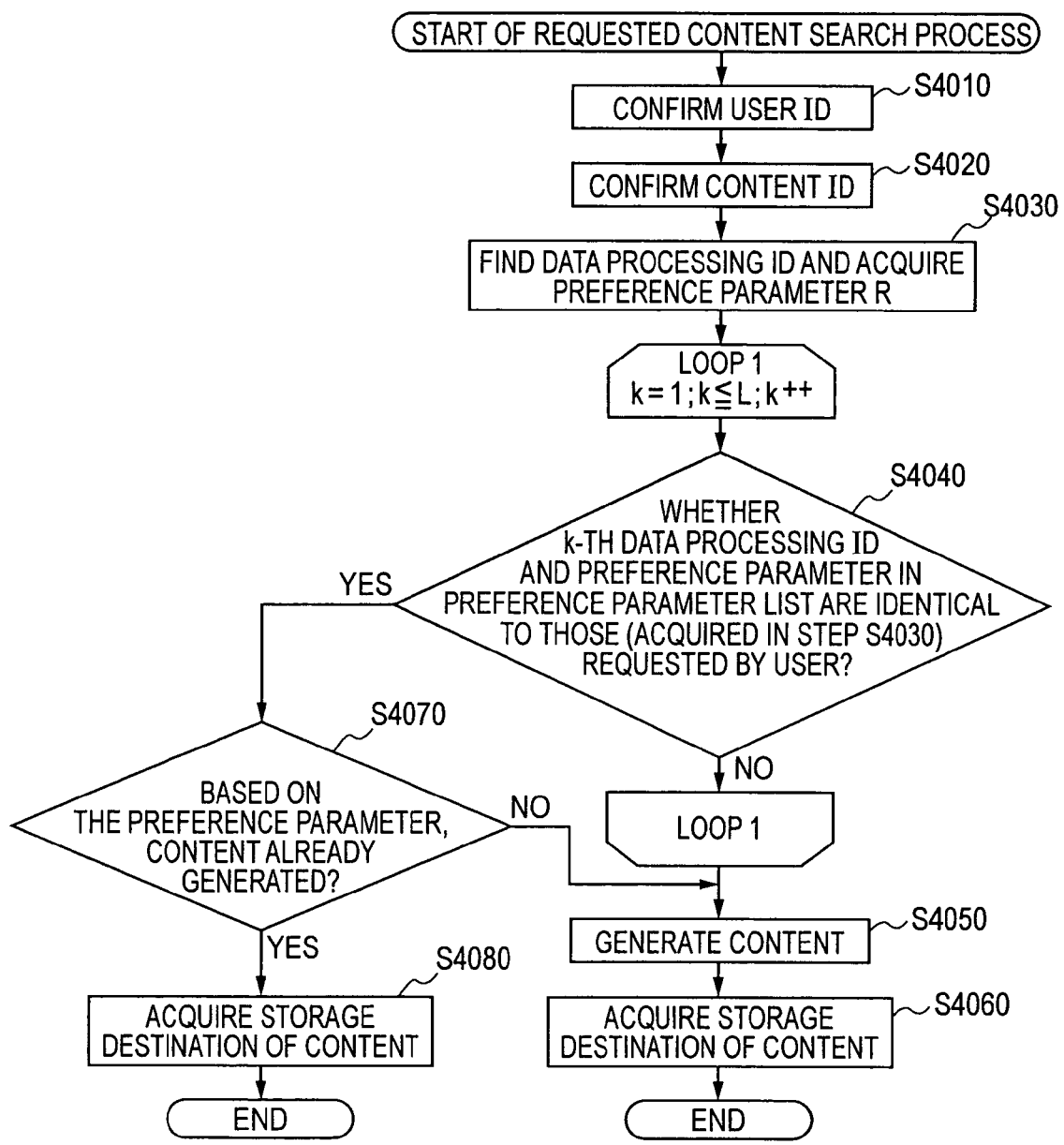
FIG. 40 is a flowchart a process which, in the content processing system, searches for content requested by a user.

FIG. 40 shows, in flowchart form, a process which, in the content processing system, searches for content requested by the user. In FIG. 40, it is assumed that, for "English conversation" content encoded by MPEG-2, the user requests "English conversation" content encoded by MPEG-4.

In step S4010, the master confirms a user ID to identify a user who requests the content.

In step S4020, the master confirms a content ID to identify what the content requested for data processing by the user is.

In step S4030, the master fines a data processing ID from a type of data processing (re-encoding from MPEG-2 to MPEG-4 in this case) requested by the user, and acquires the preference parameter (hereinafter referred to as "preference parameter R").

In step S4040, the master extracts the k-th (k=1 to L) data processing ID and preference parameter from the preference parameter list for the content confirmed in step s4020, and checks whether the extracted k-th data processing ID and preference parameter are identical to those extracted in step S4040.

Here, if the type of data processing requested by the user is included in the preference parameter list, in step S4070, the master checks whether the content has already been generated as the result of performing the data processing.

If, in step S4070, it is determined that the content has already been generated, in step S4080, the master acquires a storage destination of the content from the preference parameter list. After that, the requested content search process ends.

Alternatively, if, in step S4070, it is determined that the content has not already been generated, in step S4050, by searching for an information processing apparatus that can perform such data processing as re-encoding from MPEG-2 to MPEG-4 based on preference parameter R, and a storage destination, sequentially transmitting the software cell (see FIG. 17) of the data-processing reporting command and the software cell of the functional program execution command, and ordering the execution of the functional program, the master generates content. After receiving, from the information processing apparatus, the software cell (see FIG. 19) of the functional-program-termination reporting command, in step S4060, the master acquires a storage destination for the generated content. After that, the requested content search process ends.

Alternatively, if, in step S4040, it is determined that the type of data processing requested by the user is not included in the preference parameter list, similarly to the above, the master generates content by requesting an information processing apparatus, which operates as a slave, and which can perform re-encoding from MPEG-2 to MPEG-4 requested by the user (in step S4050). The master acquires a storage destination for the content and finishes the search process (in step S4060).

Figure 41:
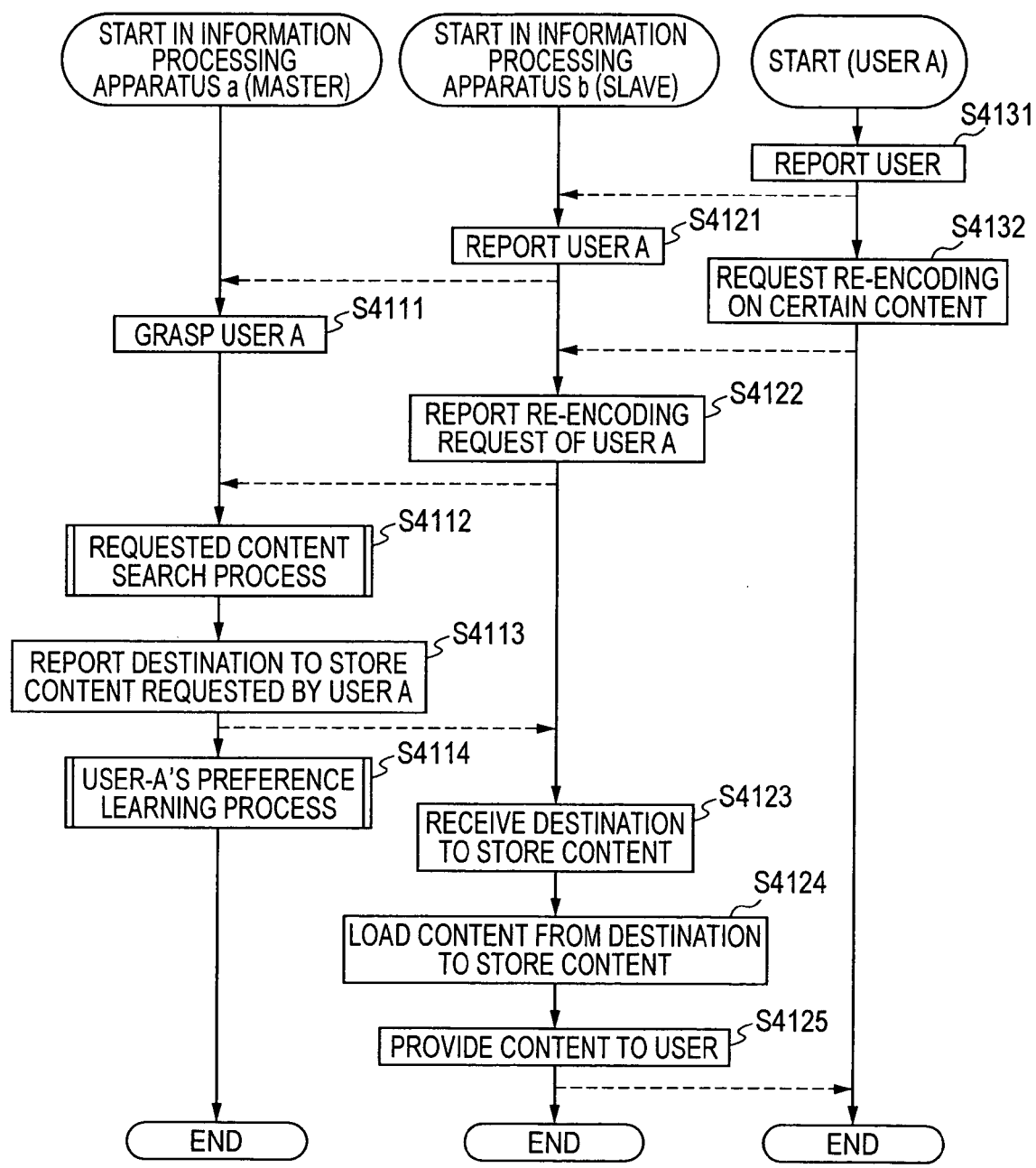
FIG. 41 is a flowchart showing an operation sequence performed, among a user, a slave operated by the user, and a master, for searching for content requested by the user.

FIG. 41 shows an operation sequence performed, among a user, a slave operated by the user, and a master, for searching for content requested by the user.

In step S4131, user A reports its identification to information processing apparatus b, which operates as a slave. The slave acquires a user ID, and reports user A by transmitting the software cell (see FIG. 20) of the user notification command.

In step S4132, user A requests MPEG-4 re-encoding on content encoded by MPEG-2, and reports, to the slave, a parameter for use in the re-encoding.

In step S4122, the slave generates the software cell (see FIG. 24) of the preference parameter reporting command, and reports, to the master, the content and data processing requested by user A and the type of the parameter.

In step S4112, by performing the requested content search process (see FIG. 40), the master acquires a storage destination of the requested content.

In step S4113, the master stores the storage destination of the requested content in the software cell (see FIG. 22) of the content-storage-destination reporting command (in this case, the number L of content storage destinations is one), and transmits the obtained software cell to the slave.

After receiving the software cell of the content-storage-destination reporting command from the master in step S4123, the slave extracts the content storage destination from the software cell and loads the content in step S4124. In step S4125, the slave provides the content to user A.

After reporting the content storage destination, the master performs the data processing (re-encoding from MPEG-2 to MPEG-4) requested by user A, and performs the user's preference learning process (see FIG. 32) based on the parameter.

Next, processing is described below in which, in an information processing apparatus including a multiprocessor information processing controller including at least one sub-processor and a main processor for ordering the sub-processor to execute a program, content requested by a user is provided by using each sub-processor having surplus processing capability.

Figure 42:
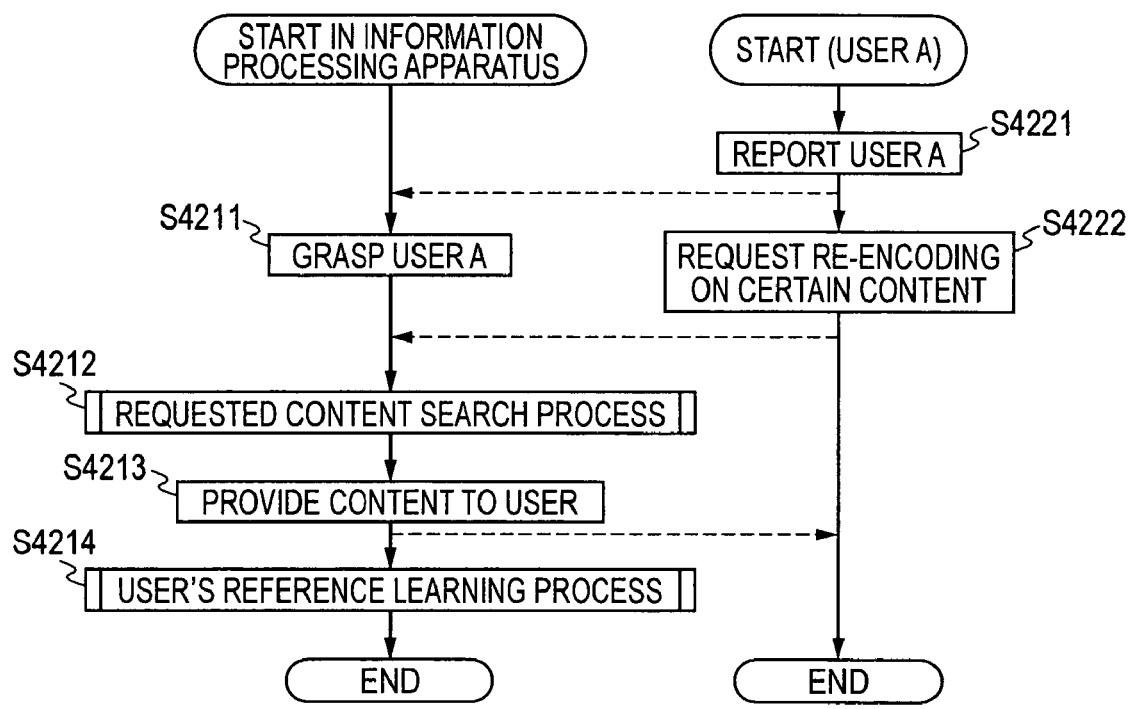
FIG. 42 is a flowchart showing an operation sequence performed, between a user and an information processing apparatus, for searching content requested by the user, by using sub-processors in an information processing controller having surplus processing capability.

FIG. 42 shows an operation sequence performed, between a user and an information processing apparatus, for searching content requested by the user.

In step S4221, user A reports its identification to the information processing apparatus. In step S4211, the information processing apparatus grasps user A.

In step S4222, user A requests MPEG-4 re-encoding on content encoded by MPEG-2, and reports a parameter for use in the re-encoding to the information processing apparatus.

In step S4212, by performing the requested content search process (see FIG. 40), the information processing apparatus acquires a storage destination of the requested content, and provides the storage destination to user A in step S4213.

After providing the content, in step S4214, the information processing apparatus performs the user's reference learning process (see FIG. 32) based on the data processing (re-encoding from MPEG-2 to MPEG-4) requested by user A and the parameter.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system for performing data processing on content, comprising
 a preference-data management means for managing user preferences concerning which types of data processing to perform on said content;
 a content generating means for generating content before receiving a request for said content by a user, by performing a user-preferred type of data processing on said content; wherein types of said data processing include image-quality improvement in which said content is edited to have preferred quality, and re-encoding that re-encodes said content from one encoding system into another encoding system;
 a content storage means for storing said content, as original content, and the content generated by said content generating means;
 a resource management means for managing system resources, and requesting said content generating means to process said content based on available system resources; and
 user-operation means for selecting content, wherein
 said preference-data management means learns user-preference information based on a type of data processing performed on a selected content, selected by said user-operation means,
 said preference-data management means calculates a weight for each type of data processing for each user in accordance with a number of times that each user selects each type of data processing,
 said content generating means selects a type of data processing for said content based on said weight,
 each type of the data processing is associated with at least one parameter which is set when each type of the data processing is performed on said content
 said preference-data management means calculates a weight for said at least one parameter for each user based on a number of times each user selects said at least one parameter, and
 when performing the type of the data processing on said content, said content generating means selects to use at least one parameter based on the weight of said at least one parameter.

2. The information processing system according to claim 1, wherein:
 said content storage means manages the original content and the content generated by said content generating means such that the original content and the generated content are associated with each other; and
 said content storage means comprises:
 a user-operation means for having a user select a user-selected content to erase; and
 a content erasure means for erasing the user-selected content and content generated based on said user-selected content.

3. An information processing method for data processing of content, comprising the steps of:
 managing user preferences concerning types of the data processing performed on said content;
 generating content by performing a user-preferred type of data processing on said content, before receiving a request for said content by a user; wherein types of said data processing include made-quality improvement in which said content is edited to have preferred quality, and re-encoding that re-encodes said content from one encoding system into another encoding system;
 storing said content in a content storage means, as original content, and the content generated in the generating step;
 managing system resources, comprising requesting data processing for said content by executing the generating step based on available system resources; and
 receiving a content selection by a user, and wherein
 the managing step further comprises learning user preference information based on a type of data processing performed on the content selected by the user,
 the managing step further comprises, for each user, calculating a weight for each type of data processing in accordance with a number of times that the type of data processing is selected by each user,
 the generating step further comprises selecting one type of data processing to perform on said content based on the weight of the type of data processing,
 each type of data processing has at least one parameter which is set when the type of data processing is performed on said content,
 the managing step further comprises calculating, for each user, the weight of said at least one parameter in accordance with a number of times that said at least one parameter is selected in each type of data processing, and
 the generating step further comprises determining at least one parameter based on the weight of said at least one parameter when the type of data processing is used for said content.

4. The information processing method according to claim 3, wherein:
 the content storing step further comprises, managing the original content and the content generated by the type of data processing so that the original content and the generated content are associated with each other; and
 the content storing step further comprises, having the user select a user-selected content to erase, and
 erasing the user-selected content, and content generated based on said user-selected content.

5. A computer program product for allowing a computer system to perform data processing on content, the computer program product stored on a computer readable storage medium and configured to perform operations comprising:

managing user preferences concerning types of data processing which can be performed on said content;

generating content by performing a user-preferred type of data processing on said content, before receiving a request for said content by a user, wherein types of said data processing include image-quality improvement in which said content is edited to have preferred quality, and re-encoding that re-encodes said content from one encoding system into another encoding system;

storing said content as original content and the content generated in the generating step; and managing system resources;

requesting data processing of said content by executing the generating step subject to available system resources; and receiving a content selection by a user, and wherein the managing step further comprises learning user preference information based on a type of data processing performed on the content selected by the user, the managing step further comprises, for each user, calculating a weight for each type of data processing in accordance with a number of times that the type of data processing is selected by each user, the generating step further comprises selecting one type of data processing to perform on said content based on the weight of the type of data processing, each type of data processing has at least one parameter which is set when the type of data processing is performed on said content, the managing step further comprises calculating, for each user, the weight of said at least one parameter in accordance with a number of times that said at least one parameter is selected in each type of data processing, and the generating step further comprises determining at least one parameter based on the weight of said at least one parameter when the type of data processing is used for said content.

6. An information processing system for data processing of content, comprising:

a preference-data manager configured to manage user preferences concerning types of data processing which is performed on said content;

a content generator configured to generate content by performing a user-preferred type of data processing on said content, before receiving a request for said content by a user, wherein types of said data processing include made-quality improvement in which said content is edited to have preferred quality, and re-encoding that re-encodes said content from one encoding system into another encoding system;

a content storage unit configured to store said content as original content and the content generated by said content generator;

a resource manager configured to manage system resources and request said content generator to process said content based on the availability of the resources; and user-operation unit for selecting content, wherein said preference-data manager learns user-preference information based on a type of data processing performed on a selected content, selected by said user-operation unit, said preference-data manager calculates a weight for each type of data processing for each user in accordance with a number of times that each user selects each type of data processing, said content generator selects a type of data processing for said content based on said weight, each type of the data processing is associated with at least one parameter which is set when each type of the data processing is performed on said content, said preference-data manager calculates a weight for said at least one parameter for each user based on a number of times each user selects said at least one parameter, and when performing the type of the data processing on said content, said content generator selects to use at least one parameter based on the weight of said at least one parameter.

* * * * *